US010046641B2

(12) United States Patent
Penmetsa et al.

(10) Patent No.: US 10,046,641 B2
(45) Date of Patent: Aug. 14, 2018

(54) MOBILE POWER CONVERSION AND DISTRIBUTION SYSTEM

(71) Applicant: Motivo Engineering LLC, Torrance, CA (US)

(72) Inventors: Praveen Varma Penmetsa, Long Beach, CA (US); Zachary Meyer Omohundro, Hermosa Beach, CA (US); Damon Christopher Pipenberg, Los Angeles, CA (US)

(73) Assignee: Motivo Engineering LLC, Torrance, CA (US)

( * ) Notice: Subject to any disclaimer, the term of this patent is extended or adjusted under 35 U.S.C. 154(b) by 397 days.

(21) Appl. No.: 14/662,132

(22) Filed: Mar. 18, 2015

(65) Prior Publication Data

US 2015/0266382 A1    Sep. 24, 2015

Related U.S. Application Data

(60) Provisional application No. 61/955,270, filed on Mar. 19, 2014.

(51) Int. Cl.
*B60L 11/18* (2006.01)
*B60L 1/00* (2006.01)
(Continued)

(52) U.S. Cl.
CPC ............... *B60L 1/003* (2013.01); *B60L 1/006* (2013.01); *B60L 1/14* (2013.01); *B60L 7/14* (2013.01); *B60L 8/003* (2013.01); *B60L 11/005* (2013.01); *B60L 11/007* (2013.01); *B60L 11/185* (2013.01); *B60L 11/1818* (2013.01); *B60L 11/1864* (2013.01); *B60L 15/007* (2013.01); *B60L 15/2009* (2013.01); *B60L 15/2054* (2013.01); *B60R 16/03* (2013.01); *B60L 2200/40* (2013.01); *B60L 2210/30* (2013.01);
(Continued)

(58) Field of Classification Search
CPC   B60L 11/182; B60L 2200/26; B60L 11/1816; B60L 11/183; B60L 11/184; B60L 11/005; B60L 2250/16; B60L 15/007; B60L 7/02; B60L 7/14
USPC ........................................................ 307/10.1
See application file for complete search history.

(56) References Cited

U.S. PATENT DOCUMENTS 8,115,334 B2 * 2/2012 Vyas ........................ B60K 6/46
307/10.1
2006/0145536 A1 * 7/2006 Hackl .................... H02J 7/1423
307/10.1
(Continued)

FOREIGN PATENT DOCUMENTS

WO    WO2012154990    * 11/2012    ............ H02J 7/0065
WO    WO2014033467         3/2014

OTHER PUBLICATIONS

International Search Report for PCT/US15/21339 dated Aug. 20, 2015.

*Primary Examiner* — John Poos
(74) *Attorney, Agent, or Firm* — Rathe Lindenbaum LLP

(57) ABSTRACT

A vehicle carries an energy storage system that powers mobility of the vehicle. The vehicle further carries a direct current input coupling to be connected to a direct current (DC) electrical power source, a DC output coupling, an alternating current (AC) input coupling, an AC output coupling, and electronics carried by the vehicle to control both AC and DC voltage and power levels.

22 Claims, 41 Drawing Sheets

(51) Int. Cl.
  *B60R 16/03*  (2006.01)
  *B60L 1/14*   (2006.01)
  *B60L 7/14*   (2006.01)
  *B60L 8/00*   (2006.01)
  *B60L 11/00*  (2006.01)
  *B60L 15/00*  (2006.01)
  *B60L 15/20*  (2006.01)

(52) U.S. Cl.
  CPC ....... *B60L 2210/40* (2013.01); *B60L 2240/12* (2013.01); *B60L 2240/421* (2013.01); *B60L 2240/423* (2013.01); *B60L 2250/12* (2013.01); *Y02T 10/645* (2013.01); *Y02T 10/7005* (2013.01); *Y02T 10/7022* (2013.01); *Y02T 10/7061* (2013.01); *Y02T 10/7072* (2013.01); *Y02T 10/7083* (2013.01); *Y02T 10/7241* (2013.01); *Y02T 10/7275* (2013.01); *Y02T 90/121* (2013.01); *Y02T 90/127* (2013.01); *Y02T 90/128* (2013.01); *Y02T 90/14* (2013.01)

(56) References Cited

U.S. PATENT DOCUMENTS

| | | |
|---|---|---|
| 2014/0021779 A1 | 1/2014 | Teichmann |
| 2014/0368170 A1 | 12/2014 | Tang et al. |
| 2014/0375272 A1 | 12/2014 | Johnsen et al. |
| 2015/0162784 A1* | 6/2015 | Kydd .................. B60L 11/1811 307/9.1 |

* cited by examiner

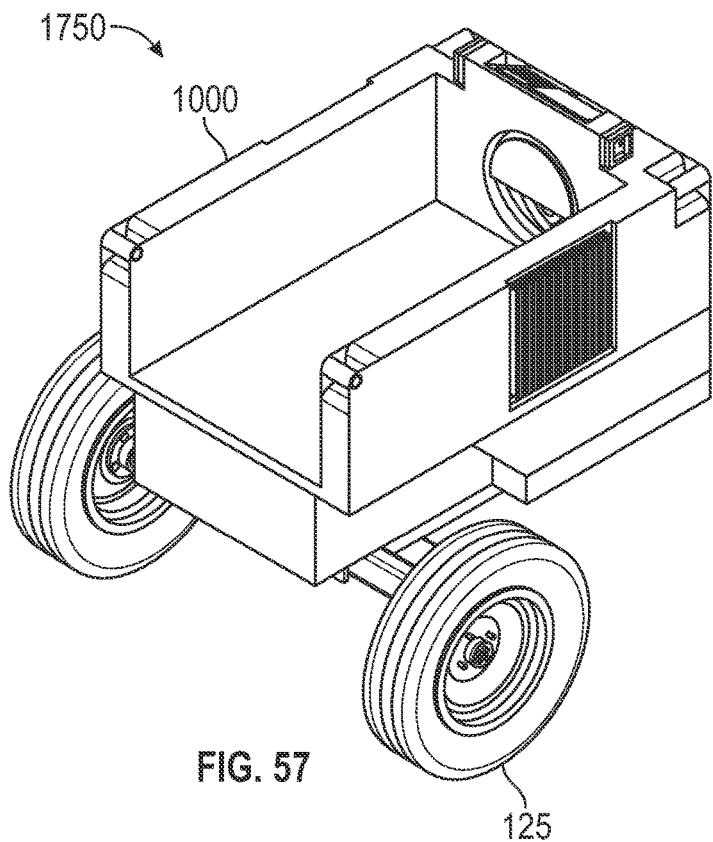
FIG. 57
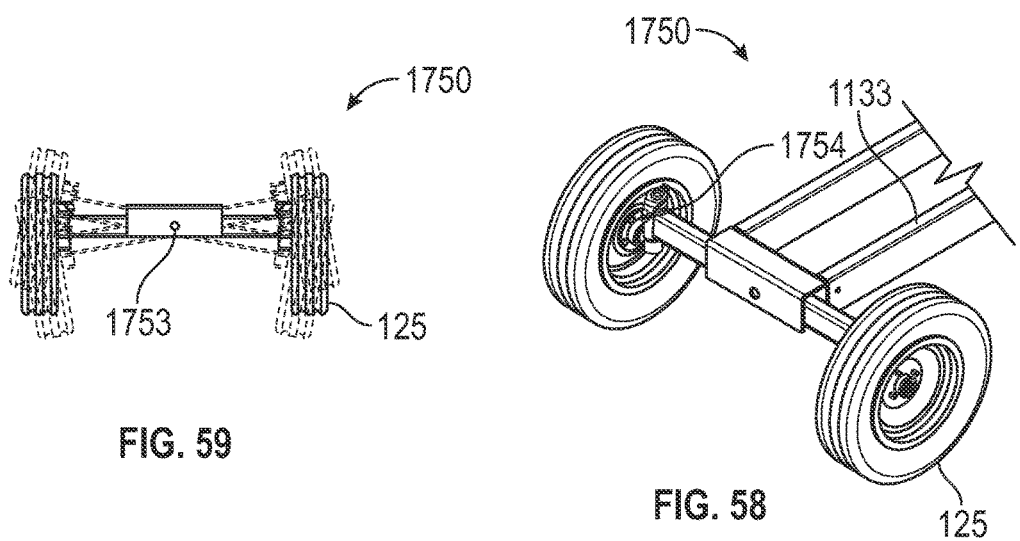
FIG. 59
FIG. 58

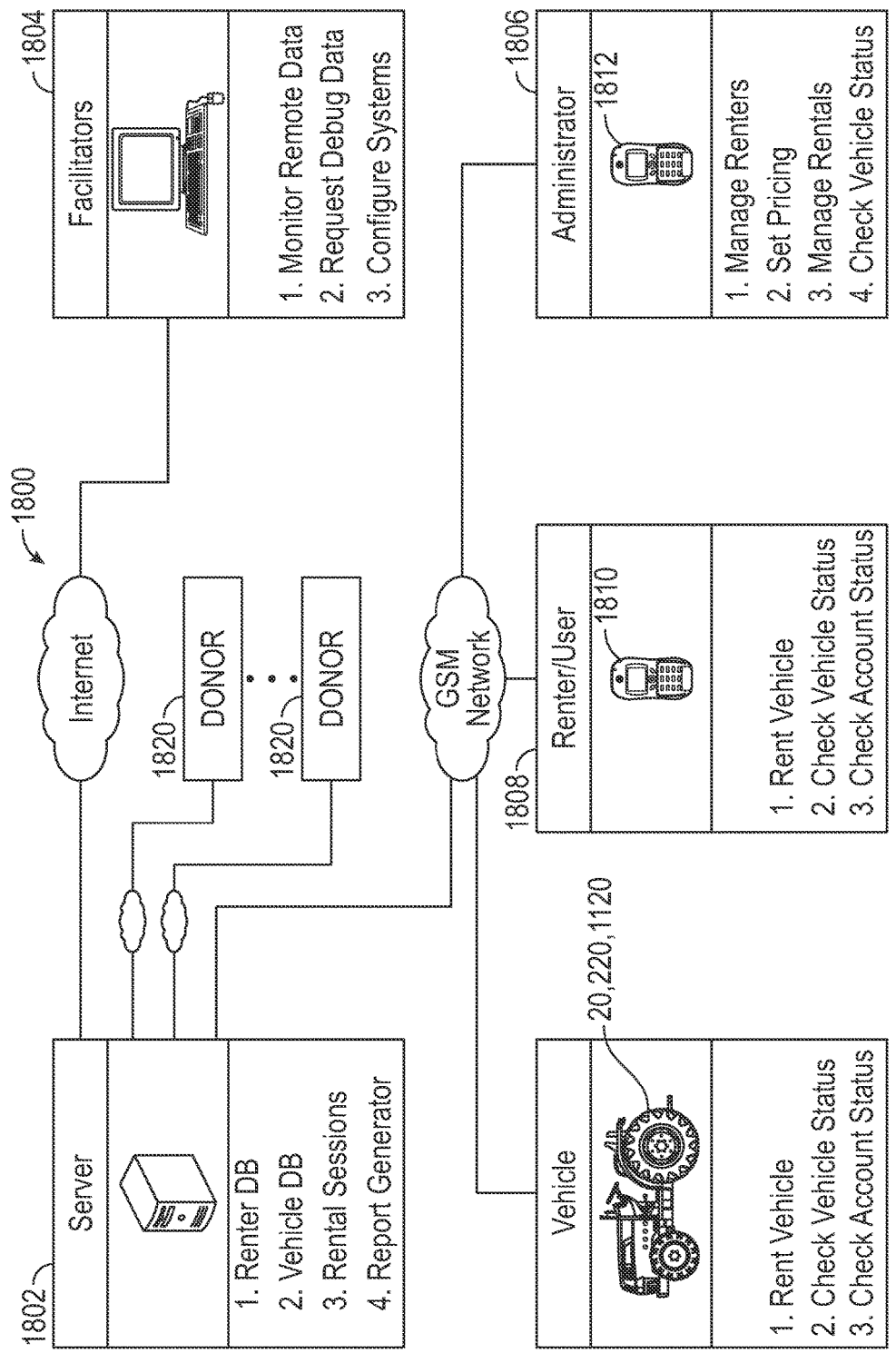

MOBILE POWER CONVERSION AND DISTRIBUTION SYSTEM

CROSS-REFERENCE TO RELATED PATENT APPLICATIONS

The present application claims priority under 35 USC 119 from U.S. Provisional Patent Application Ser. No. 61/955,270 filed on Mar. 19, 2014 by Penmetsa et al. and entitled HYBRID AGRICULTURAL/ROAD VEHICLE WITH ELECTRICITY STORAGE AND TRANSFORMATION, the full disclosure of which is hereby incorporated by reference.

This invention was made with U.S. Government support under Fixed Obligation Grant (FOG) Award No. AID-OAA-F-13-00068, under the Broad Agency Announcement number SOL-OAA-13-000017 & RFA-OAA-12-000027, Powering Agriculture: An Energy Grand Challenge for Development. The U.S. Government has certain rights in this invention.

BACKGROUND

Many agricultural communities lack an extensive and reliable power supply grid or infrastructure. Such agricultural communities also frequently lack agricultural equipment, refrigeration and the ability to drill and pump water or bring crops to market.

BRIEF DESCRIPTION OF THE DRAWINGS

FIG. 57 is a rear perspective view of another example front unit for use with the vehicle of FIG. 51.

FIG. 58 is a rear perspective view of a portion of the front frame portion of the front unit of FIG. 57.

FIG. 59 is a rear view of the portion of the front frame portion of the front unit of FIG. 57 illustrating pivoting suspension of front wheels.

FIG. 60 is a schematic diagram of an example power distribution and conversion vehicle reservation system.

DETAILED DESCRIPTION OF EXAMPLES

Figure 1:
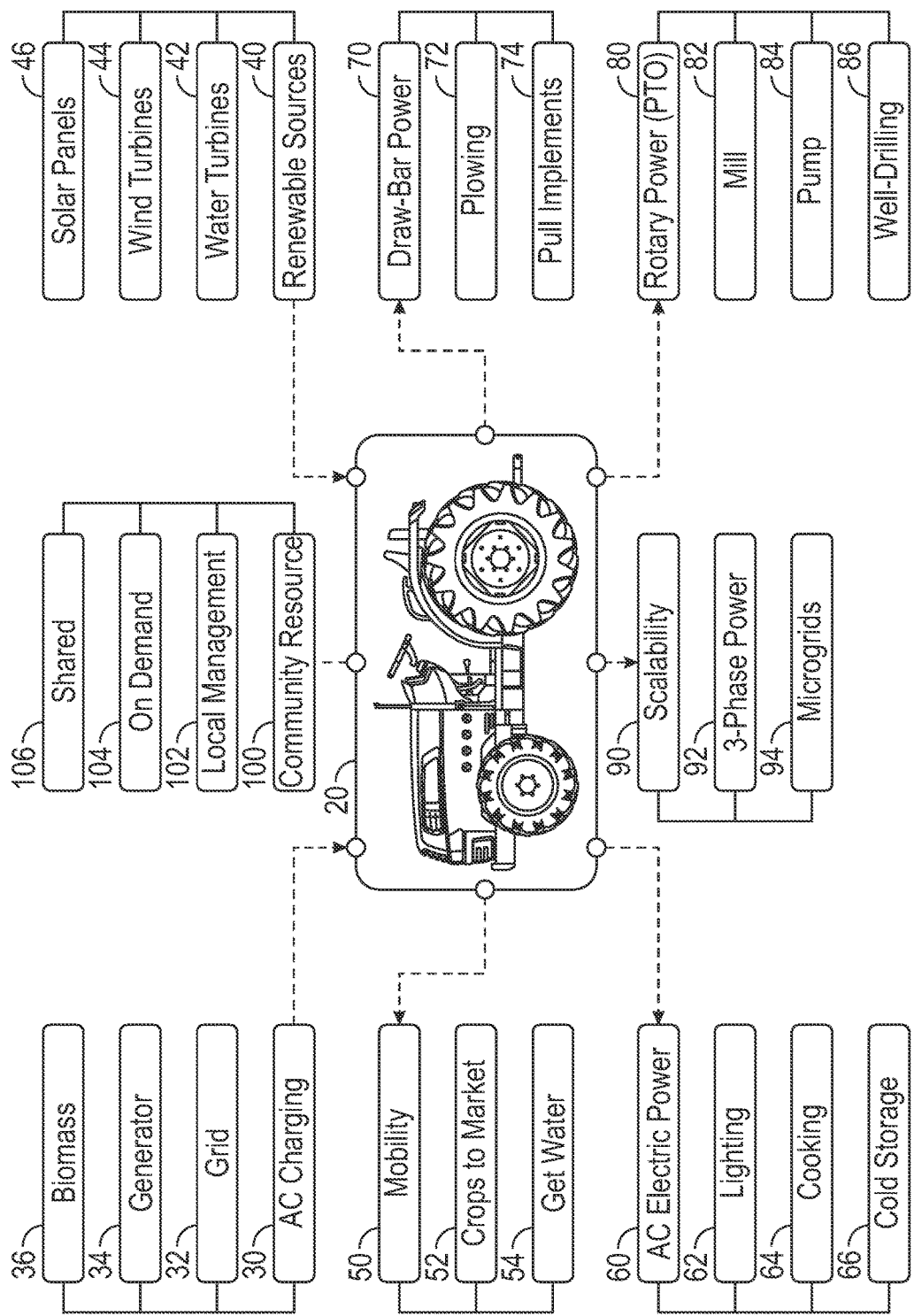
FIG. 1 is a schematic diagram of an example mobile power conversion and distribution vehicle.

FIG. 1 is a diagram of an example mobile power conversion and distribution vehicle 20. Mobile power conversion and distribution vehicle 20 comprises a hybrid agricultural/road vehicle with electricity storage and transformation. Vehicle 20 comprises a self-powered mobile unit that is operable in any of a variety of different modes for a variety of different purposes. As diagrammed by FIG. 1 and described in more detail hereafter, vehicle 20 stores energy, delivers energy in a mobile fashion and converts energy into usable forms to satisfy a diverse array of needs in agricultural communities and in regions that lack adequate electrical power infrastructure.

As indicated by block 30, vehicle 20 is configured to receive alternating current (AC) electrical charge and to store such electrical power for subsequent use. In one mode of use, vehicle 20 is connected to it local electrical AC power grid 32. In yet another mode of use, vehicle 20 is connected to a local or adjacent AC generator 34. The generator may be powered by fuel, such as gasoline or diesel fuel. In yet another mode of use, vehicle 20 is connected to a biomass AC power source 36. Vehicle 20 stores and is able to transport the stored electrical power to locations where it is needed.

As indicated by block 40, vehicle 20 is configured to receive power from renewable resources power. In one mode of use, vehicle 20 is connectable to a water turbine 42 to receive electrical power In another mode of use, vehicle 20 is connectable to a wind turbine 44 to receive electrical power. In another mode of use, vehicle 20 is connectable to solar panels 46 to receive electrical power. In one implementation, vehicle 20 is additionally configured to reposition such solar panels during a day or at different times to improve power generating capacity of such solar panels. For example, in one implementation, vehicle 20 comprises a power take off (such as power take of 126 described hereafter) coupled to a solar panel positioning mechanism, wherein the vehicle 20 drives the power take off to incrementally move one or more solar panels operably coupled to the solar panel positioning mechanism such that the faces of the solar panels follow or track movement of the sun during a day to increase solar panel energy capture. In each of such modes, vehicle 20 stores the electrical power and is able to transport the stored electrical power to locations where it is needed.

As indicated by block 50, in one mode of use, vehicle 20 comprises a hybrid vehicle which utilizes the stored electrical power to provide mobility for persons, products or resources. As indicated by block 52, vehicle 20 could facilitate the transportation of crops to market as well as the transportation of seed, fertilizer or other farming materials. As indicated by block 54, vehicle 20 provides the ability to transport water for human use or agricultural use.

As indicated by block 60, in another mode of use, vehicle 20 serves as a mobile electrical power source, storing and transporting electrical power from a source, such as from elect power grid 32, generated 34, biomass power source 36, water turbines 42, wind turbines 44 and/or solar panels 46 to a house, village or town lacking such electrical power resources. As indicated by blocks 62 and 64, in one mode of use, vehicle 20, converts stored power into a usable frequency and voltage of alternating current power for use in lighting and cooking. As indicated by block 66, in one mode of use, the AC electrical power provided by vehicle 20 may use to provide refrigeration or cold storage, preserving food stores.

As indicated by block 70, vehicle 20 is configured to provide pulling or draw-bar power. For example, as indicated by blocks 72 and 74, in one mode of use, vehicle 20 may pull a plow or other agricultural implements. In one mode of use, vehicle 20 may be configured to push implements as well.

As indicated by block 80, vehicle 20 provides rotary power through a Power Take Off (PTO). As indicated by block 82, 84 and 86, in different modes of use, the torque provided by the PTO powers a mill, drives a pump to pump water, or drives a drill for purposes such as drilling a well.

As indicated by block 90, vehicle 20 is connectable with other similarly configured vehicles 20 to facilitate scaling. As a result, vehicle 20 may provide three-phase power as indicated by block 92 or may be part of an electrical micro-grid 94.

As indicated by block 100, due to its multiple modes of use in agricultural communities lacking adequate electrical power infrastructure, vehicle 20 may serve as a valuable community resource. As indicated by blocks 102, 104, and 106, vehicle 20 may be managed locally, support on demand use models, and enable maximizing utilization of vehicle 20 through sharing in an agricultural community. Vehicle 20 may be shared among multiple users to best satisfy the needs of the agricultural community.

Figure 2:
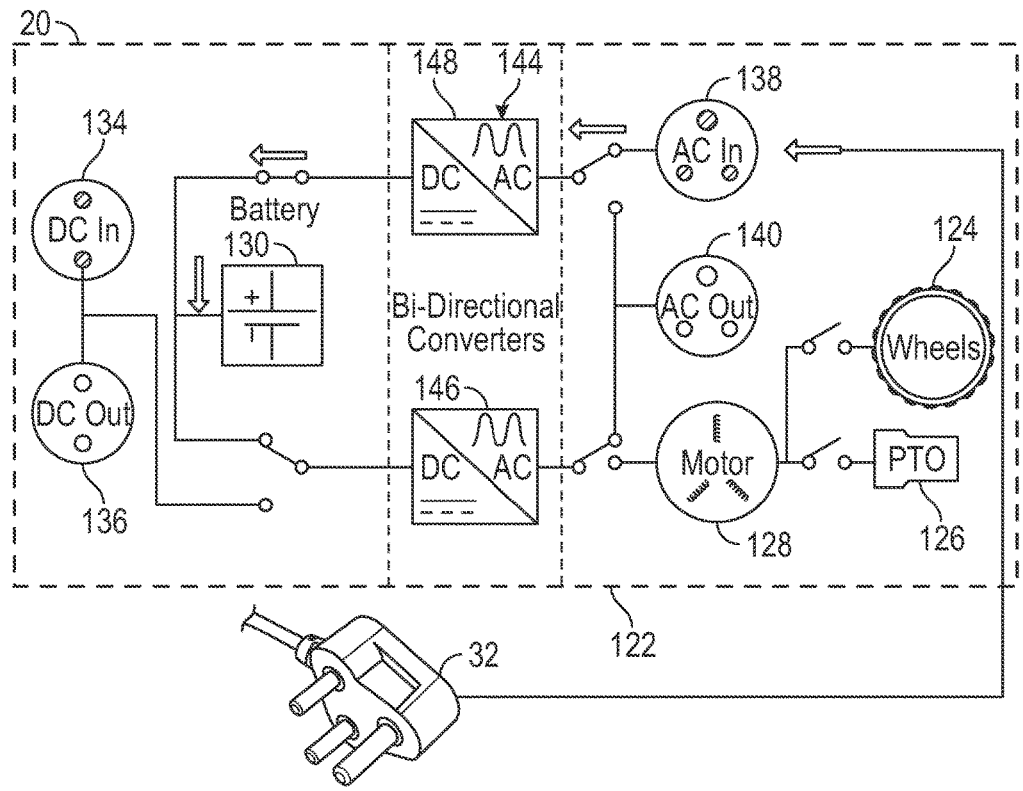
FIG. 2 is a schematic diagram of the vehicle of FIG. 1 in a first use mode.

FIG. 2 schematically illustrates an example vehicle 20 comprising frame 122, wheels 124, power takeoff shaft 126, electrical motor 128, energy storage system 130, direct-current (DC) input coupling 134, DC output coupling 136, AC input coupling 138, AC output coupling 140 and power conversion system 144. Frame 122 comprises one or more structures that support the remaining components of vehicle 20. Frame 20 serves as part of the chassis for vehicle 20. In one implementation, frame 20 comprises a single unitary body from which wheels 124 extend to support frame 20. In another implementation, frame 20 comprises a base and a module housing or platform, wherein the base supports wheels 124, PTO 126 and power conversion system 144 and wherein the module housing or platform supports or contains energy storage system 130. In another implementation, frame 20 comprises a base and a module housing or platform, wherein the base supports wheels 124, PTO 126 while the module housing or platform supports or contains energy storage system 130 and power conversion system 144. In yet other implementations, the various components may have other distributions among multiple portions of frame 122.

Wheels 124 support frame 122 above an underlying terrain and serve as ground motive members to move vehicle 20. Wheels 124 are driven by motor 128. In other implementations, wheels 124 are part of or are replaced with a track drive.

Power take off (PTO) 126 comprises a splined output shaft to be connected to a corresponding input shaft. As will be described hereafter, in some modes of use, power take of 126 further facilitates input of torque from a turbine, be they wind turbine or water turbine, to vehicle 20, the torque is converted into electrical power that is stored by vehicle 20 or supplied via DC output coupling 136 or AC output coupling 140. In one implementation, PTO 126 comprises a six splined category 1N power takeoff shaft. In other implementations, PTO 126 may have other configurations. In some implementations, PTO 126 is omitted.

Motor 128 comprises an electrical motor selectively operably connected to wheels 124 and/or PTO 126. Electric motor 128 is connected to PTO 126 and wheels 124 by transmission comprising various gears and speed reducers, whereby a velocity of wheels 124 and PTO 126 and the torque supplied to wheels 124 and PTO 126 are user adjustable. In one implementation, motor 128 has a peak power of 20 kW and a continuous power of 10 kW. In one implementation, the transmission connecting motor 128 to wheels 126 has a gear spread of 12.6 to 1, a gear range of six forward gears and three reverse gears, and a top speed of 26 kph/16 mph. In other implementations, motor 128 may have other configurations.

Energy storage system 130 comprises a rechargeable battery or secondary cell comprising one or more electrochemical or voltaic cells that convert stored chemical energy into electrical energy. Energy storage system 130 is configured to have its chemical reactions reversed through the supply of electrical energy to the cells, approximately restoring such cells to the original composition. In one implementation, energy storage system 130 comprises twelve deep cycle sealed lead acid batteries connected in series to provide 8 kWh of energy storage at 144V nominal. In another implementation, energy storage system 130 comprises 48 lithium ion cells connected in series and managed by a battery management system to provide 14 kWh of energy storage at 154V nominal. In another implementation, energy storage system 130 comprises 120 Zinc Manganese Dioxide cells connected in series and parallel and managed by a battery management system to provide 7 kWh of energy storage at 164V nominal. In other implementations, energy storage system 130 may comprise other presently available or future developed rechargeable batteries, capacitive energy storage devices such as ultra-capacitors, or kinetic energy storage devices such as flywheels.

Direct-current (DC) input coupling 134 comprises a connector to facilitate connection to a plug or other coupling of a DC power supply source, other than vehicle 20, for the input of electrical current, direct charge, unidirectional flow of electric charge. DC output coupling 136 comprises a connector to facilitate connection to a plug or other coupling of a power recipient, other than vehicle 20, for the output of DC electrical power. Alternating current (AC) input coupling 138 comprises a connector to facilitate connection to a plug or other coupling of an AC power supply source for the input of electrical current, direct charge, unidirectional flow of electric charge. AC output coupling 140 comprises a connector to facilitate connection to a plug or other coupling of a power recipient, other than vehicle 20, for the output of AC electrical power. Although the couplings 134, 136, 138 and 140 are illustrated as having the particular configurations depicted, in other implementations, one or more of couplings 134, 136, 138 and 140 may have other presently utilized or future developed power connectors.

Power conversion system 144 comprises an electric power conversion device that provides bidirectional flow between AC and DC power domains. In the example illustrated, power conversion system 144 comprises a first converter 146 (also known as an inverter) and a second converter 148 (also known as an inverter). First converter 146 has a DC side selectively connectable to battery 130 or DC input and output couplings 134, 136. First converter 146 has an AC side that a selectively connectable to motor 128 or AC output coupling 140. Second converter 148 has a DC side selectively connectable or disconnectable to and from battery 130. Second converter 148 has an AC side that is selectively connectable to AC input coupling 138 or AC output coupling 140. In the example illustrated, inverters 146, 148 are also selectively connectable to one another. In one implementation, the above-described switches are actuated between different switching states by solenoids other powered actuators in response to control signals from a controller in the form of an application-specific integrated circuit (ASIC) or control Board. In yet other implementations, the above-described switches are actuated between different switching states mechanically or manually by an operator.

As will described hereafter, because power conversion system 144 provides bidirectional flow between AC and DC domains, vehicle 20 provides a multitude of different modes of use. FIG. 2 illustrates one example mode of use in which the schematically illustrated switches are actuated to states such that vehicle 20 is in a grid recharging state, wherein vehicle 20 is undergoing AC charging, receiving AC electrical power from a plug or other connector of a power grid 32 connected to AC input coupling 138. As shown by FIG. 2, in the grid recharging mode of use, the AC side of converter 148 is connected to AC input coupling 138 while the DC side of converter 148 is connected to battery 130.

During recharging, AC power is received through AC input coupling 138, transformed by converter 148 to direct-current and conducted to battery 130 to recharge battery 130. In one implementation, vehicle 20 is configured to receive up to 16 A of 230 voltage AC (VAC), and is able to accept lower currents and voltages. In the example illustrated, converter 148 is configured to automatically optimize the charging of battery 130, providing an efficiency of at least about 90%.

Figure 3:
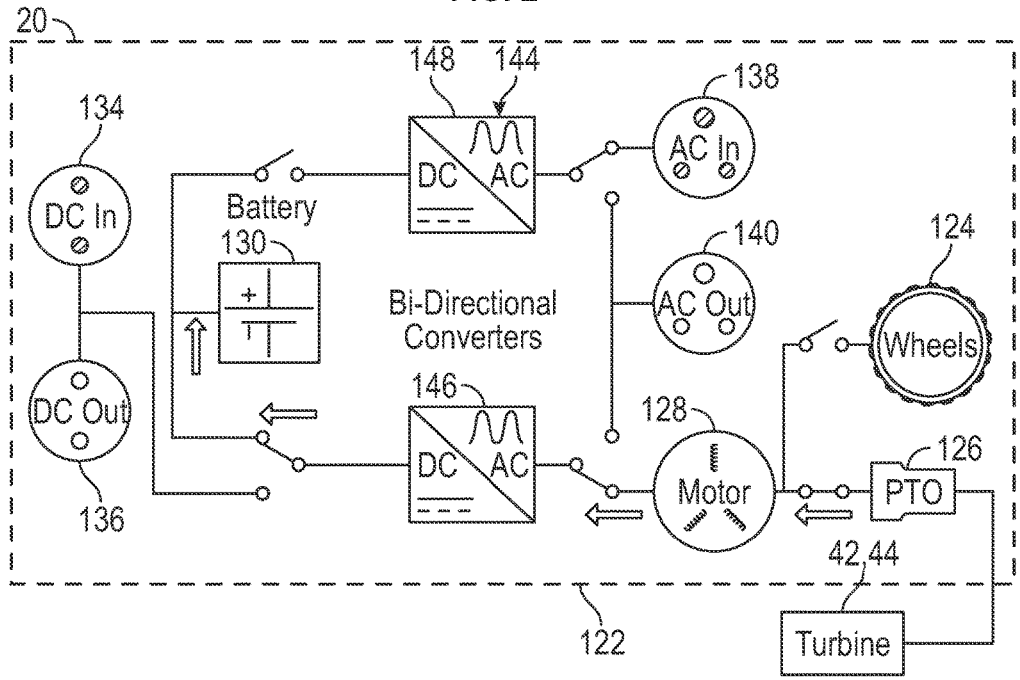
FIG. 3 is a schematic diagram of the vehicle of FIG. 1 in a second use mode.

FIG. 3 schematically illustrates vehicle 20 in a turbine input mode of use in which the batteries are recharged by power provided by a water turbine 42 or a wind turbine 44. In the turbine input mode of use, the schematically illustrated switches are actuated to states such that power takeoff 126 is connected to motor 128 and powered motor 128 is not connected to wheels 124. Motor 128 is connected to the AC side of power converter 146 while the DC side of power converter 146 is connected to battery 130. PTO 126 is connected to a corresponding splined sleeve or connector that is rotationally driven by a water or wind turbine. Torque from the turbine 42, 44 is provided to PTO 126 which rotates the rotor of motor 128 such that motor 128 functions in a reverse fashion, serving as a generator. The alternating current electrical power generated by motor 128 is transmitted to converter 146 which outputs DC current which is conducted to battery 13 to charge battery 130. PTO 126 can also be connected to the rotating output shaft of a conventionally or bio-mass powered engine, or to human powered rotary inputs such as a stationary bicycle.

Figure 4:
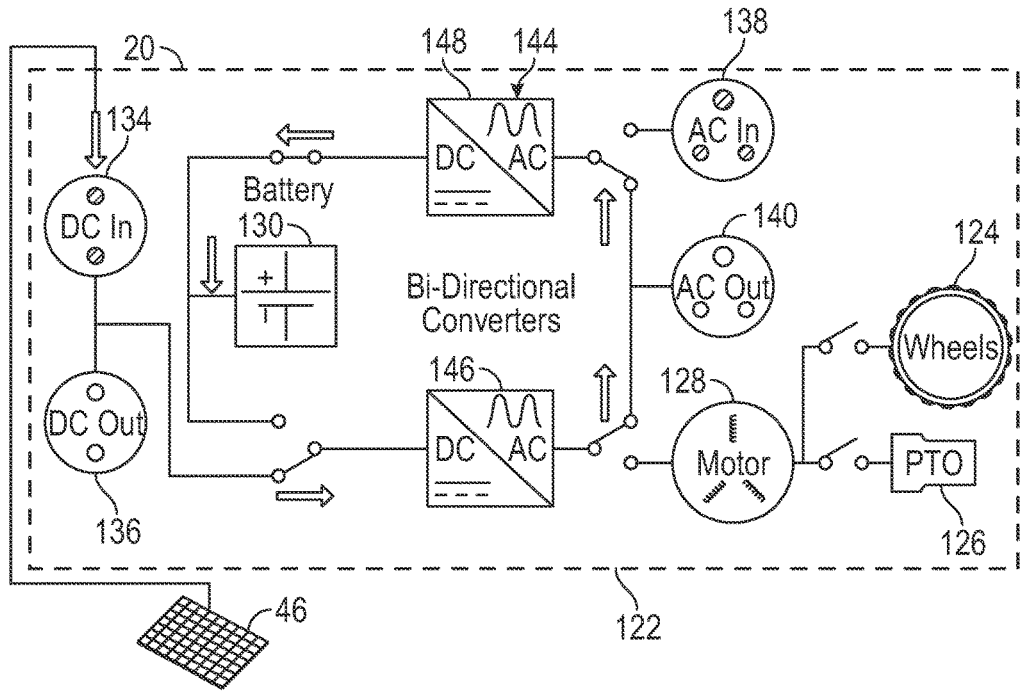
FIG. 4 is a schematic diagram of the vehicle of FIG. 1 in a third use mode.

FIG. 4 schematically illustrates vehicle 20 in a solar recharging mode in which vehicle 20 is electrically connected to solar panel 46 by DC input coupling 134. In the solar recharging mode of use, the schematically illustrated switches are actuated to states such that DC input coupling 134 is electrically connected to the DC side of converter 146. The AC side of converter 146 is electrically connected to the AC side of converter 148. The DC side of converter 148 is electrically connected to battery 130. As a result, the direct-current received through coupling 134 from solar panel 46 passes through conversion 146 and 148 such that the DC electric current is at an appropriate voltage for charging battery 130. Converter 146 control algorithms optionally include Maximum Power Point Tracking (MPPT) functionality to optimize solar panel power extraction under variable sunlight conditions. Other DC power sources, such as fuel cells, can also be connected to DC input coupling 134 to provide power for charging battery 130.

Figure 5:
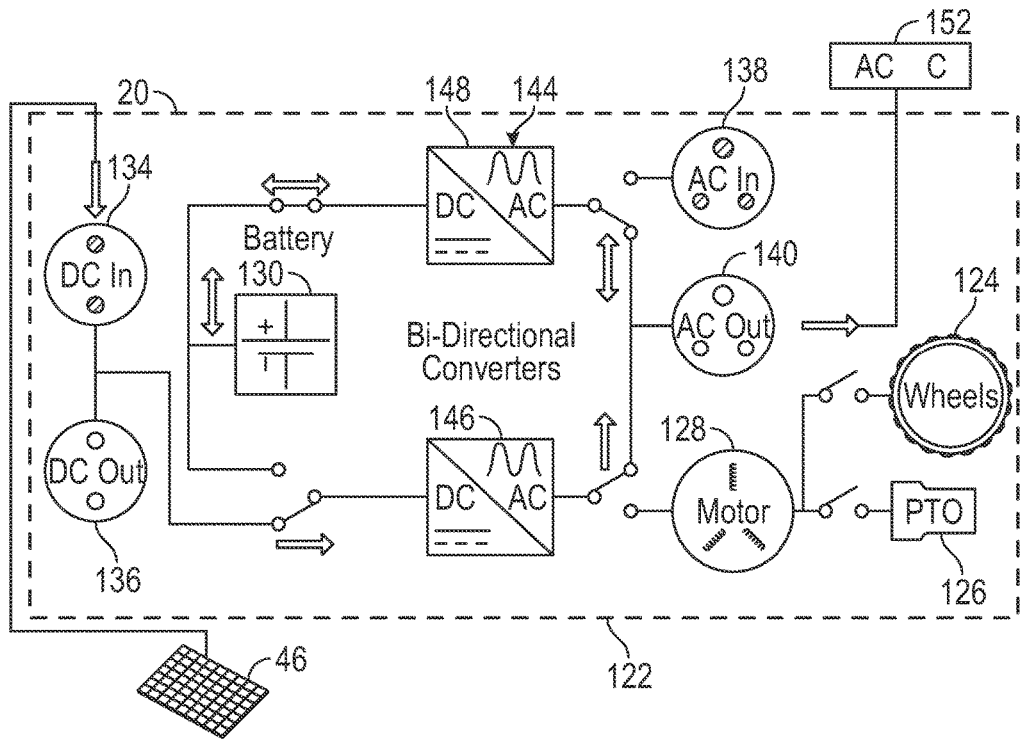
FIG. 5 is a schematic diagram of the vehicle of FIG. 1 in a fourth use mode.

FIG. 5 schematically illustrates vehicle 20 in a mode of use in which vehicle 20 serves as a load leveling solar inverter. When serving as a load leveling solar inverter, vehicle 20 converts the variable DC output of the photovoltaic solar panel 46 into a utility frequency alternating current and may be fed into an electrical grid or used in a local, off grid electrical network. Vehicle 20 additionally provides battery storage facilitated load leveling, storing energy produced by solar panel 46 during peak sunlight hours or times and supplying energy to the grid during off-peak hours or at night. In the load leveling solar inverter mode, the schematically illustrated switches are actuated to states such that DC input coupling 134 is electrically connected to the DC side of converter 146. The AC side of converter 146 is electrically connected to the AC side of converter 148. The AC side of converters 146, 148 are further electrically connected to AC output coupling 140 which is connected to an electrical grid or other AC power consumer 152. The DC side of converter 148 is electrically connected to battery 130.

As a result, during power generation peak hours in which excess power above the demands of consumer 152 is generated, battery 130 is charged. During such times, the direct-current received through coupling 134 from solar panel 46 passes through conversion 146 and 148 such that the DC electric current is at an appropriate voltage for charging battery 130. During times when power generation may have fallen off, such as on a cloudy day or during the night, battery 130 supplies electrical power to consumer 152. In particular, battery 130 supplies DC power which is converted by converter 148 to AC power to supplement the AC power, if any, resulting from the current supply of DC power from solar panel 46 and received through coupling 134. In one implementation, vehicle 20 is configured to receive up to 20 kW from a solar array 46 and to output AC power of up to 7 kW, providing a solar output efficiency of 90% and a solar to battery efficiency of 85%. Vehicle 20 facilitates the continuous supply of AC power regardless of the current solar conditions.

Figure 6:
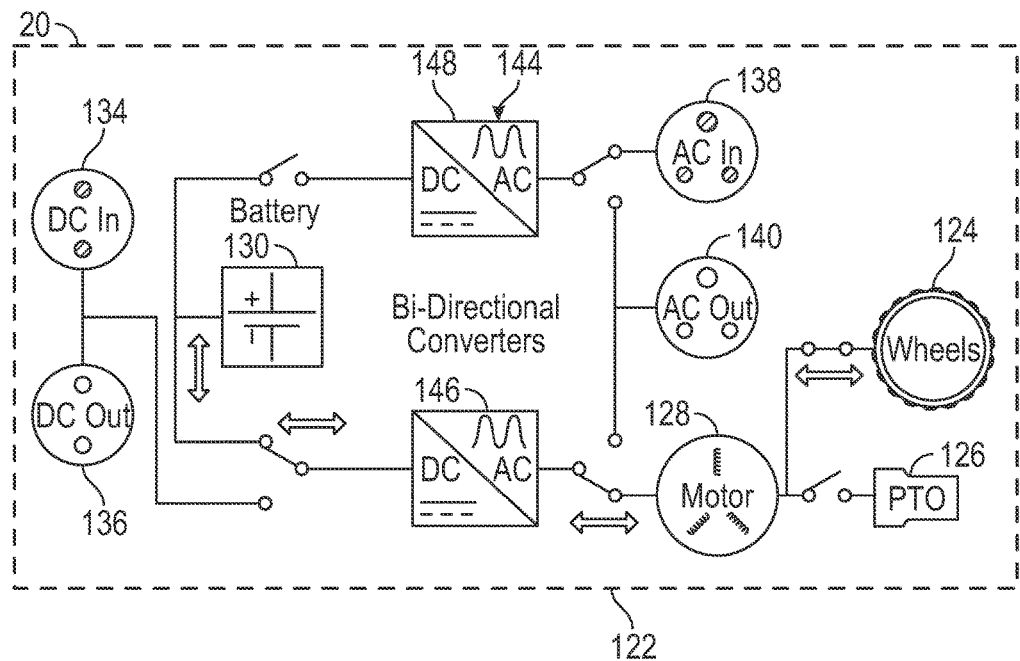
FIG. 6 is a schematic diagram of the vehicle of FIG. 1 in a fifth use mode.
Figure 7:
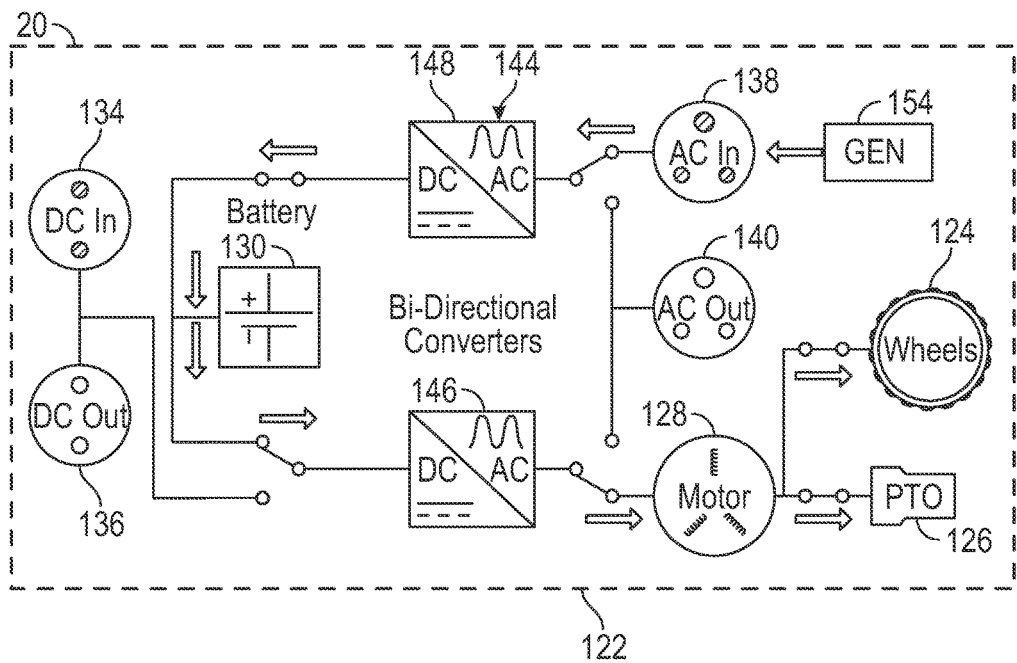
FIG. 7 is a schematic diagram of the vehicle of FIG. 1 in a sixth use mode.
Figure 8:
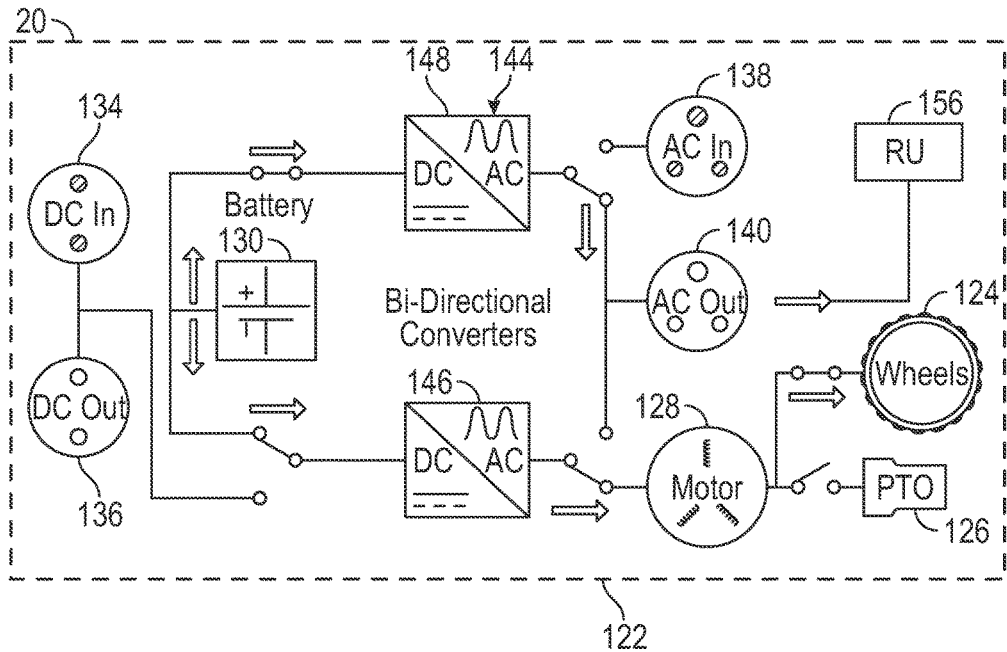
FIG. 8 is a schematic diagram of the vehicle of FIG. 1 in a seventh use mode.

FIGS. 6-8 schematically illustrates vehicle 20 in modes of use wherein vehicle 20 is driven under power to move across a terrain. FIG. 6 schematically illustrates vehicle 20 in a transport or mobility mode for performing tasks such as delivering crops to market or retrieving supplies such as water, fertilizer, insecticide, herbicide or the like. Such powered mobility may further push or pull various implements connected to vehicle 20, such as to a drawbar of the vehicle 20, to carry out tasks such as plowing, cultivating, planting or harvesting. When in the vehicle mobility mode illustrated in FIG. 6, the schematically illustrated switches are actuated to states such that battery 130 is connected to the DC side of converter 146 which converts the power from battery 130 to variable frequency, variable voltage AC power. The AC side of converter 146 is connected to motor 128 which is connected to wheels 124 to drive wheels 124 and propel vehicle 20. In one implementation, the transmission coupling wheels 124 and motor 128 further provides regenerative braking, wherein to slow vehicle 20 down, the rotation of wheels 124 is used to drive a rotor to produce electrical current, utilizing motor 128 as a generator, whereby the produce electrical current is stored in battery 130.

In one implementation, vehicle 20 provides a speed of up to 26 kph/16 mph with a peak power or RPM of 20 kW and continuous power of 10 kW. In one such implementation, battery 130 provides vehicle 20 with an estimated range of 40 km/25 miles. In one implementation, the transmission connecting motor 128 to wheels 124 provides vehicle 20 with a gear spread of 12.6 to 1, a gear range of six forward gears and three reverse gears and an efficiency of at least 60% and nominally at least 90%.

FIG. 7 illustrates vehicle 20 in a multimode state in which vehicle 20: (1) is receiving supplemental AC power from a generator to charge battery 130; (2) in which battery 130 is powering wheels 124 to propel the vehicle across a terrain, such as across a field; and (3) in which battery 130 is powering PTO 126 to perform various agricultural operations or tillage operations, such as rotary tilling, as the vehicle 20 moves across a field. In the mode illustrated in FIG. 7, a fuel powered generator 154 is carried by vehicle 20 and is electrically connected to vehicle 20 by AC input coupling 138. In the mode illustrated, the schematically illustrated switches are actuated to states such that AC input coupling 138 is connected to the AC side of converter 148. The DC side of converter 148 is connected to battery 130. Battery 130 is connected to the DC side of converter 146. The AC side of converter 146 is connected to motor 128 which is connected to both wheels 124 and PTO 125. AC power generated by generator 154 is converted by converter 148 to charge battery 130. Power from battery 130 is converted by converter 146 to AC power to drive motor 128 which drives wheels 124 to propel a vehicle across a field while PTO 125 is driven to drive a piece of tillage equipment, such as a rotary tiller. As a result, converter 146 provides an appropriate voltage level for alternating current to drive motor 128 and drive wheels 124 of vehicle. At the same time, converter 148 converts the received AC power to DC power for charging battery 130.

In one implementation, vehicle 20 outputs a total of about 10 kW of power of which 3.5 kW is produced by generator 154. Generator 154 facilitates continuous operation of vehicle 20 to avoid depletion of battery 130. Similar to the mode illustrated with respect to FIG. 6, vehicle 20 provides a gear spread of 12.6 to 1, a gear range of six forward gears and three reverse gears and an output PTO speed of 540 rpm. The simultaneous output of power to wheels 124 and PTO 125 facilitates tillage as vehicle 20 moves across the field.

FIG. 8 illustrates a multimode use of vehicle 20 in which vehicle 20 provides refrigerated transport. As shown by FIG. 8, vehicle 20 carries a refrigeration unit 156 connected to vehicle 20 through AC output coupling 140. In one implementation, refrigeration unit 156 is built-in as part of vehicle 20. In another implementation, refrigeration unit 156 comprises a separate and independent refrigeration module which is carried by vehicle 20, such as upon a cargo bed of vehicle 20. In the illustrated refrigerated transport mode, the schematically illustrated switches of vehicle 20 are actuated to states such that battery 130 is connected to the DC side of converter 148. The AC side of converter 148 is connected to AC output coupling 142 to supply AC power to the refrigeration unit 156. At the same time, battery 130 is electrically connected to the DC side of converter 146. The AC side of converter 146 is electrically connected to motor 128 which is connected to wheels 124 by a transmission to drive wheels 124 and propel vehicle 20. As a result, converter 146 provides an appropriate voltage level for alternating current to drive motor 128 and drive wheels 124 of vehicle 20. At the same time, converter 148 converts the received DC power to an appropriate voltage of AC power for refrigeration unit 156.

In one implementation, vehicle 20 outputs up to 7 kW of power. Motor 128 and the transmission connecting motor 128 to wheels 124 provide vehicle 20 with the gear spread of 12.6 to 1, a gear range of six forward gears and three reverse gears. In one implementation, the refrigeration unit 156 comprises a 5 kW fridge, wherein vehicle 20 powers the refrigeration unit across an estimated range of travel of vehicle 20 of 25 km/16 miles.

Figure 9:
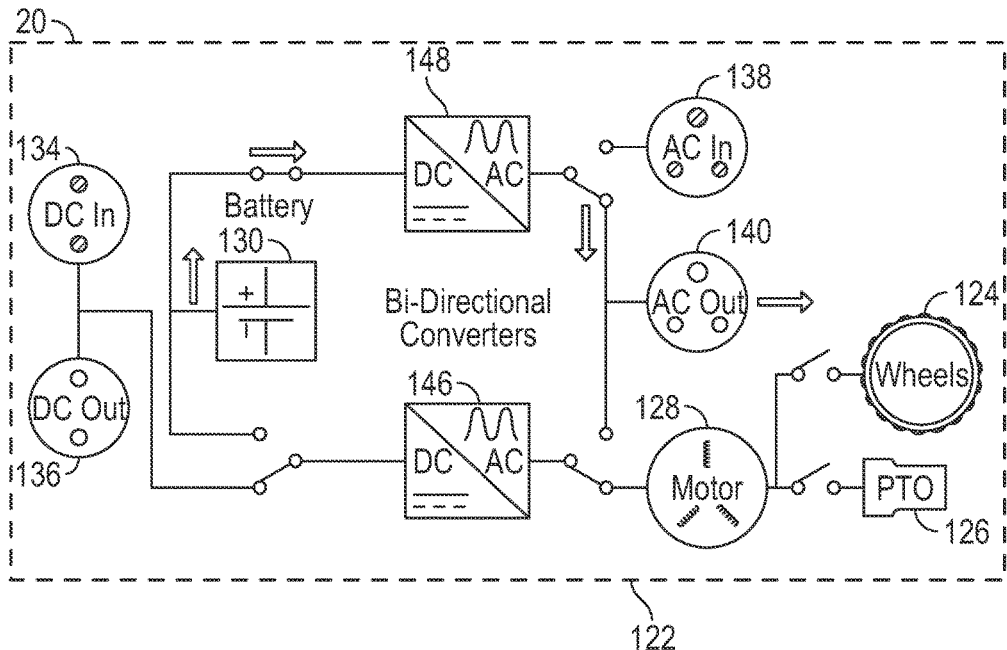
FIG. 9 is a schematic diagram of the vehicle of FIG. 1 in an eighth use mode.
Figure 10:
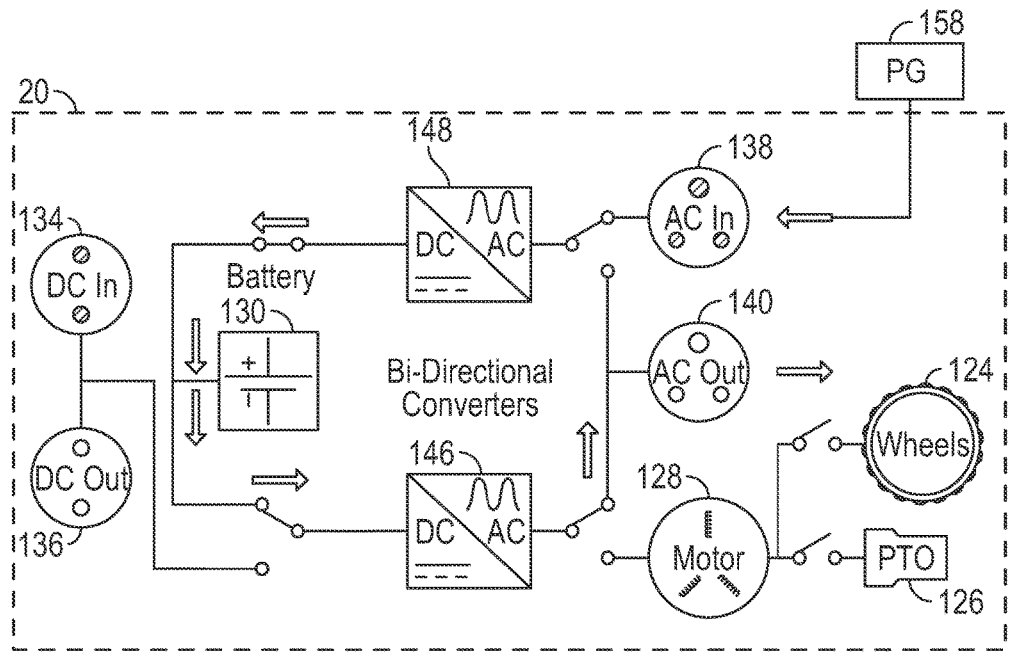
FIG. 10 is a schematic diagram of the vehicle of FIG. 1 in a ninth use mode.

FIGS. 9-10 illustrate vehicle 20 in power conversion and supplying modes of use. FIG. 9 shows a vehicle 20 in an AC inverter mode in which DC power from battery 130 is converted to AC power for multiple uses, such as powering a residential home. In the AC inverter mode illustrated, each of the schematically illustrated switches is actuated to a state such that battery 130 is connected to converter 148 which is connected to AC output coupling 140. Converter 148 converts the supplied DC power to an appropriate AC power for the AC power recipient connected to AC output coupling 140.

In one implementation, vehicle 20 supports short-term overload on startup and provides 230 V of AC power at 50 Hz. Vehicle 20 provides a continuous output of power of 7 kW and efficiency of at least 80% and nominally at least 90%.

FIG. 10 schematically illustrates vehicle 20 in a continuous power supply mode in which battery 130 automatically supplies electrical power when the supply of power from an electrical power grid 158 connected to AC input coupling 138 is interrupted. In the power supply mode illustrated in FIG. 10, each of the schematically illustrated switches are actuated to states such that AC input coupling 138 is electrically connected to converter 148. Converter 148 is electrically connected to battery 130. Battery 130 is electrically connected converter 146. Converter 146 is selectively connected to AC output coupling 140. As indicated by arrows, vehicle 20 receives power from power grid 158 through AC input coupling 138. The received power passes across converters 148 and 146 prior to being supplied to the power consumer through AC output coupling 140. Power from power grid 158 powers battery 130 to maintain battery 130 in a fully charged state. During interruptions of power from power supply grid 158, battery 130 automatically supplies DC power to converter 146 which supplied AC power to output coupling 140. As a result, the supply of AC power to output coupling 140 is continuous despite an interruption in the supply of power from power grid 158.

In one implementation, vehicle 20 provides continuous power of 3.5 kW at an efficiency of 85%. In one implementation, vehicle 20 supports high peak power output, and provides pure sine wave output power regardless of input power wave form shape. Vehicle 20 reduces or eliminates power supply cut out due to the loss of grid 158.

Figure 11:
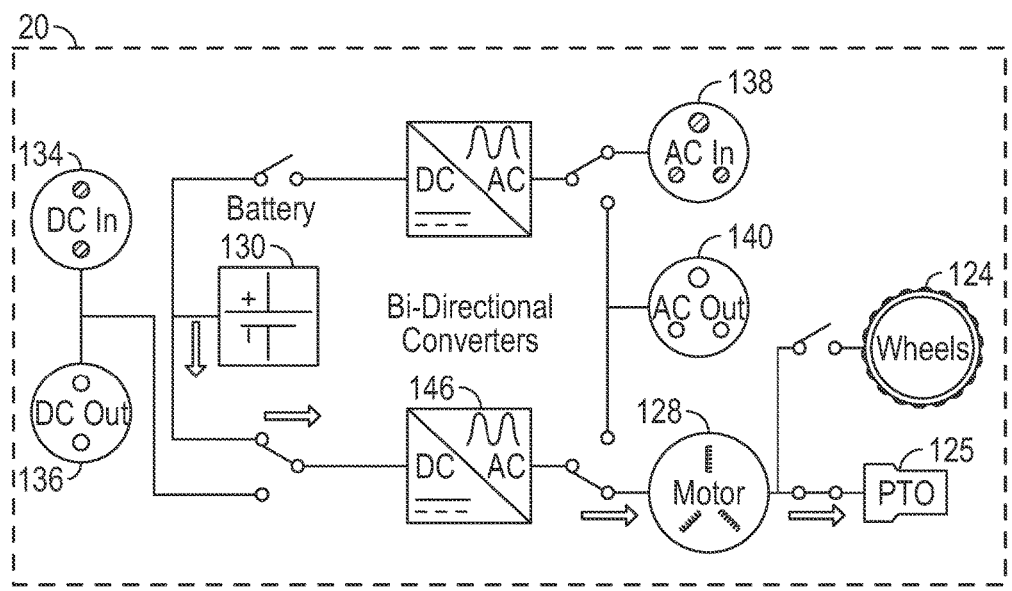
FIG. 11 is a schematic diagram of the vehicle of FIG. 1 in a tenth use mode.
Figure 12:
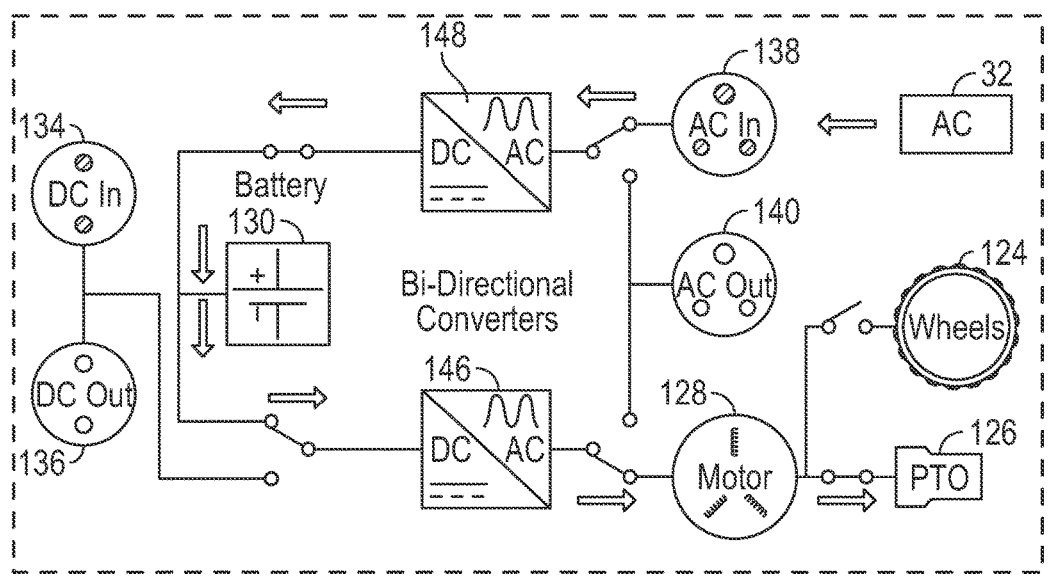
FIG. 12 is a schematic diagram of the vehicle of FIG. 1 in an eleventh use mode.

FIGS. 11 and 12 illustrate vehicle 20 in modes of use in which vehicle 20 is stationary, but in which PTO 125 is driven. FIG. 11 illustrates vehicle 20 in a pumping/drilling mode. In the illustrated mode, the schematically illustrated switches are actuated to states such that battery 130 is connected to converter 146 which is electrically connected to motor 128. Motor 128 is connected to PTO 125 by a transmission so as to drive PTO 125. PTO 125 is connected to pumping or drilling equipment. As indicated by the arrows, DC power from battery 130 is converted to an appropriate AC power for driving motor 128 which drives PTO 125 and the connected pumping/drilling equipment. In other implementations, other tools or equipment may be powered upon being connected to PTO 125.

FIG. 12 illustrates vehicle 20 in a grid powered PTO mode in which vehicle 20 converts AC power into torque for driving PTO 125 to drive milling, pumping, drilling or devices powered by PTO 125. In the grid powered PTO mode, AC input coupling 138 is connected to an AC grid 32. The schematically illustrated switches are actuated to states such that AC input coupling 138 is connected to converter 148 which converts the received AC power to DC power. Converter 148 is connected to battery 130 and converter 146. Converter 146 received DC power and outputs AC power. Excess energy not being utilized charges battery 130. In times of deficiency, battery 130 supplies energy. Converter 146 is electrically connected to motor 128 which is connected to PTO 125 to supply torque to PTO 125 to power the implement or device being driven by PTO 125.

Figure 13:
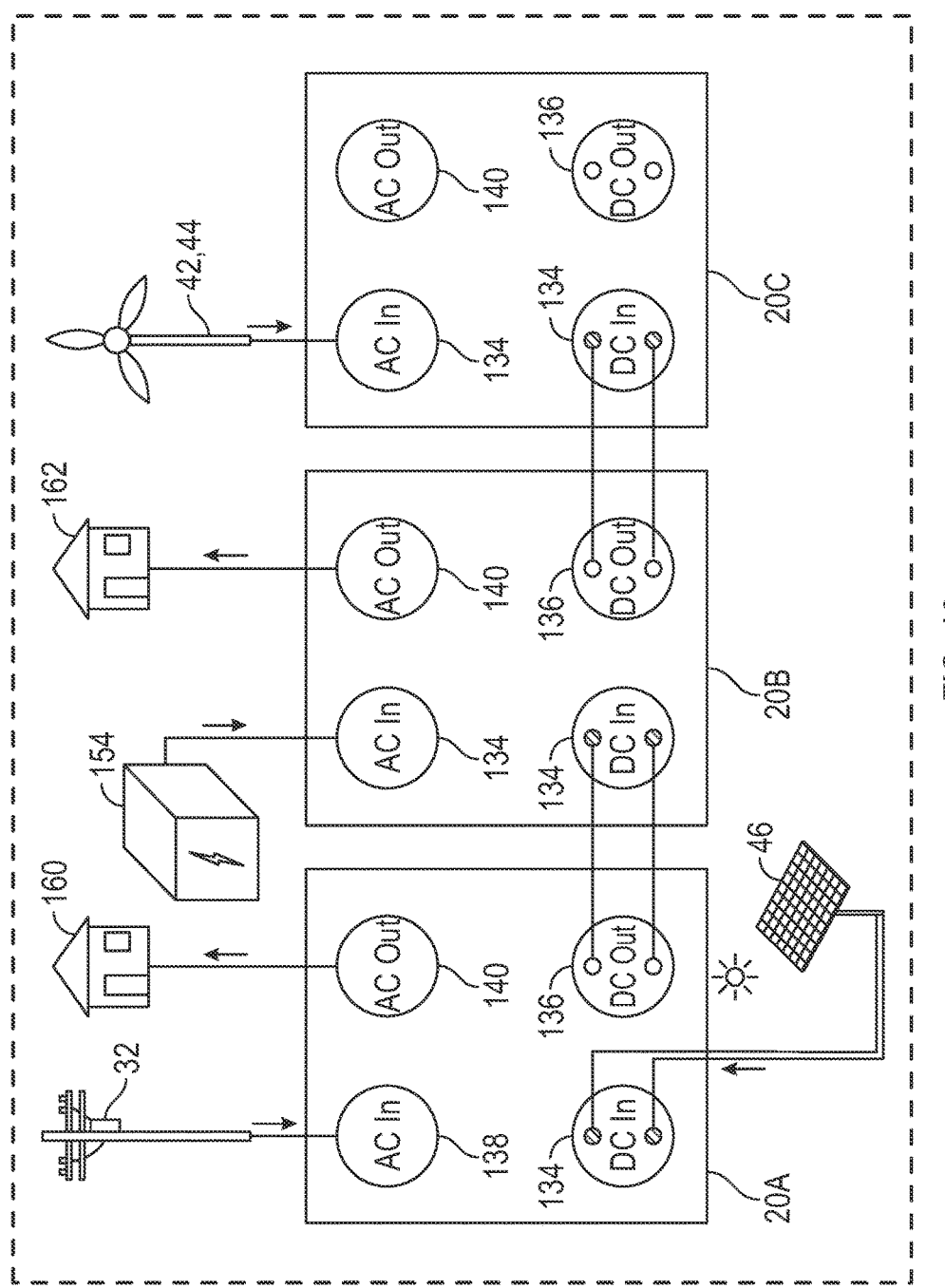
FIG. 13 is a schematic diagram of the vehicle of FIG. 1 interconnected as part of a network of other similar vehicles.

FIG. 13 schematically illustrates multiple vehicles 20 interconnected in a chain to scale up power conversion and supply capabilities. In the example illustrated in FIG. 13, three vehicles 20, vehicles 20A, 20B, 20C, are connected to one another in a chain or series. AC input coupling 138 of vehicle 20A is connected to and receives AC power from power grid 32. At the same time, DC input coupling 134 is connected to and receives DC power from solar panel(s) 46. AC output coupling 140 is connected to and supplies AC output to a first residential home 160 while DC output coupling 136 supplies DC power to the next vehicle 20B.

DC input coupling 134 of vehicle 20B is connected to receive power from DC output coupling 136 of vehicle 20A. Vehicle 20B also receives AC power from generator 154 through AC input coupling 134 of vehicle 20B. AC output coupling 140 of vehicle 20A is electric connected to and supplies power to a second, different, residential home 162. DC output coupling 136 of vehicle 20B is electrically connected to DC input coupling 134 of the next adjacent vehicle 20C. Vehicle 20C receives AC electric power produced by a turbine 42, 44 through AC input coupling 134. Although not illustrated, vehicle 20C may supply either AC power or DC power to a recipient such as yet a third residential home or commercial/manufacturing facility or such as a PTO powered device or implement such as a PTO powered auger, PTO powered pump, or a PTO powered mill.

Figure 14:
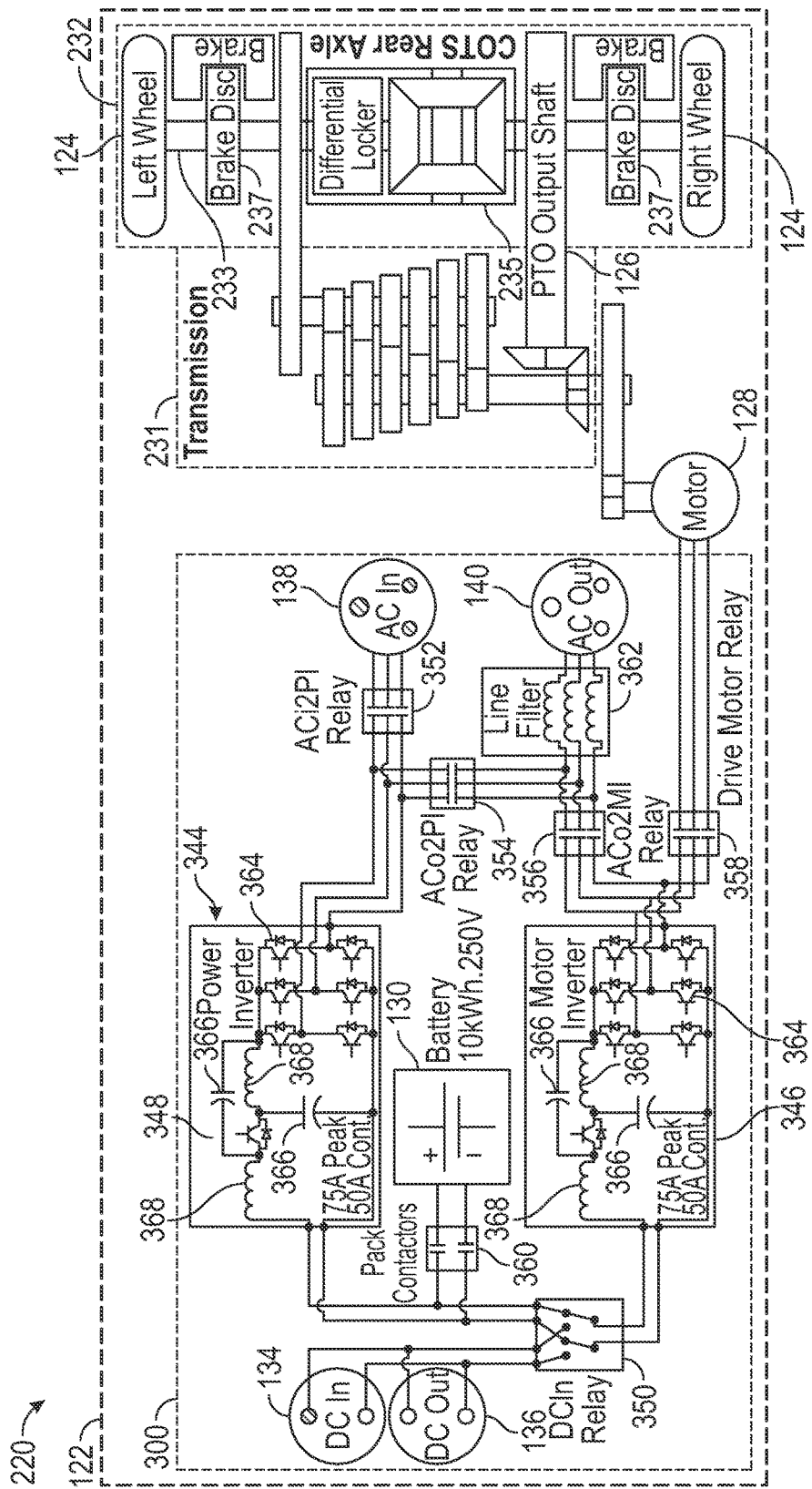
FIG. 14 is a schematic diagram of another example mobile power conversion and distribution vehicle.

FIG. 14 schematically illustrates vehicle 220, an example implementation of vehicle 20. Vehicle 220 facilitates bidirectional DC power flow while preventing unsafe direct connection between battery 130 and DC input and output couplings 134 and 136, respectively. Vehicle 220 provides flexible or configurable connections between two power converters to support multiple different operating modes. Vehicle 220 provides reuse of commercial office-the-shelf mechanical power transmission components. In the example illustrated, Vehicle 220 utilizes 14 total power semiconductor switches (seven per converter).

As shown by FIG. 14, vehicle 220 comprises frame 122, PTO 126 and motor 128 (each of which are described above). Vehicle 220 is specifically illustrated as further comprising transmission 231 and rear drive assembly 232 comprising wheels 124, rear axle 233, differential 235 and brake assemblies 237. Transmission 231 comprises a presently known or future developed transmission operably coupled between motor 128 and rear axle 233 and the output shaft of PTO 126.

For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

Transmission 231 transmits torque from motor 128 to wheels 124 and PTO 126. Transmission 231 provides user selectable gear ratios or speeds. In one implementation, transmission 231 provides six forward gear ratios and three reverse gear ratios. In other implementations, transmission 231 may have other transmission configurations.

Rear axle or axles 233 support wheels 124 and are operably coupled to transmission 231 to facilitate rotational driving wheels 124 to propel vehicle 220. Differential 235 comprise a conventionally known or future developed differential assembly which allows outer drive wheels to rotate faster than the inner drive wheels during a turn. In particular, differential 235 comprises a gear train configured such that the angular velocity of the carrier is the average angular velocity of left and right output shafts. In some implementations, differential 235 is omitted.

Brake assemblies 237 comprising a disc brake or a future developed brake assembly facilitating braking of wheels 124. The example illustrated, braking assemblies 237 comprise disc brakes, having a brake disk which is frictionally engaged by a brake pad. In other implementations, brakes and pads 237 may comprise other break configurations.

As further shown by FIG. 14, vehicle 220 comprises electric power module 300. Electric power module 300 comprises a removable module, a module that is releasably secured to frame 122. Module 300 may be separated and removed from frame 122 and the remaining components of vehicle 220. In one implementation, electric power module 300 is removably securable upon a bed provided by frame 122 by latches, fasteners, clamps, straps or the like.

In the example illustrated in FIG. 14, electric power module 300 comprises battery 130, DC input coupling 134, DC output coupling 136, AC input coupling 138, and AC output coupled 140, described above. The example illustrated, battery 130 comprises a 10 kW 250 V battery. In other implementations, battery 130 may have other configurations.

Vehicle 220 additionally comprises power conversion system 344, a specific implementation of power conversion system 144 described above. Power conversion system 344 comprises converter 346, 348, DC relay 350, AC relays 352, 354, 356, motor relay 358, pack contactors 360 and line filter 362. Converters 346, 348 provide bidirectional flow between AC and DC power domains. In the example illustrated, each of converters 344, 346 comprises a logical circuit comprising seven semiconductor switches 364, two capacitors 366, and two inductors 368 connected as illustrated. In the example illustrated, each of converters 346, 348 has a 75 amp peak with a continuous rating of 50 amps. In other implementations, converters 346, 348 may have other capacities. In other implementations, converters 246, 348 may have other commercially available or future developed circuit configurations and other circuit capabilities.

Relays 350, 352, 354 and 356 serve as switching devices. Pack contactors 360 facilitate connection between battery 130 and the remaining components of module 300. Such contactors facilitate disconnection upon detection of a collision and provide electrical isolation of battery 130. In some implementations, pack contactors 360 may be omitted.

Line filter 362 comprises an electronic filter place between electronic converters of module 300 and AC output coupling 140. Line filter 362 attenuates switching harmonics, conducted radio frequencies, and electromagnetic interference between the line of AC output coupling 140 and module 300. In some implementations, line filter 362 is omitted.

Figure 15:
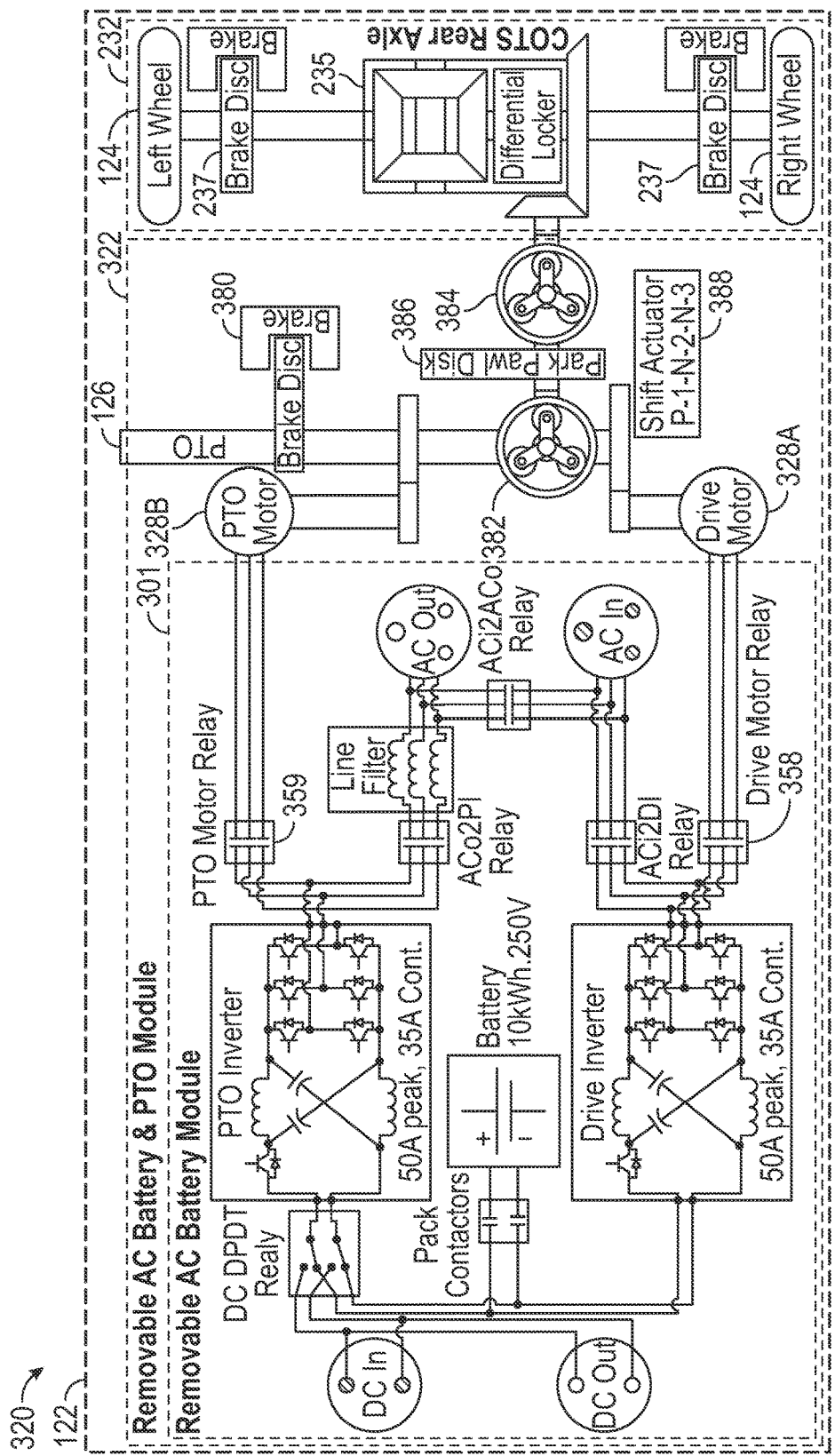
FIG. 15 is a schematic diagram of another example mobile power conversion and distribution vehicle.

FIG. 15 schematically illustrates vehicle 320, another example implementation of vehicle 20. Vehicle 320 is similar to vehicle 220 except that vehicle 320 comprises separable, removable or independent PTO module 322. Those remaining components are elements of vehicle 320 which correspond to components are elements of vehicle 220 are numbered similarly.

PTO module 322 comprises an independent unit which is removably or releasably secured to frame 122 of vehicle 320. In one implementation, PTO module 322 is releasably or removably secured to frame 122, such as upon a bed of vehicle 320, by fasteners, clamps, latches, straps or the like. When secured upon frame 122, PTO module 322 makes connection with rear drive assembly 232, facilitating driving of rear drive assembly 232 and PTO 126 by electric power module 300. When removed from frame 122, PTO module 322 facilitates continued use and powering of PTO 126 by module 300 independent of the rest of vehicle 20, frame 122 and rear drive 232. As a result, the PTO of module 322 provides enhanced versatility.

In the example illustrated, PTO module 322 supports removable electric power module 301. Module 301 is similar to module 300 described above except that module 301 additionally comprises relay 359 for releasable connection to PTO module 322. Module 301 is separable and removable from PTO module 322 and PTO module 322 is separable and is removable from the remainder of vehicle 320. As a result, module 301 is usable with and interchangeable amongst different vehicles, such as vehicle 220 and vehicle 320. In other implementations, electric power module 301 is not removable, but as an integrated part of module 322. In yet other implementations, PTO module 322, with removable module 301 or with an integrated module 301, is also integrated as part of vehicle 320, not being removable from or separable from frame 122 and rear drive assembly 232 of vehicle 320. For purposes of this disclosure, the term "removable" means that the removable component is removable as a unit without requiring disassembly of the larger assembly comprising the unit, wherein connection of the unit to the larger assembly, without additional modification of the larger assembly or the unit, renders the larger assembly usable with the unit.

In the example illustrated, PTO module 322 comprises two separate motors 328A and 328B in place of motor 128 of vehicle 220 and additionally comprises PTO brake assembly 380, planetary gears 382, 384, Park Pawl disc 386 and shift actuator 388. Motor 328A is releasably connected to motor relay 358 by a plug and port connection. Motor 328A is operably coupled to planetary gear 382. Motor 328B is releasably connected to relay 359 of module 301 by a plug and port arrangement. Motor 328B is operably coupled to PTO 126 to drive PTO 126 independent of the speed at which motor 328A drives rear drive assembly 232.

PTO brake assembly 380 provides controlled braking of PTO 126 and supplies reaction torque to enable both motor 328A and 328B to supply torque to the wheels. In the example illustrated the brake system comprises a brake disk in contact with a brake pad in a brake caliper. In other implementations, brake assembly 380 may have other configurations.

Planetary gear set 382 receives power from both motors 328A and 328B. Shift actuator 388 provides user controlled actuation of planetary gear sets 382 and 384 to provide up to four different drive ratios plus neutral and park for rear drive assembly 232. Park pawl disc 386 serves as a brake/clutch to disconnect planetary gear sets 382 and 384 such that PTO 126 may be driven with torque from both motors 328A and 328B while rear drive assembly 232 remains inactive. In the example illustrated, planetary gear sets 382 and 384 provide automated shifting to minimize gear stages, reduce operator workload, and improve efficiency. In other implementations, other forms of clutching mechanisms are employable between planetary gear sets 382 and 384. In yet other implementations, PTO transmission 322 may have other configurations that provide independent driving or powering of PTO 126 and rear drive assembly 232 as well as automated or manual shifting.

Figure 16:
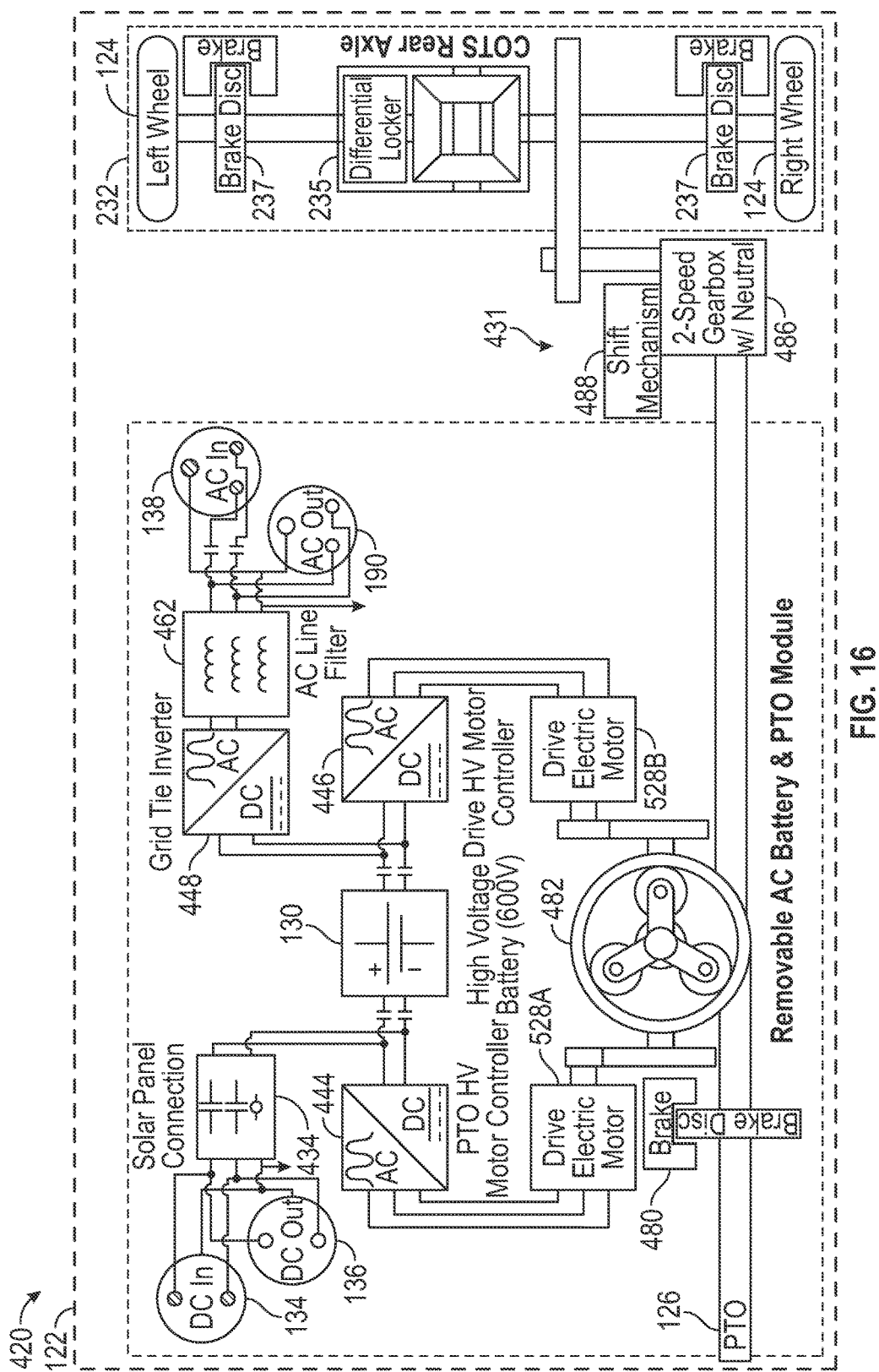
FIG. 16 is a schematic diagram of another example mobile power conversion and distribution vehicle.

FIG. 16 illustrates vehicle 420, another example implementation of vehicle 20. Vehicle 420 is based on an electrical-to-mechanical-to-electrical conversion process which uses gearing and dual motors to shift DC voltage levels. Vehicle 420 comprises frame 122 and rear 232 (described above), power and PTO module 422 and transmission 431. Power and PTO module 422 selectively drives PTO 126 and provides power or torque to reardrive 232 via transmission 431. In the example illustrated, power and PTO module 422 comprises a removable, independently operable module or unit that can be separated or removed from frame 122 and operated independently of reardrive 232 and transmission 431, providing a stationary source of torque via PTO 126 powering the pump, mill, or other PTO driven device. In other implementations, the components of PTO module 422 are alternatively integrated as part of vehicle 420.

Power and PTO module 422 comprises battery 130, DC input coupling 134, DC output coupling 136, AC input coupling 138, AC output coupling 140, solar panel connection 434, three-phase inverters 444, 446, 448, motor 528A, motor 528B, AC line filter 462, PTO brake assembly 480 and planetary gear set 482. Battery 130, DC input coupling 134, DC output coupling 136, AC input coupling 138 and AC operably coupling 140 are described above. In the example illustrated, battery 130 comprises a high-voltage 600 V battery. In other implementations, battery 130 may have other configurations.

Solar panel connection 434 comprises a connector configured to releasably connect to a power output of a solar panel or solar panel array. Solar panel connection 434 receives DC power from the connected solar panel or solar panel array. In some implementations, connection 434 is omitted, wherein connection to the solar panel or solar panel array is made via DC input coupling 134.

Inverters 444, 446, 448 are similar to power converters 344, 346 described above but lack integral boost capability. In the example illustrated, each of inverters 444, 446, 448 comprises a commercially available three-phase inverter. In the illustrated each of inverters 444, 446, 448 utilizes six power semiconductor switches to convert between AC and DC power domains. In the example illustrated each of inverters 444, 446 and 448 comprise a 10 kW power inverter, commercially available from agricultural and heavy truck inverter suppliers. In other implementations, other or custom built three-phase power inverters may be used.

Inverter 444 serves as a PTO high-voltage motor controller for PTO motor 528A. Inverter 446 serves as a high-voltage drive motor controller for rear-drive electric motor 528B. Inverter 448 serves as a grid tie inverter for AC input coupling 138 and AC output coupling 140.

Motors 528A and 528B are similar to motors 328A and 328B described above. Motors 528A and 528B cooperate to drive planetary gear set 482 which drives PTO 126 and/or reardrive assembly 232 via transmission 431. AC line filter 462 is similar to filter 362. AC line filter 462 comprises an electronic filter place between electronic components of module 300 and AC output coupling 140. Line filter 362 attenuates conducted radio frequencies and electromagnetic interference between the line of AC output coupling 140 and module 300. In some implementations, line filter 362 is omitted. Brake assembly 480 is similar to brake assembly 380 described above.

Transmission 431 operably coupled the output of planetary gear 482 to rear drive 232. As schematically illustrated in FIG. 16, transmission 431 comprises a two speed gearbox with a neutral 486 with an associated shift mechanism 488. Transmission 431 allows an operator to power rear drive assembly 232. In other implementations, transmission 431 may provide greater or fewer of such available gears or speeds.

Figure 17:
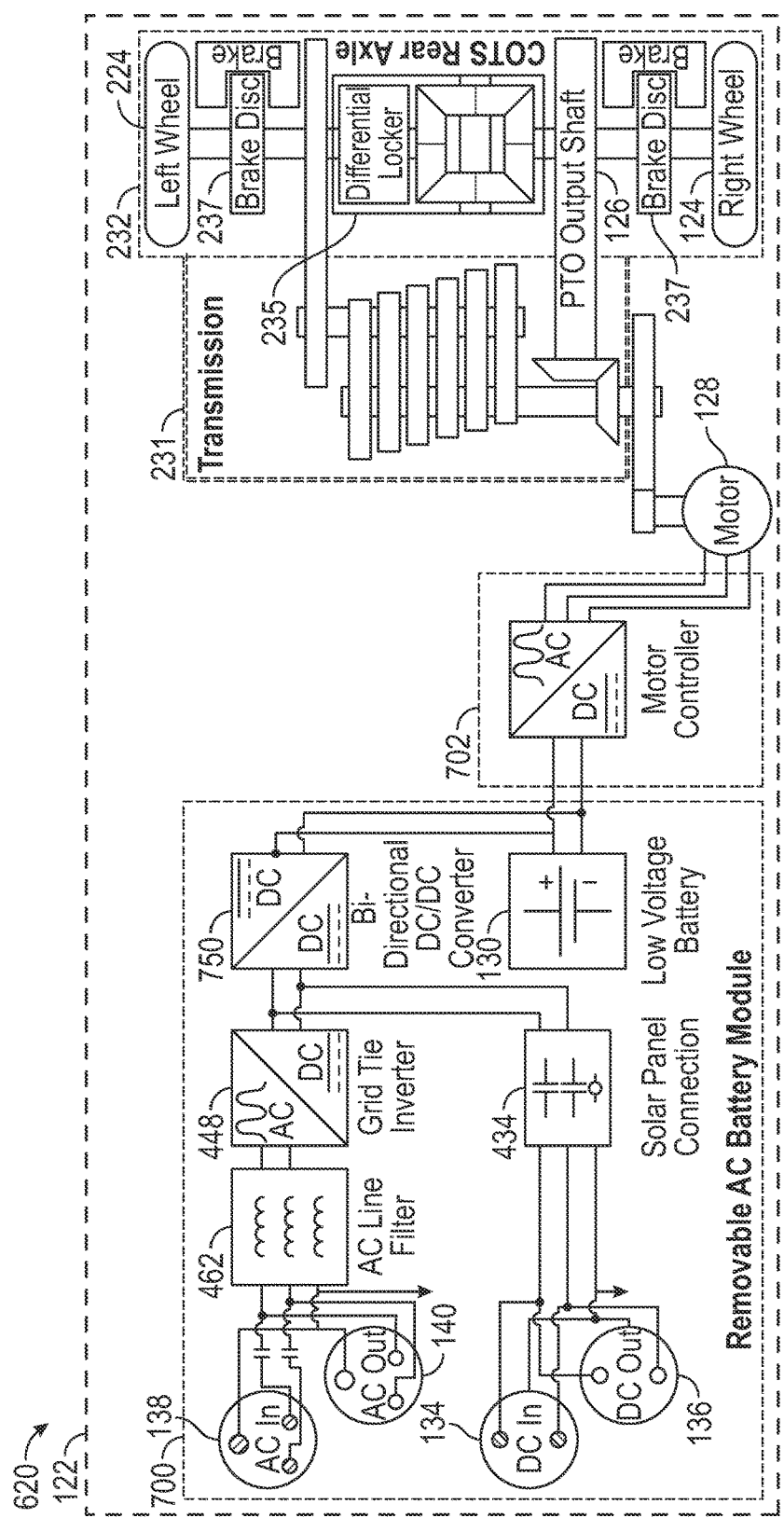
FIG. 17 is a schematic diagram of another example mobile power conversion and distribution vehicle.

FIG. 17 schematically illustrates vehicle 620, another example implementation of vehicle 20. Vehicle 620 is similar to vehicle 220 except that vehicle 620 comprises power module 700 in place of power module 300 and additionally utilizes motor controller 702. Power module 700 comprises battery 130 DC input coupling 134, DC output coupling 136, AC input coupling 138, AC output coupling 140, solar panel connection 434, inverter 446, DC/DC converter 750 and AC line filter 462 (described above). Battery 130 comprises a low-voltage battery having an output of less than or equal to 100 V and nominally 48 V. As schematically shown by FIG. 17, low-voltage battery 130 is directly accessible from module 700 via external ports, plugs or cables.

In the example illustrated, inverter 448 serves as a grid tie inverter. Converter 750 is electrically connected between inverter 448, battery 130 and controller 702. Converter 750 bi-directionally converts DC power between different voltages. Regenerative braking energy captures by motor 128 can be used to charge battery 130. Power from battery 130 can be boosted to above the desired AC output peak voltage level via converter 750, resulting in grid-tie inverter 448 not requiring an integral boost functionality and only requiring six switches. High voltage solar panel DC input or rectified high voltage AC input can be bucked down to voltage levels suitable for charging battery 130 via bi-directional converter 750. In the example illustrated, module 700 comprises 16 total power semiconductor switches with six switches for inverter 448 and controller 702 and four for converter 750.

Figure 18:
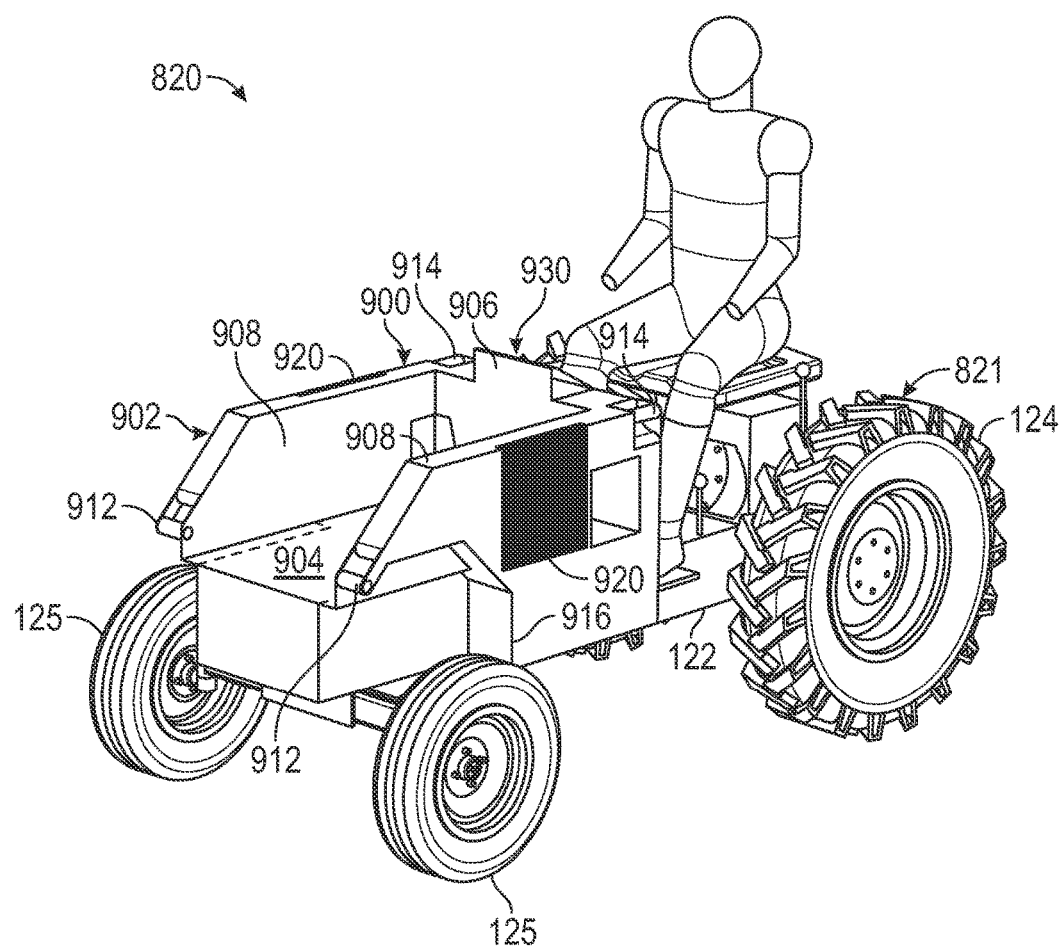
FIG. 18 is a perspective view of another example mobile power conversion and distribution vehicle having an example electric power module.
Figure 19:
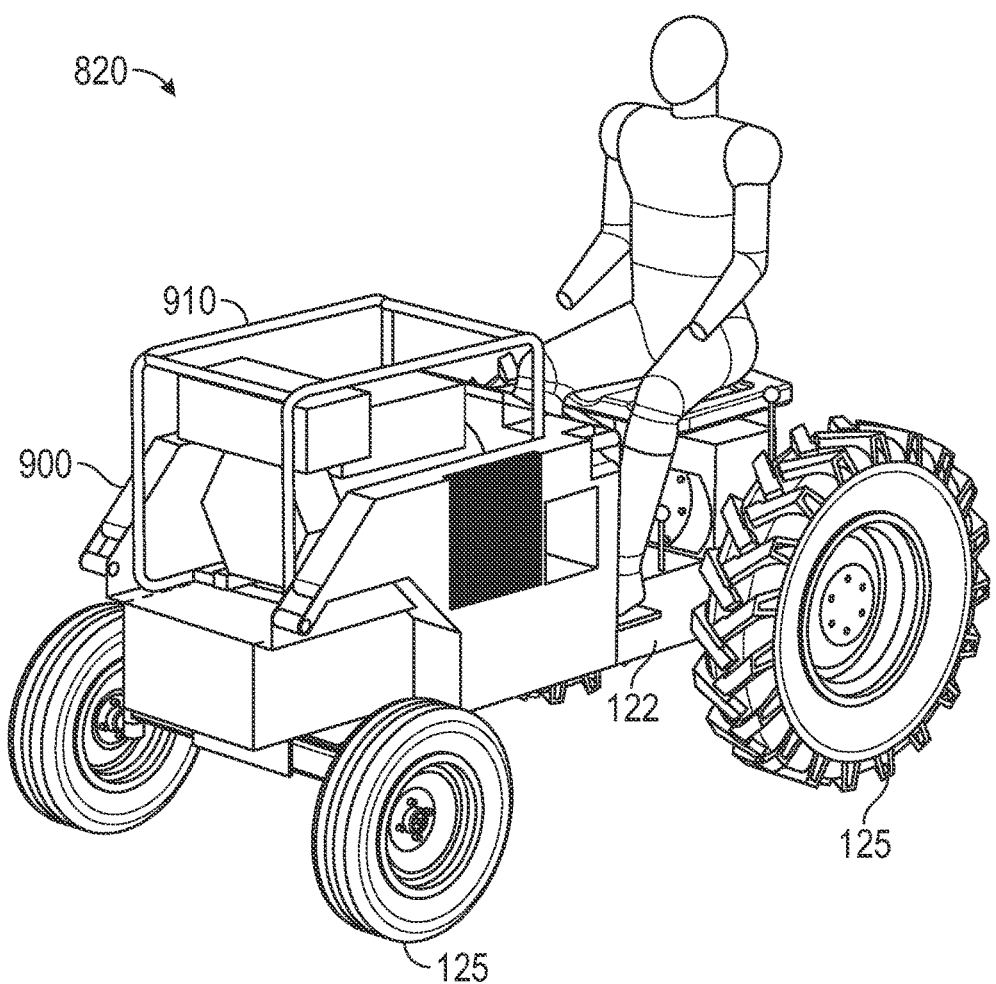
FIG. 19 is a perspective view of the vehicle FIG. 18 with the electric power module carrying a generator.
Figure 20:
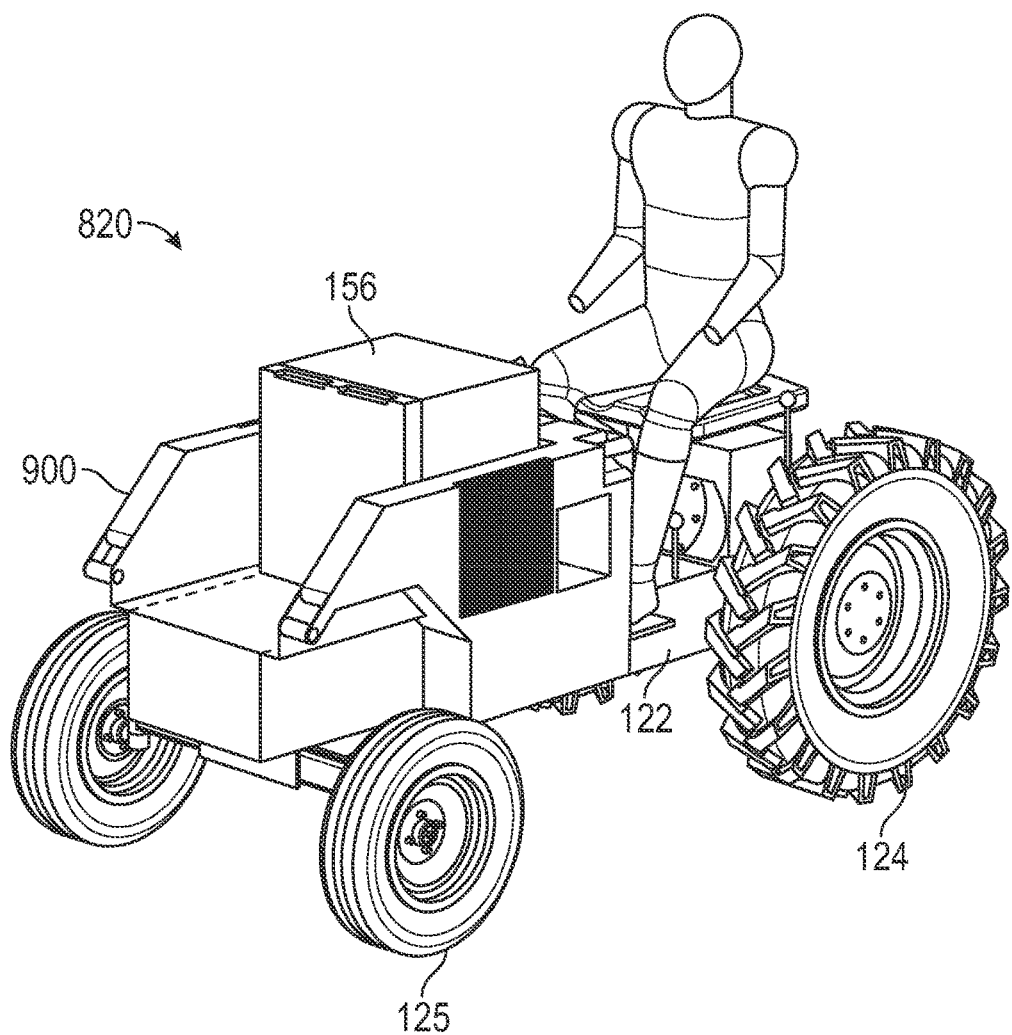
FIG. 20 is a perspective view of the vehicle of FIG. 18 with the electric power module carrying a refrigeration unit.

Motor controller 702 comprises a commercially available existing traction drive inverter/motor controller. For example, in one implementation, motor controller 702 comprises a 10 kW drive commercially available from various golf-cart and utility equipment suppliers. Motor controller 702 receives DC power from battery 130 or converter 750 and convert such DC power to AC power at an appropriate voltage for controlling and driving motor 128 which drives rear drive assembly 232 via transmission 231. Because motor controller 702 is provided external to power module 700, the cost and complexity of the stand-alone power module 700 is reduced. FIGS. 18-20 illustrate vehicle 820, an example implementation of vehicle 20, 220, 424 or 620. As shown by FIG. 18, vehicle 820 comprises drive unit 821 and electric power module 900. Drive unit 821 removably supports electric power module 900 such that drive unit 821 is interchangeable with various different electric power modules 900. Drive unit 821 receives power from electric power module 900 and utilizes such power to drive or move from one location to another, carrying module 900. In some implementations, drive unit 821 further utilize such power to drive a power takeoff. In the example illustrated, drive unit 821 comprises frame 122 as well as PTO 126 and motor 128 (each of which are described above). Drive unit 821 further comprises transmission 231 and rear drive assembly 232 comprising wheels 124, rear axle 233, differential 235 and brake assemblies 237 (each of which is described above with respect to vehicle 220 and FIG. 14).

Electric power module 900 comprises a removable module, a module that is releasably secured to frame 122 such that module 900 may be separated and removed from frame 122 and the remaining components of vehicle 820. In one implementation, electric power module 300 is removably securable upon a bed provided by frame 122 by latches, fasteners, clamps, straps or the like.

In the example illustrated in FIG. 18, electric power module 900 comprises battery 130, DC input coupling 134, DC output coupling 136, AC input coupling 138, and AC output coupled 140 as described above. Electric power module 900 additionally comprises power conversion system 344, described above, wherein system 344 comprises converter 346, 348, DC relay 350, AC relays 352, 354, 356, motor relay 358, pack contactors 360 and line filter 362.

As shown by FIGS. 18-20, electric power module 900 is shaped in size to form a bed 902 comprising a floor 904 for supporting and carrying cargo. In the example illustrated, bed 902 is additionally surrounded by a rear wall 906 and opposing sidewalls 908 to form a cargo hold surrounded on three sides. In one implementation, bed 902 is additionally bordered by a fixed upstanding front wall (not shown) opposite rear wall 906 or an end gate opposite to rear wall 906, wherein the end gate is hinged so as to pivot to an open position or slidable for removal to facilitate loading of cargo or payload. As shown by FIGS. 19 and 20, bed 904 and the surrounding walls 906, 908 are configured to contain and hold cargo that either supplies power to vehicle 900 or that consumes power provided by vehicle 820. For example, FIG. 19 illustrates the formed cargo hold of module 300 containing generator 154 (described above), wherein generator 154 is plugged into electric power module 900. FIG. 20 illustrates the formed cargo hold of module 900 containing refrigeration unit 156 (described above), wherein refrigeration unit 156 is plugged into our connected to module 900 to be powered by module 900 to providing refrigerated transport.

Figure 21:
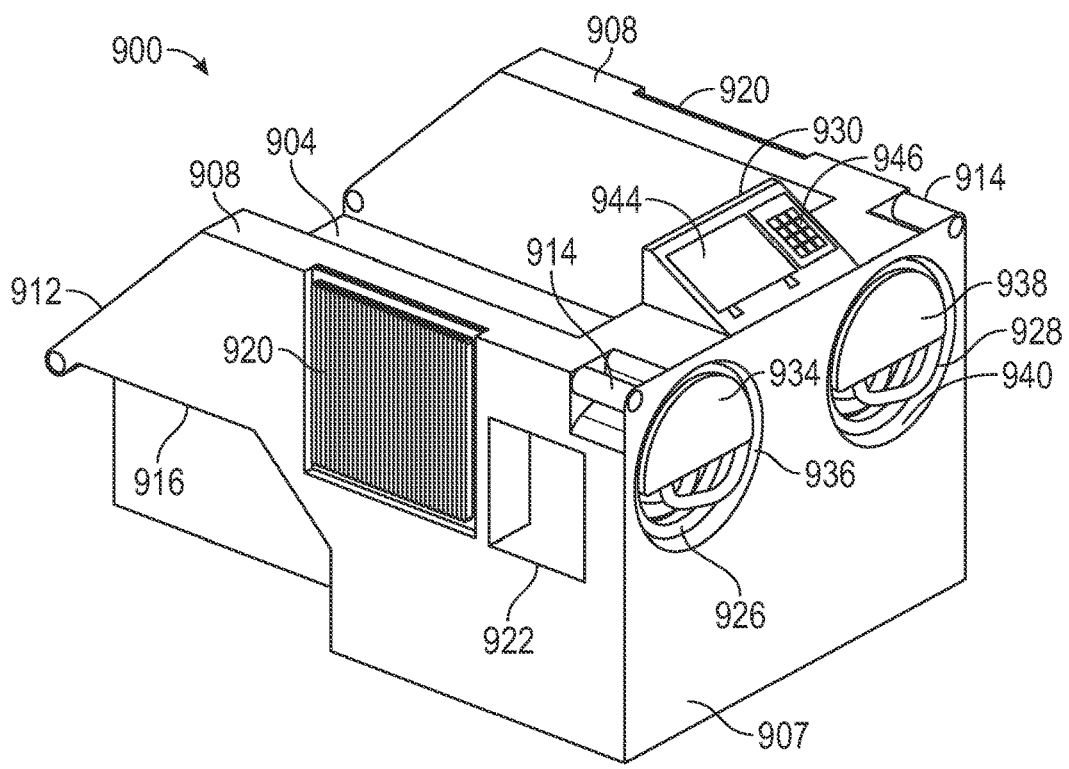
FIG. 21 is a front perspective view of another example electric power module for use with the vehicle of FIG. 18.
Figure 22:
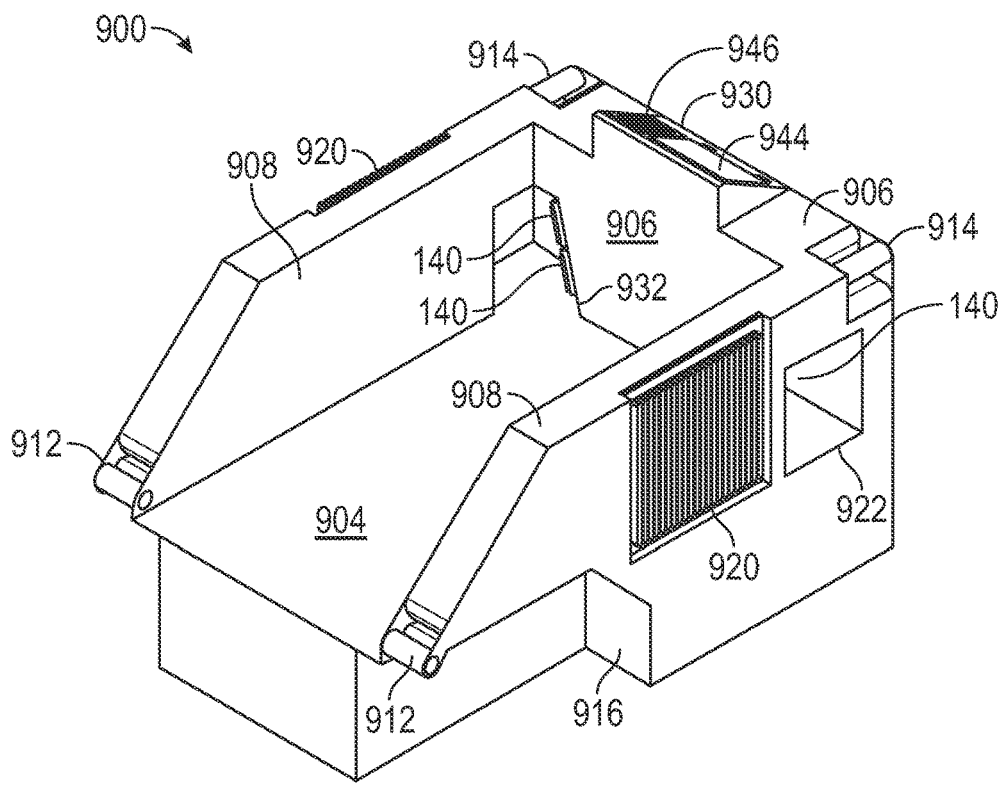
FIG. 22 is a rear perspective view of the electric power module of FIG. 21.

FIGS. 21 and 22 illustrate electric power module 900 disconnected and lifted or separated from frame 122. As shown by FIGS. 21 and 22, electric power module 900 comprises front lift handles 912, rear lift handles 914, wheel wells 916, heat sinks 920, AC output access openings 922, DC cable 926, AC cable 928 and control console 930. Front lift handles 912 and rear lift handles 914 facilitate manual lifting of module 900. Front lift handles 912 are located at a front-end of module 900 on opposite side corners of bed 904 while rear lift handles 914 are located at a rear of module 900 on opposite side corners of module 900. In the example illustrated to each of handles 912, 914 comprises a tube or cylinder located within an opening, the tubular cylinder being sized (a diameter of at least 1 inch) to be manually gripped by a person's hand. The front cylinders forming front lift handles 912 extend along a transverse axis while the cylinders forming rear lift handles 914 extend along longitudinal axes. As a result, handles 912 facilitate lifting from a front end of module 900 while handles 914 facilitate lifting from opposite transverse sides of module 900. In other implementations, handles 912, 914 may have other configurations or may be omitted.

Wheel wells 916 comprise cavities or openings formed in the front left and right corners of module 900. Wheel wells 916 extend partially below bed 914 and are sized to receive front wheels 125 of drive unit 821 shown in FIG. 18. Wells 916 partially cover and protect wheels 125 and facilitate a reduced width of vehicle 822 allowing vehicle 820 to travel through constricted spaces. In other implementations, wheel wells 916 are omitted, wherein wheels 125 project beyond the sides of module 900.

Heatsinks 920 comprises heat dissipating structures, such as convoluted sheets of thermally conductive material, such as metal. Heatsinks 920 extend adjacent to heat emitting components of module 900. In the example illustrated, heatsinks 920 extend adjacent to power converters or power inverters 344, 346 to dissipate heat produced by such inverters 344, 346. As shown by FIGS. 21 and 22, heatsinks 920 are recessed within the sidewalls 908 and do not increase the overall footprint or width of vehicle 820.

AC output access openings 922 comprise openings through sidewalls 908, wherein such openings 922 provide axis to oppositely facing AC output couplings 140. In the example illustrated, AC output couplings 140 face opposite transverse directions and are recessed below an upper portion of rear wall 906. As a result, rear wall 906 protects AC output couplings 140, serving as a ceiling or roof for AC output couplings 140. In the example illustrated, AC output couplings 140 are mounted or supported upon angled transverse faces 932 which further inhibits water entrapment. Because AC output axis openings 922 are provided on opposite transverse sides of module 900, AC power may be provided to power recipients on either side of module 900.

As shown by FIG. 21, DC cable 926 comprises an electric power cable by which DC power is supplied to module 900. For example, in one implementation, DC cable 926 comprises a solar panel cable. In the example illustrated, DC cable 926 is integral with module 900, wrapped about a spool 934 extending within a recess or cavity 936 formed on a rear face of rear wall 906.

AC cable 928 comprises an electric power cable by which AC power may be provided by module 900. In the example illustrated, AC cable 928 comprises a three phase AC cable. In the example illustrated, AC cable 928 is integral with module 900, wrapped about a spool 938 extending within a recess or cavity 940 formed on a rear face 907 of rear wall 906.

Control console 930 facilitates control of module 900. Console 930 extends on an upper portion of rear wall 906 and faces rearwardly, facilitating use of console 930 by an operator seated upon vehicle 920 behind module 900. Control console 930 comprises monitor or display screen 944 and keypad 946. In some implementations, display screen 944 is replaced with a cluster of gauges. Display screen 944 facilitates monitoring of the current settings and performance of module 900. Keypad 946 facilitates the input of commands, credentials, authorization keys (such as a PIN code) and the like. In some implementations, keypad 946 may comprise other forms of input such as pushbuttons, slider bars and the like. In one implementation, keypad 946 is omitted, wherein display screen 944 comprises a touch screen.

Figure 23:
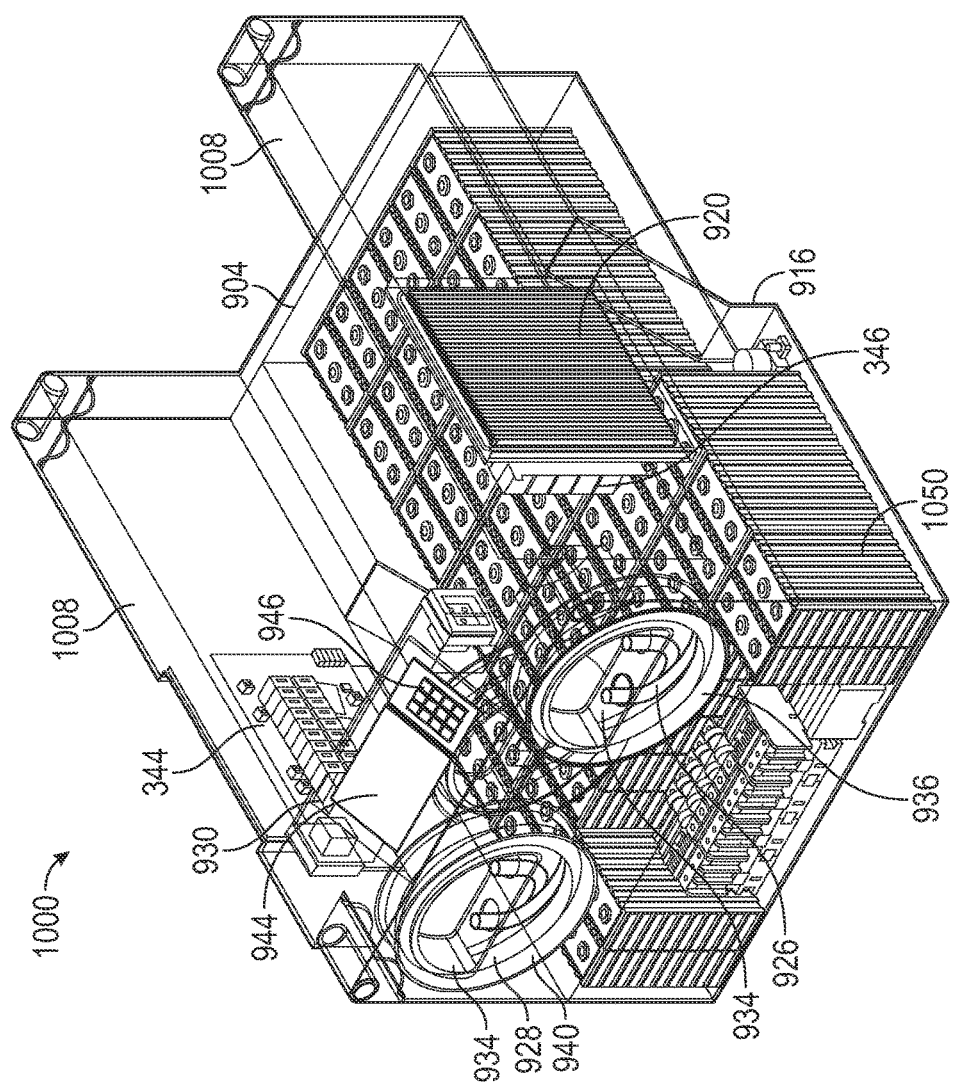
FIG. 23 is a front perspective view of another example electric power module for use with the vehicle of FIG. 18.
Figure 24:
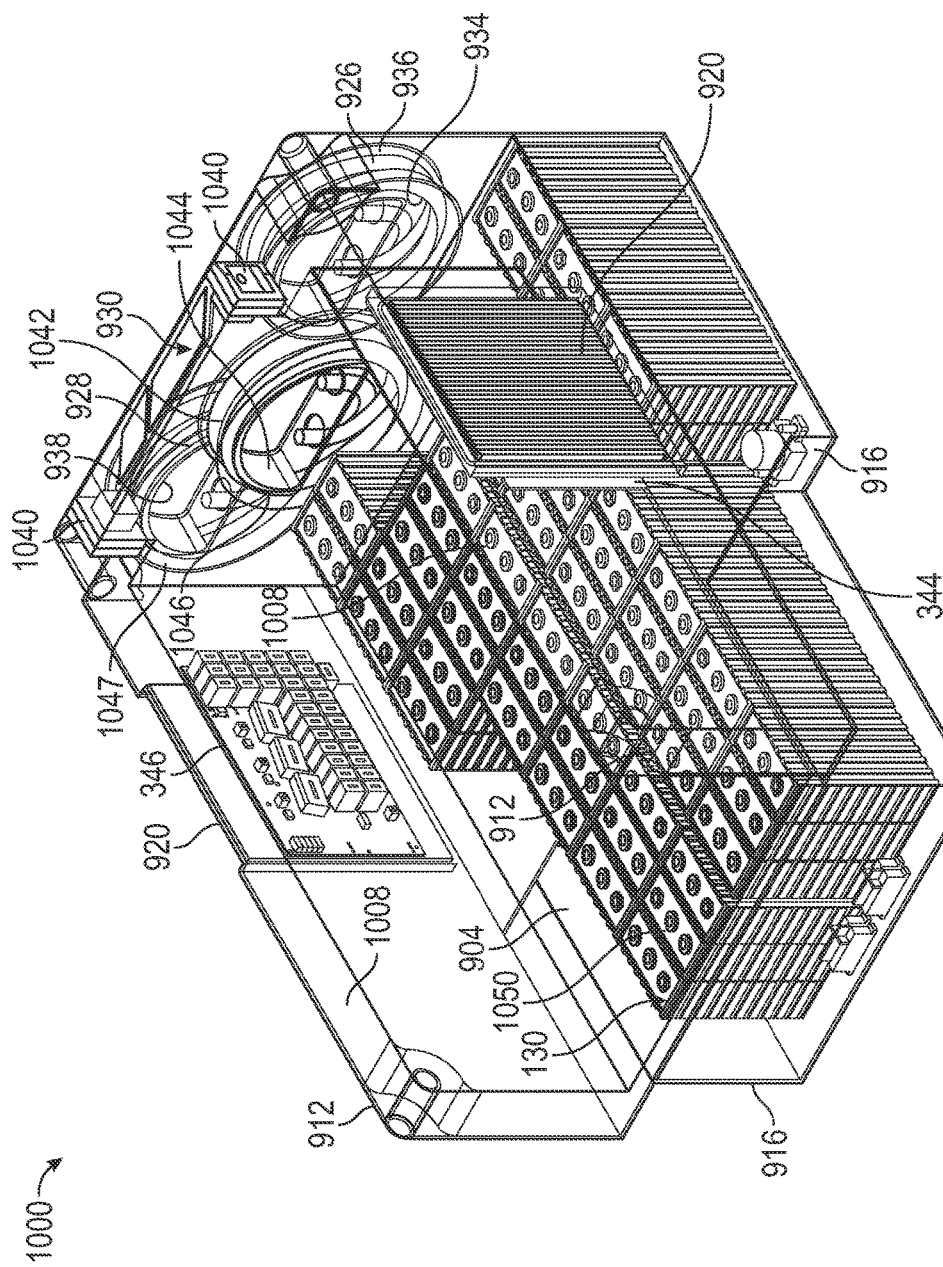
FIG. 24 is a rear perspective view of the electric power module of FIG. 23.

FIGS. 23 and 24 illustrate electric power module 1000, another implementation of power module 900. Electric power module 1000 is similar to electric power module 900 except that module 1000 comprises sidewalls 1008 in lieu of sidewalls 908, comprises AC output couplings 1040 in lieu of AC output couplings 140 and comprises AC charging cord 1042. FIGS. 23 and 24 illustrate electric power module 1000 disconnected and lifted or separated from frame 122. As shown by FIGS. 23 and 24, electric power module 900 comprises front lift handles 912, rear lift handles 914, wheel wells 916, heat sinks 920, DC cable 926, AC cable 928 and control console 930, each of which is described above with respect to electric power module 900.

Sidewalls 1008 are similar to sidewalls 908 exhibit sidewalls 1008 omit tapered ends, increasing the load capacity of bed 902. Lift handles 912 are located at the upper forward most corners of sidewalls 1008. AC output couplings 1040 are similar to AC output couplings 140 except that AC output couplings 1040 are located in opposite sides of console 930, providing more convenient access to such AC output couplings. As a result, sidewalls 1008 further omit AC output axis openings 922.

AC charging cord 1022 comprises an electric power cable by which AC power may be provided by module 1000. In the example illustrated, AC cable 1022 is integral with module 900, wrapped about a spool 1044 extending within a recess or cavity 1046 formed on a front face 1047 of rear wall 906. As a result, cable 1022 is accessible within bed 902 to receive AC power from a generator within bed 902 or from other off-board AC power sources.

FIGS. 23 and 24 are transparently shown so as to illustrate internal electrical power storage and conversion components of electric power module 1000. In some implementations, the illustrated internal electrical power storage and conversion components are also provided as part of electric power module 900 described above or any of the electric power models described in the present disclosure. As shown by FIGS. 23 and 24, module 1000 comprises power inverters or converters 344, 346 described above. As further shown by such figures, electric power module 1000 comprises a battery 130 in the form of a layout of lithium ion storage cells 1050. In one implementation, battery 130 comprises a layout of forty eight 90 Ah $LiFePO_4$ cells with a 13.8 kWh Nameplate and a 178Vmax-154Vnom-134Vmin rating.

Figure 25:
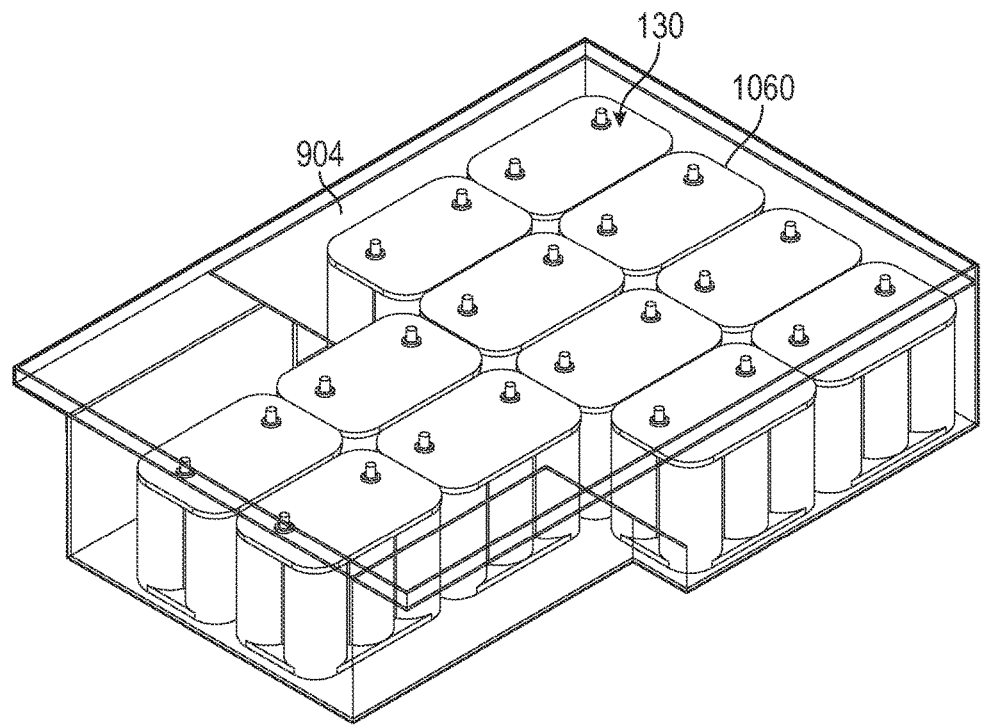
FIG. 25 is a rear perspective view of an example layout for a battery of the vehicle of FIG. 18.
Figure 26:
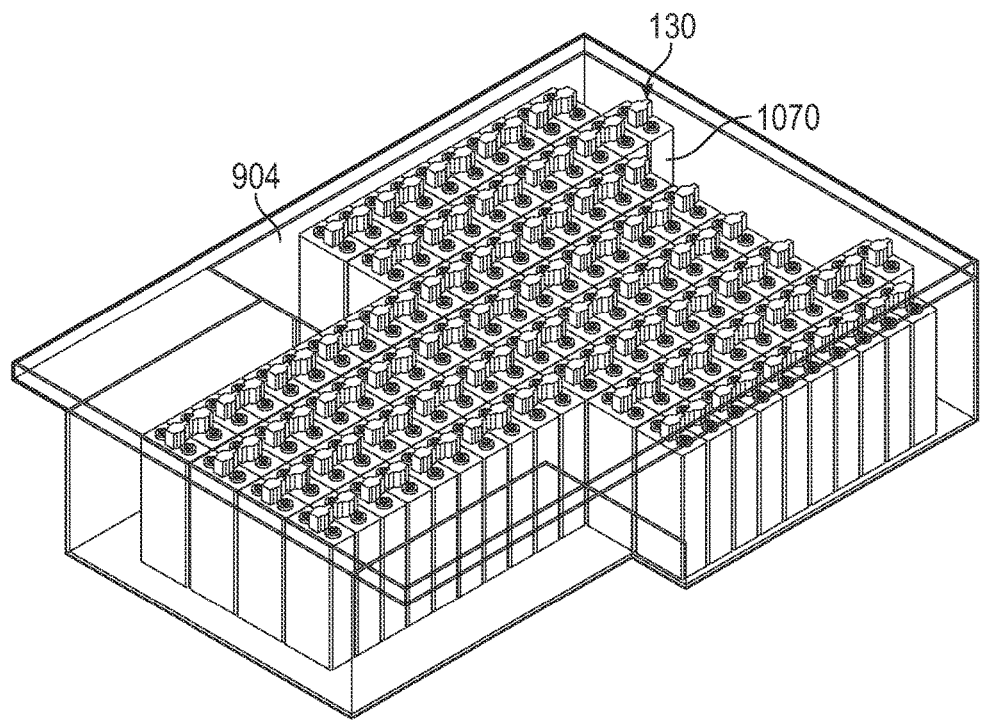
FIG. 26 is a rear perspective view of another example layout for a battery of the vehicle FIG. 18.

FIGS. 25 and 26 illustrate two alternative layouts for battery 134 module 1000, module 900 or any of the electric power models described in the present disclosure. FIG. 25 illustrates battery 130 comprising a layout of lead acid cells 1060. In one implementation, the layout of lead acid cells forming battery 130 comprise twelve 55 Ah lead acid cells having a 7.9 KWh Nameplate and a 173Vmax-144Vnom-126Vmin rating. FIG. 26 illustrates battery 130 comprising a layout of Zinc cells 1070. In one implementation, the layout of Zinc cells forming battery 130 comprise a one hundred and twenty 45 Ah $ZnMnO_2$ cells having a 6.6 KWh Nameplate and a 200Vmax-164Vnom-132Vmin rating.

FIGS. 27-30 illustrate vehicle 1120, another example implementation of vehicle 20. Vehicle 1120 is similar to vehicle 820 except that vehicle 1120 is illustrated as having replaced or interchanging electric power module 900 with electric power module 1000 and that vehicle 1120 comprises frame 1122 in lieu of frame 122 and lighting system 1127. Those remaining components of vehicle 1120 which correspond to components of the above-described vehicles are numbered similarly.

Frame 1122 is similar to frame 122 except a frame 1122 additionally comprises module stop 1131. Module stop 1131 comprises an upstanding structure located so as to extend between the supported module, such as model 900 or module 1000, and the operator seating area of the vehicle. In the example illustrated, module stop 1130 comprises a series of posts or tubes forming a bracket or open framework which contacts and abuts rear wall 906 of the module 900, 1000. In other implementations, module stop 1131 comprises a wall or other structure serving to limit rearward loading of module 900, 1000 upon platform portion 1133 (shown in FIG. 29) of frame 1122.

Figure 27:
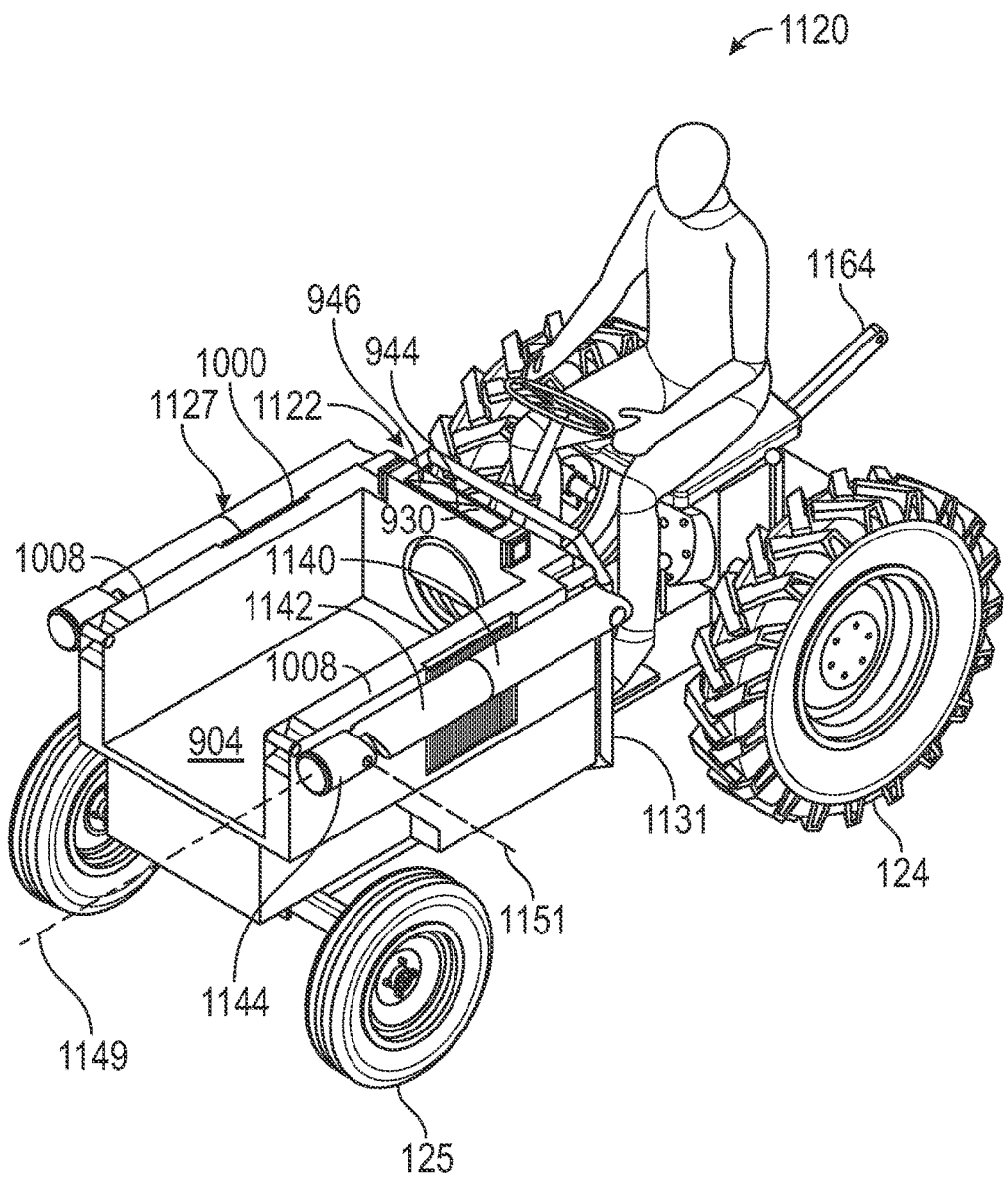
FIG. 27 is a front perspective view of another example mobile power conversion and distribution vehicle.

Lighting system 1127 provides lighting for vehicle 1120. In the example illustrated, lighting system 1127 is supported by module stop 1131. As shown by a comparison of FIG. 27 and FIG. 29, lighting system 1127 comprises a series of pivoting, articulating or rotating members 1140 and 1142 which repositionably support a light emitting member 1144. Articulating member 1140 is pivotally supported by and connected to posts of module stop 1131 to form a first rotary joint for rotation about axis 1147 perpendicular to the longitudinal centerline of member 1140, transverse to the longitudinal axis of vehicle 1120. Member 1142 is rotationally connected to member 1142 form a second rotary joint for rotation about axis 1149, the centerline of member 1142. Light emitting element 1144 is pivotally connected to an end portion of member 1142 to form a third rotary joint for pivotal movement about axis 1151. As shown by FIG. 27, members 1140, 1142 and 1144 are positionable in a first state which light emitting member 1144 emits light in a forward direction alongside module 900, 1000, from a height below a top of side walls 1008. Alternatively, members 1140, 1142, 1144 are repositioned to the state shown in FIG. 29 in which light emitting members 1144 are raised to project light from a much higher location above a top of module 900, 1000, rearward of module 900, 1000.

Figure 31:
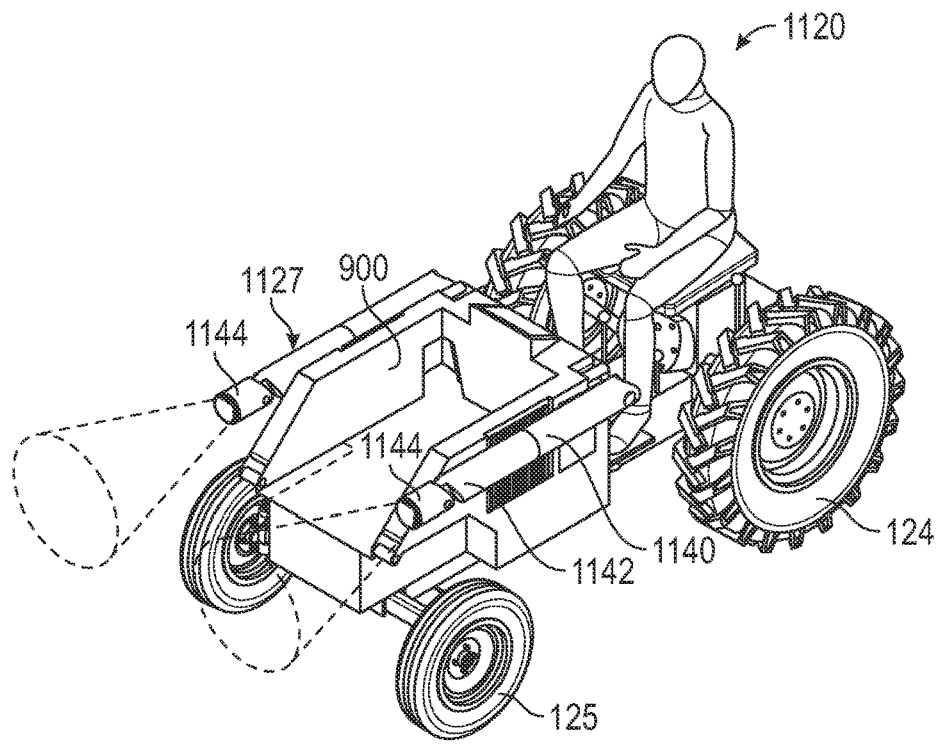
FIGS. 31-34 illustrate the vehicle of FIG. 27 supporting an alternative electric power module and with an example light system in different states.
Figure 32:
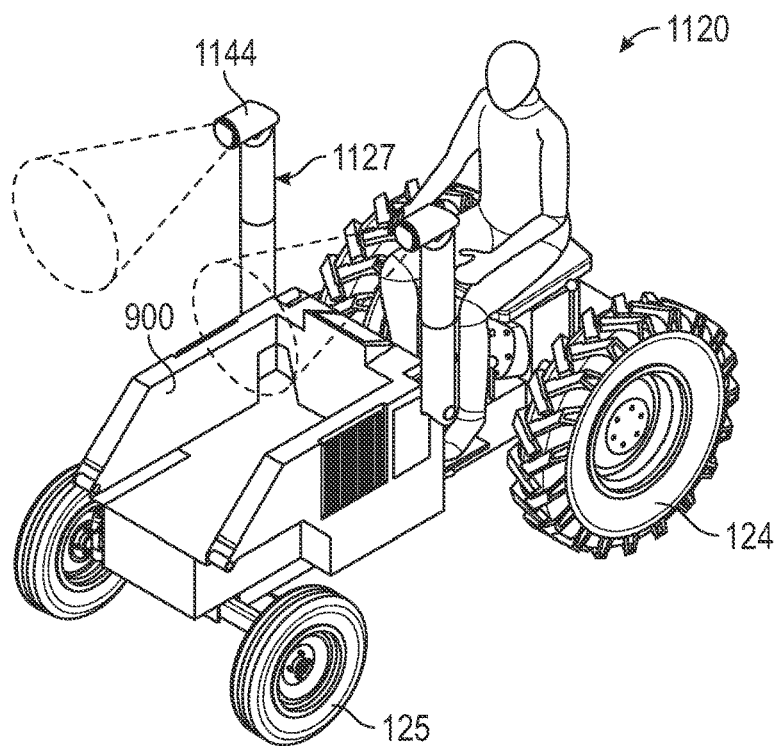
Figure 33:
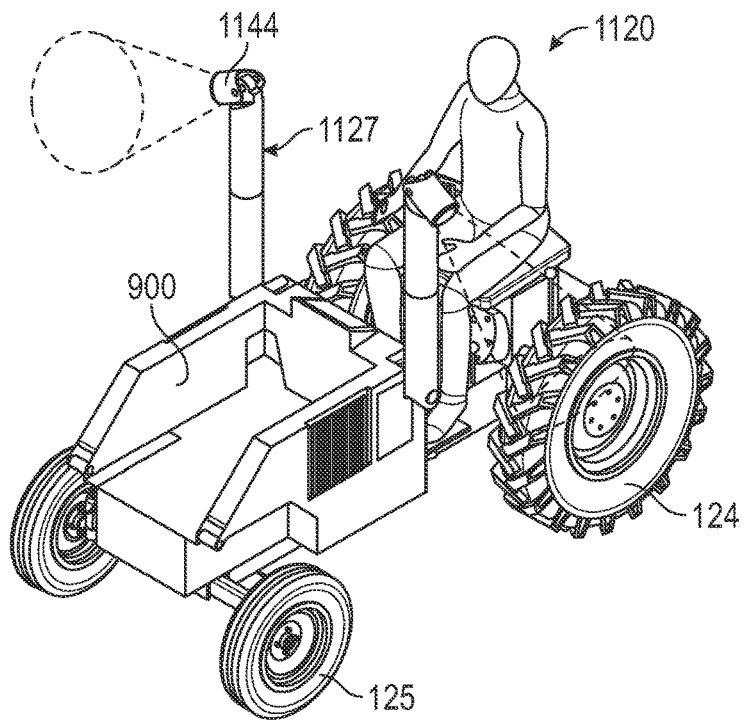
Figure 34:
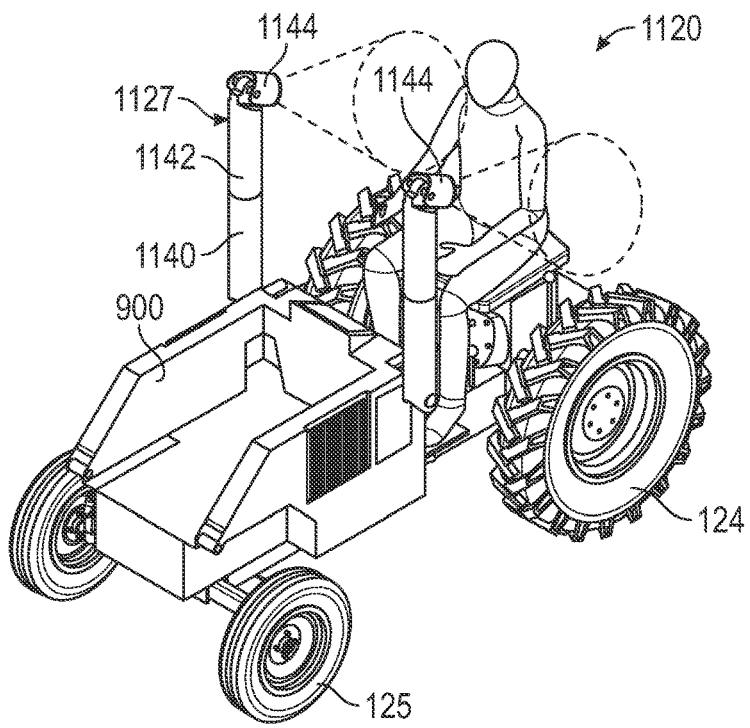

FIGS. 31-34 illustrate vehicle 1120 comprising module 900 in lieu of module 1000 with lighting system 1127 in various lighting orientations or states. FIG. 31 illustrate lighting system 1127 in a low-beam state. FIG. 32 illustrates lighting system 1127 and a high-beam state. FIG. 33 illustrates lighting system 1127 in a floodlight state in which member 1142 is rotated about axis 1149 to direct or project light in transverse or sideways directions. FIG. 34 illustrates lighting system 1127 in a rear lighting state in which member 1142 is rotated about axis 1149 and light emitting members 1144 are rotated about axis 1151 to direct light rearward of vehicle 1120 towards the ground.

Figure 35:
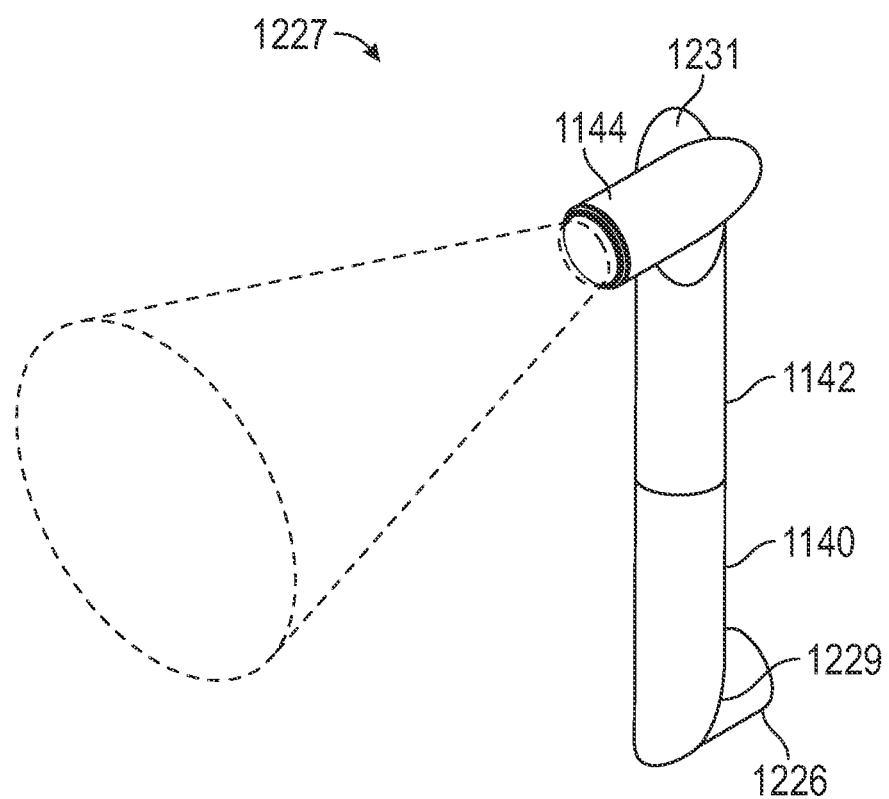
FIG. 35 is a perspective view of a portion of another example light system for the vehicle of FIG. 27.
Figure 36:
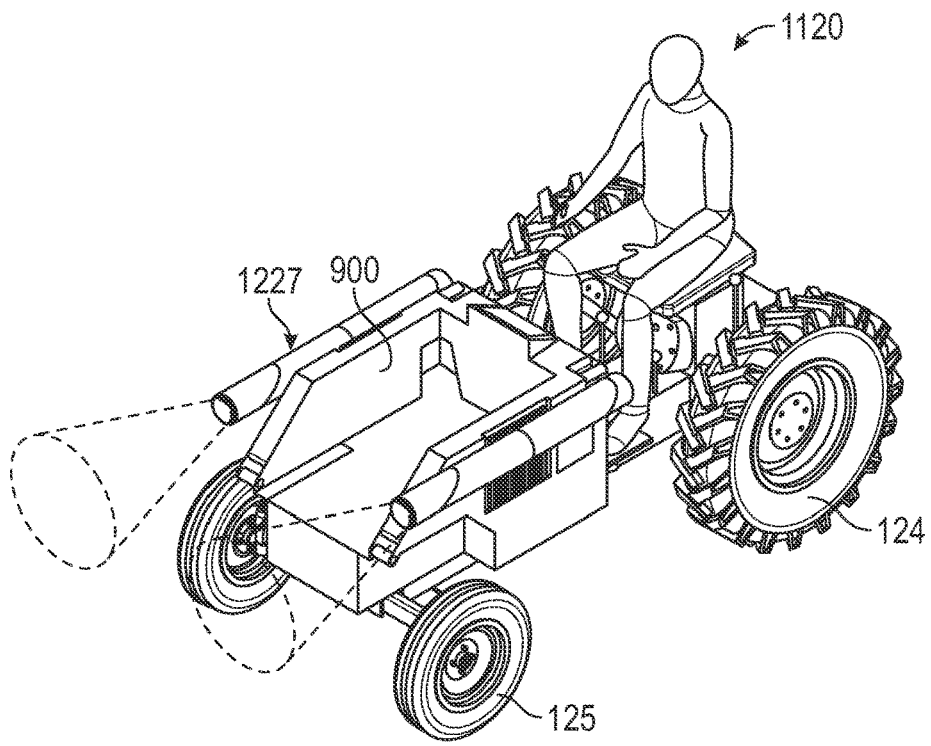
FIGS. 36-39 illustrate the vehicle of FIG. 27 supporting an alternative electric power module and with the light system of FIG. 35 in different states.
Figure 37:
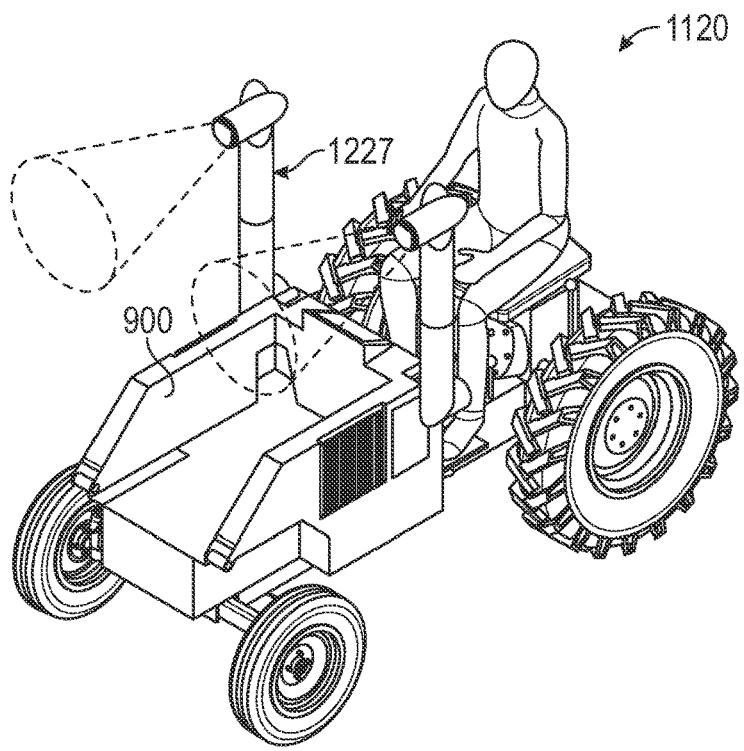
Figure 38:
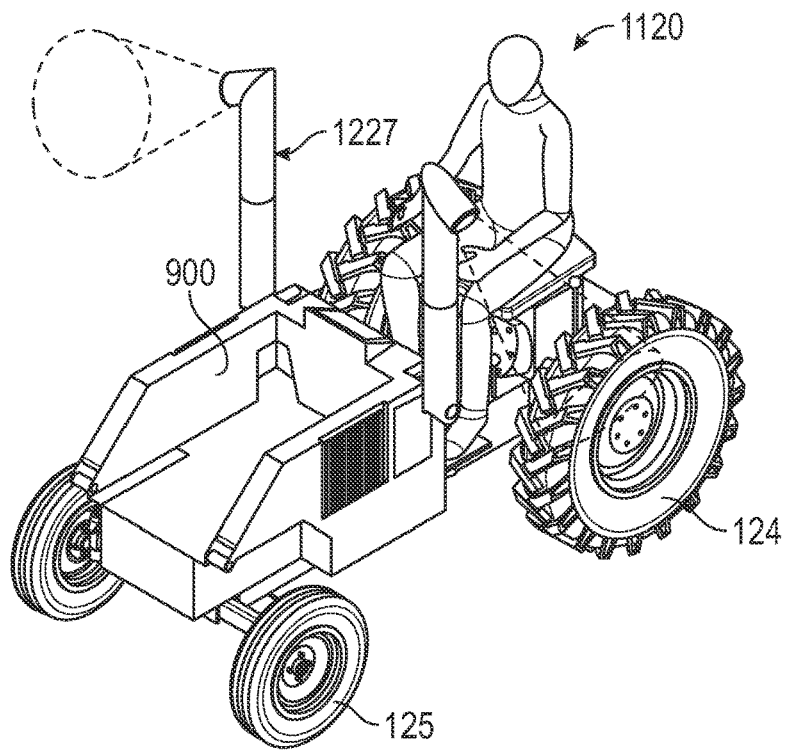
Figure 39:
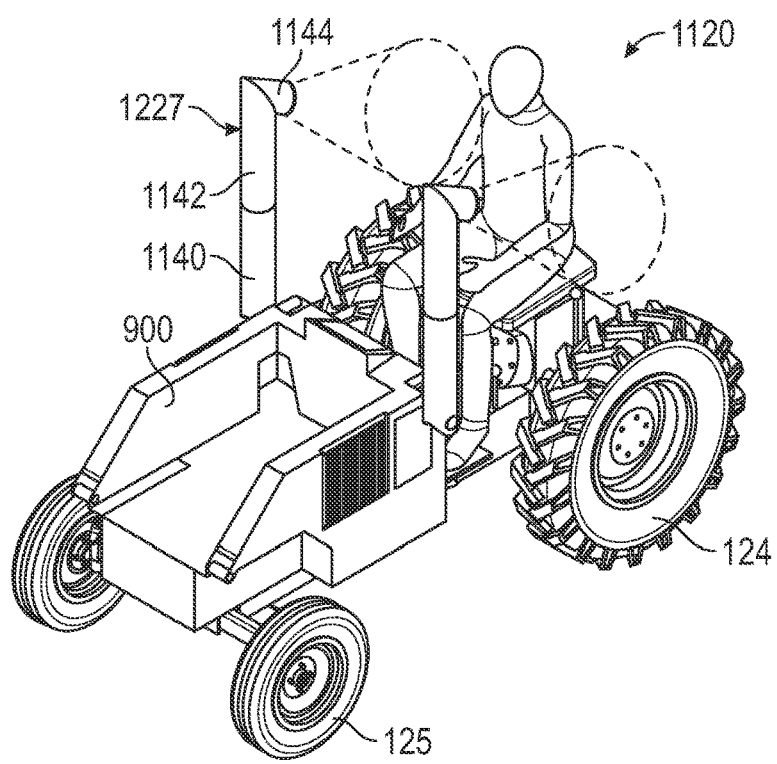
Figure 40:
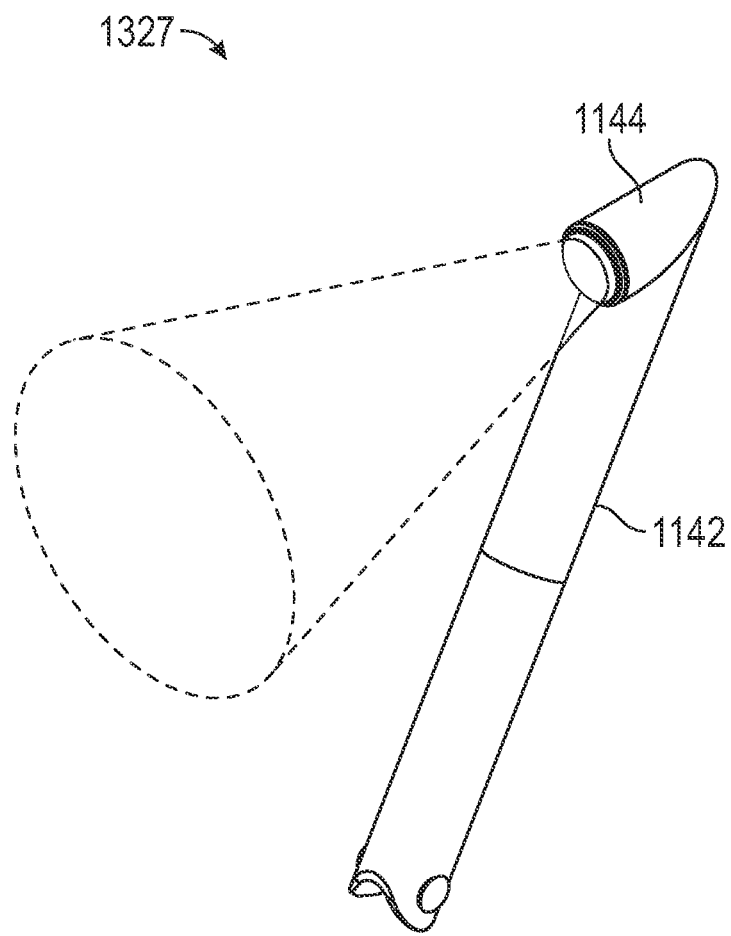
FIG. 40 is a perspective view of a portion of another example light system for the vehicle of FIG. 27.
Figure 41:
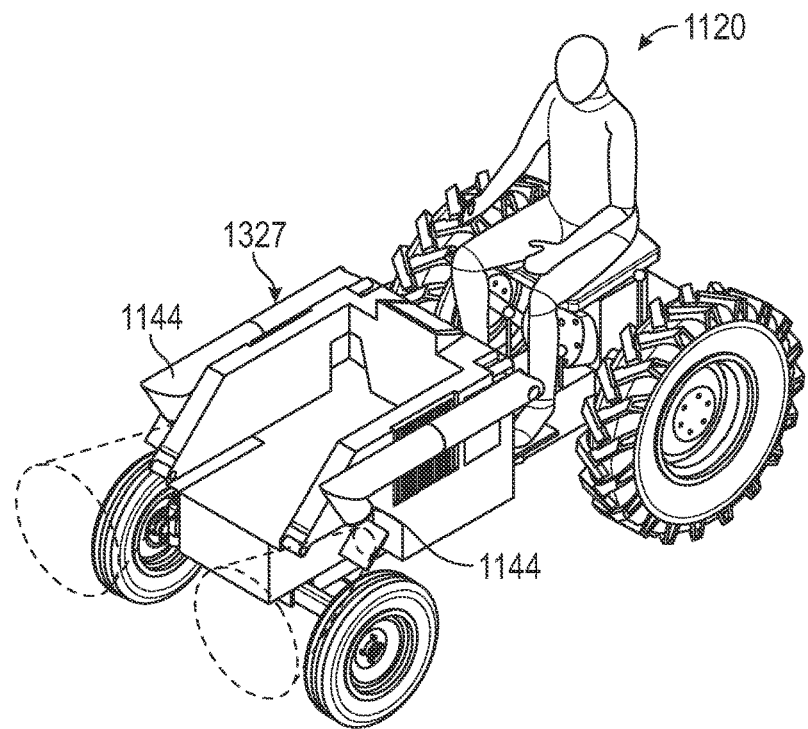
FIGS. 41-44 illustrate the vehicle of FIG. 27 supporting an alternative electric power module and with the light system of FIG. 41 in different states.

FIGS. 35-40 illustrate lighting system 1227, an alternative implementation of lighting system 1127. FIG. 35 illustrates one side of lighting system 1227. As shown by FIG. 35, lighting system 1227 is similar to lighting system 1127 except that lighting system 1227 additionally comprises a mounting structure 1228 extending from module stop 1131. Member 1140 is rotationally connected to mounting structure 1228 along an angled joint 1229. Likewise, light emitting member 1144 is rotationally connected to member 1142 about angled joint 1231. FIGS. 36-40 illustrate lighting system 1227 in the low beam state, high beam state, floodlight state and rear lighting state, respectively.

Figure 42:
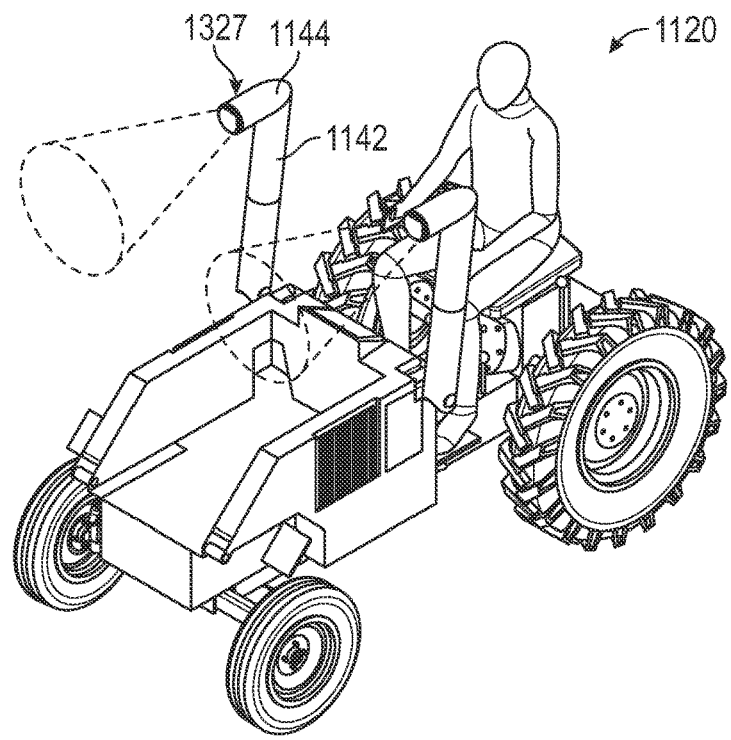
Figure 43:
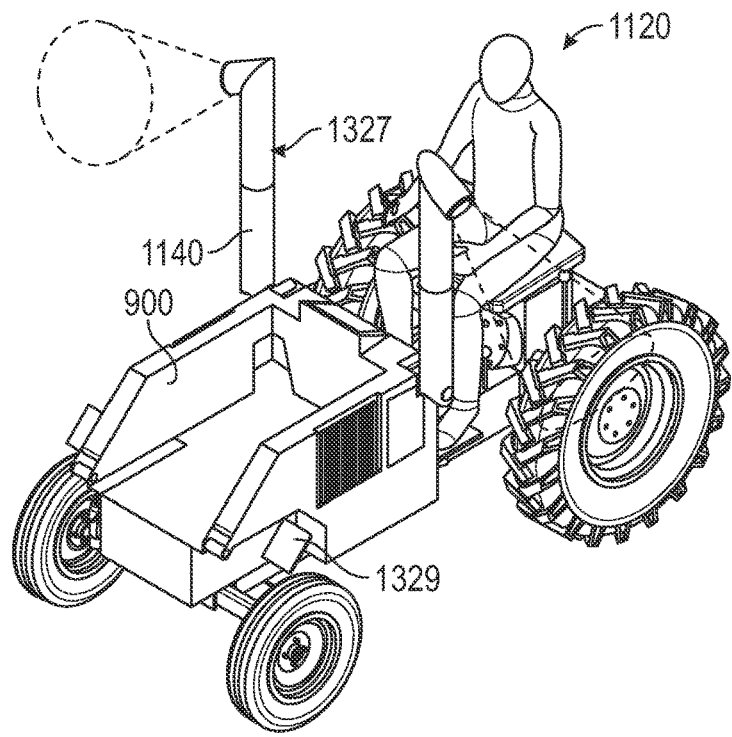
Figure 44:
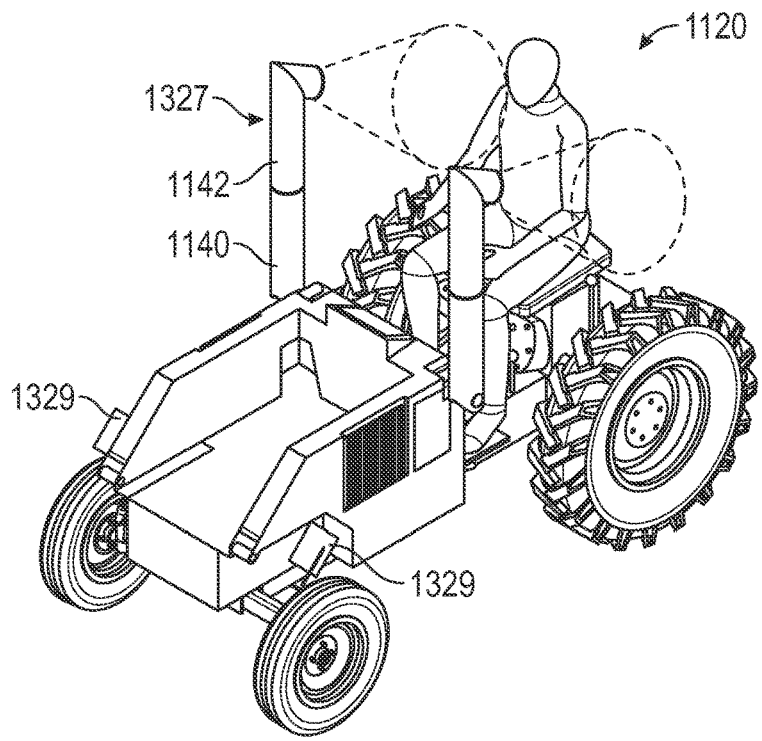
Figure 45:
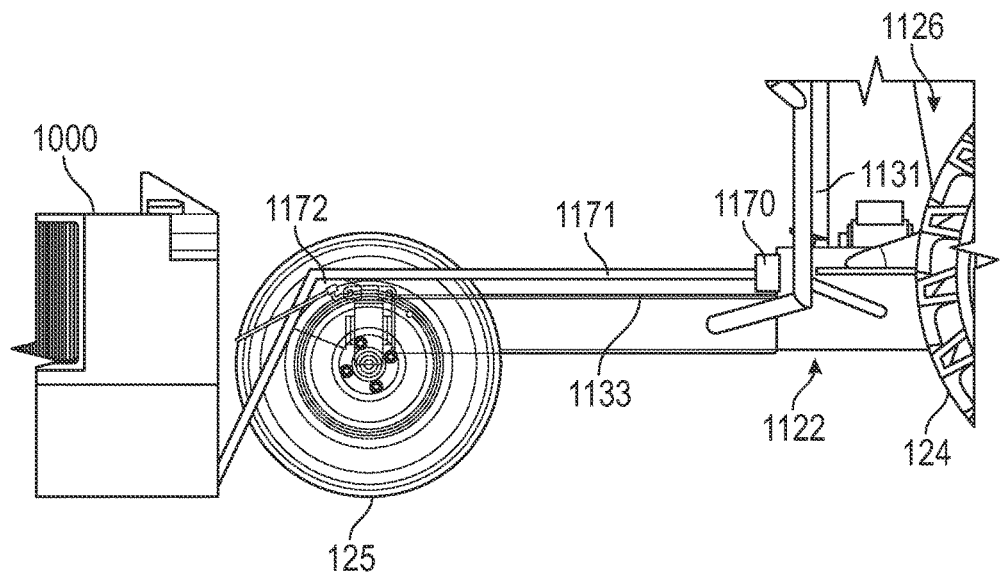
FIGS. 45 and 46 are side views of the vehicle of FIG. 27 illustrating the loading of an example power module using an example winch.

FIGS. 41-45 illustrate lighting system 1327, another implementation of lighting system 1127. Lighting system 1327 is similar to lighting system 1127 except that lighting system 1327, light emitting member 1144 is fixed at a preselected angle to rotational member 1142 and that lighting system 1327 additionally comprises angle mirrors or reflective surfaces 1329 on the module 900, 1000 being carried by vehicle 1120. FIGS. 42-45 illustrate lighting system 1327 in the low beam state, high-beam state, floodlight state and rear lighting state, respectively. As shown by FIG. 42, in the low beam state, light emitting element 1144, due to its fixed angle, project light rearwardly onto mirror or reflective surface 1329 which redirects the light in a forward direction. In one implementation, each of mirrors 1329 is pivotable or rotatably supported by module 900, 1000 to adjust the angle at which the beam of light is reflected in the forward direction. In one implementation, module 900, 1000 additionally comprises an actuator, such as a motor, hydraulic or pneumatic cylinder-piston assembly or the like to selectively reposition mirrors 1329 in response to control signals generated by the controller of console 930 in response to user input.

Figure 28:
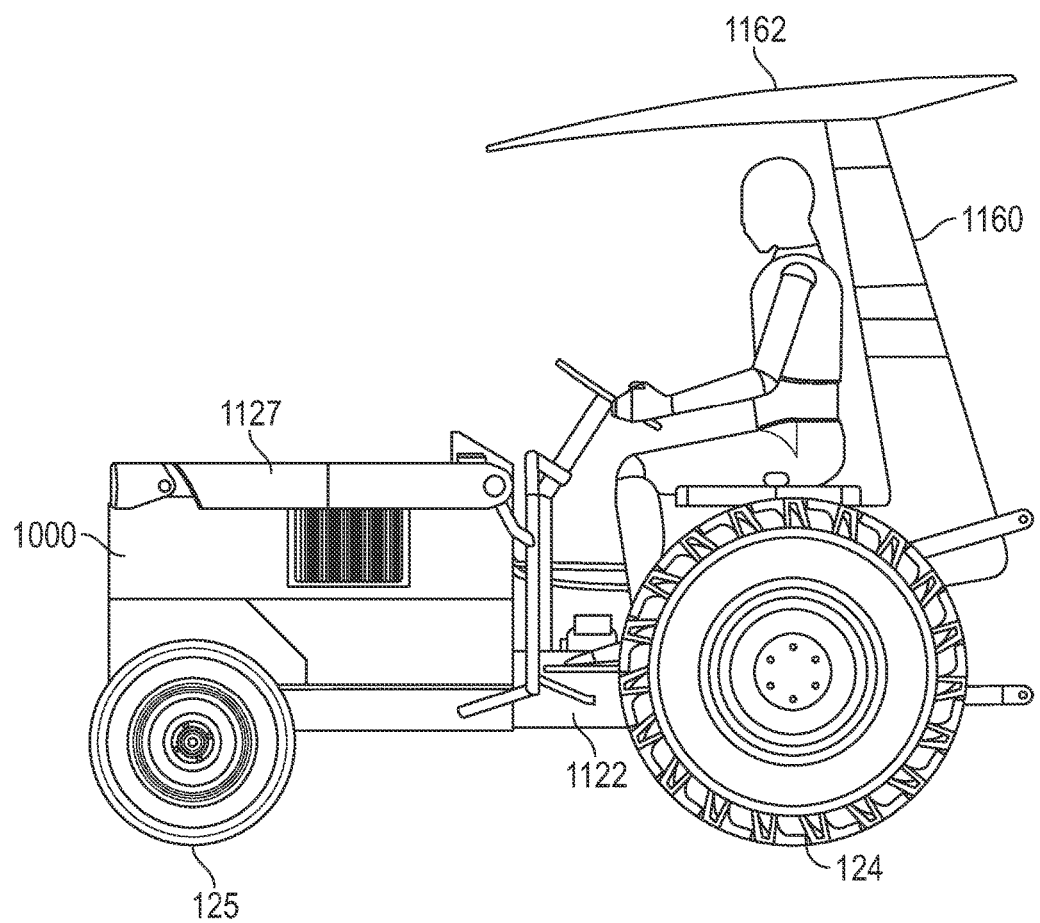
FIG. 28 is a side view of the vehicle of FIG. 27 additionally comprising an example sunshade.
Figure 29:
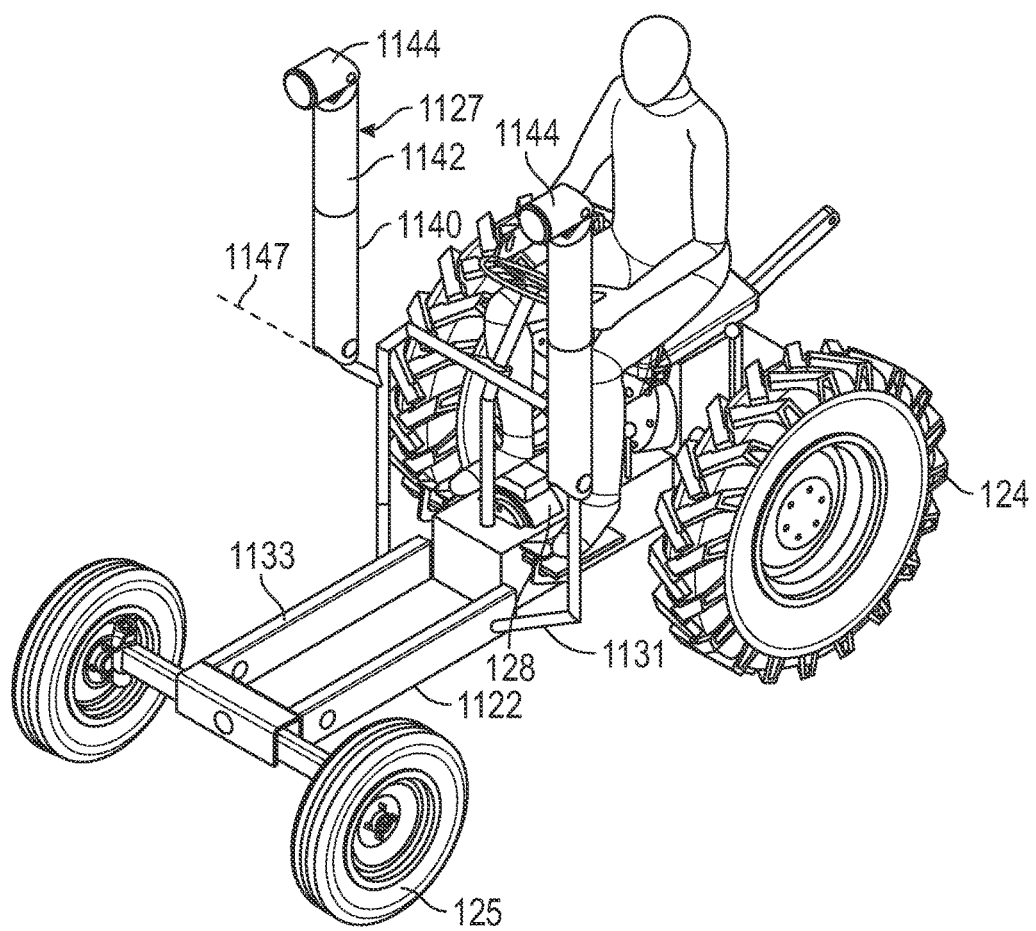
FIG. 29 is a front perspective view of the vehicle of FIG. 27 with the electric power module removed.
Figure 30:
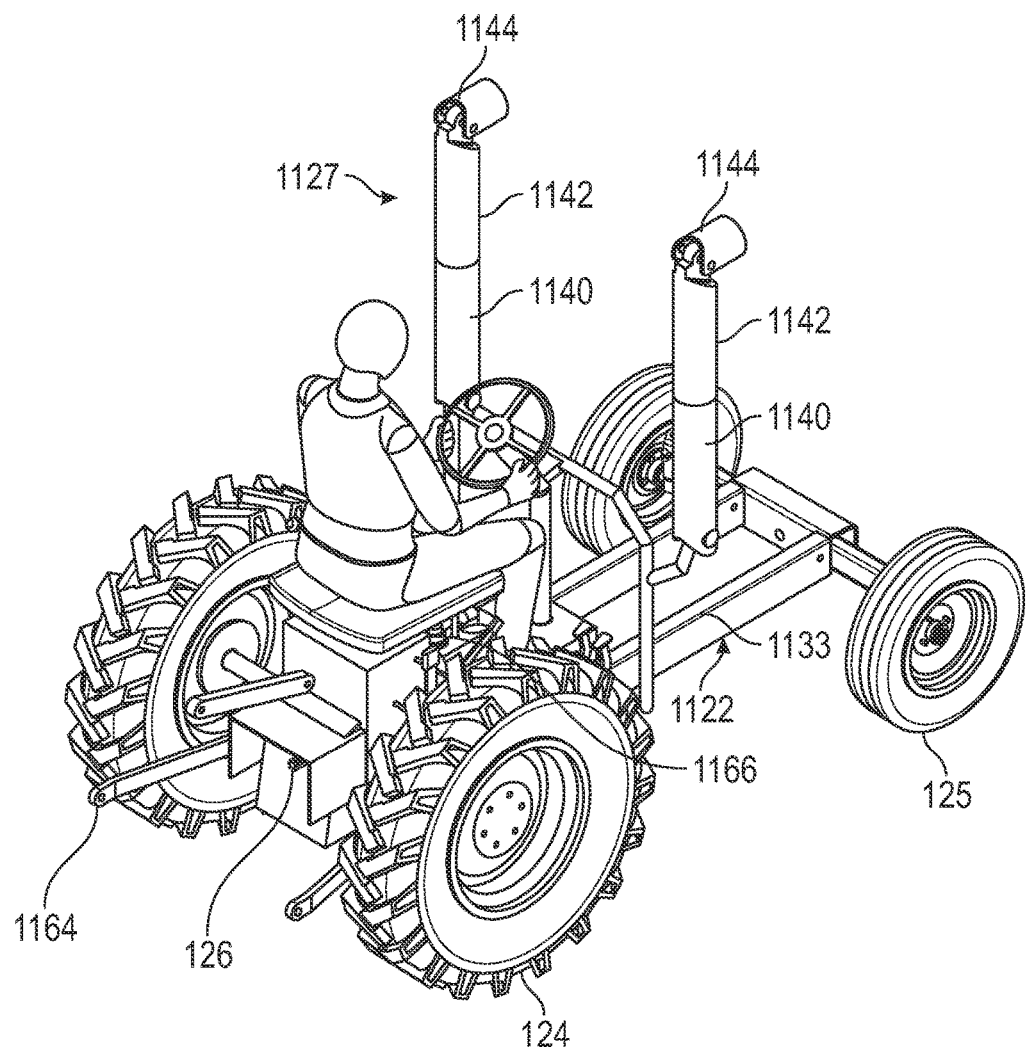
FIG. 30 is a rear perspective view of the vehicle of FIG. 27 with the electric power module removed.

FIGS. 28-30 illustrate additional details with respect to vehicle 1120. As shown by FIG. 28, in one implementation, vehicle 1120 additionally comprises a sunshade 1160 which extends from frame 1122 and supports a cover portion 1162 above the operator. In one implementation, a top surface of cover portion 1162 comprise a solar panel or solar cells that generate electrical power upon being impinged by sunlight. Power from such solar cells or the solar panel is electrically connected to DC input of the module 900, 1000 being carried upon frame 1122. For example, in one implementation, cable 926 is electrically connected to an output of the solar panel forming cover 1162.

As shown by FIG. 30, vehicle 1120 additionally comprises power takeoff (PTO) 126 and three-point hitch 1164 (category 1N). As further shown by FIG. 30, the motor 128 of vehicle 1120 (shown in FIG. 14) includes a connector 1166 for electrical connection to the module 900, 1000 being carried by frame 1122. For example, in one implementation, an AC supplying cable extending from the module 900, 1080 plugged into connector 1166 to drive motor 128 to facilitate driving of vehicle 1120 or powering of PTO 126.

As noted above, frame 1122 of vehicle 1120 removably supports an electric power module, such as module 900 or module 1000 described above. In one implementation, the module is manually tipped onto platform portion 1133 of frame 1122 and pushed or slid rearwardly on top of platform portion 1133. In one such implementation, platform portion 1133 includes integrated cylindrical or rod roller bearings, spherical roller bearings and/or tracks or guide rails to facilitate sliding movement and alignment of electric power module being loaded.

Figure 46:
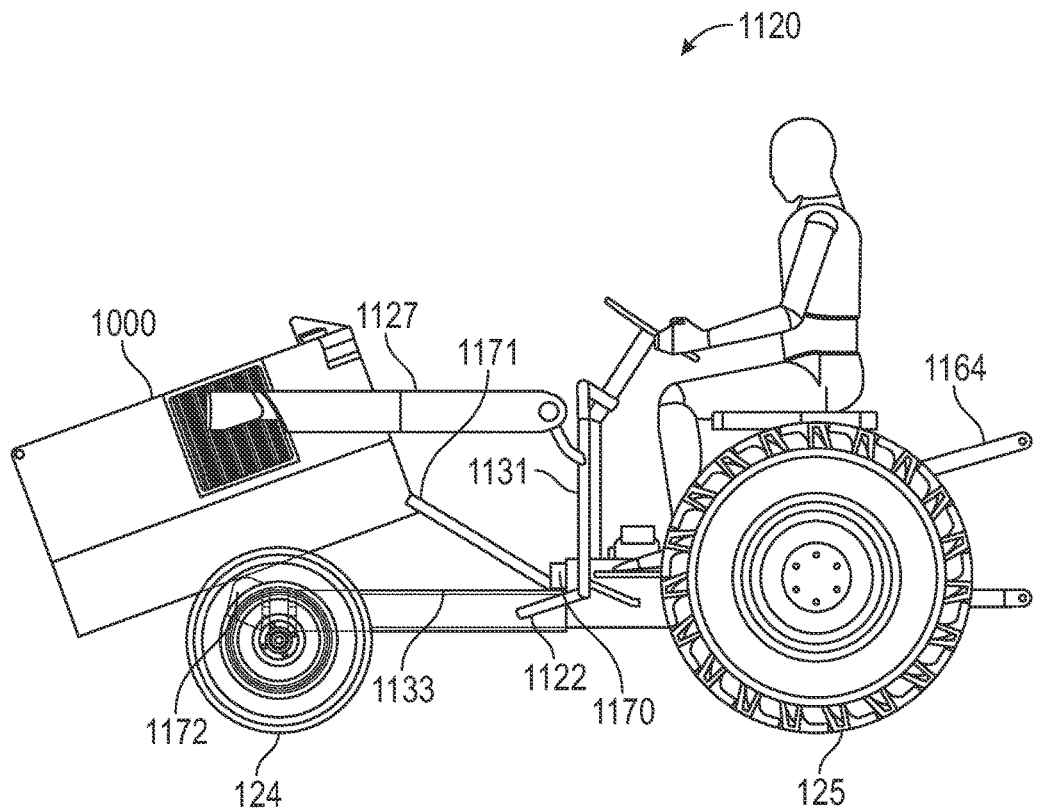
Figure 47:
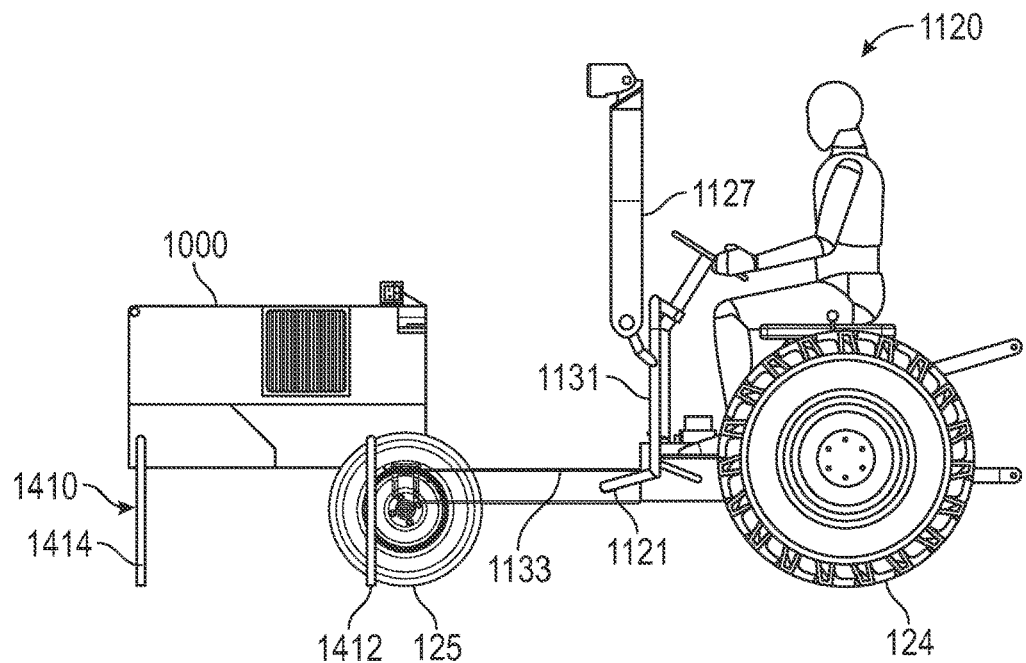
FIGS. 47-50 are side views another implementation of an example power module being loaded upon the vehicle of FIG. 27.

In one implementation, the 1120 additionally comprises a winch 1170 having a cable 1171 and a pulley 1172 about which the cable turns (shown in FIG. 46). As shown by FIG. 46, the cable 1171 of winch 1170 may be extended and connected to a lower mounting point of the electric power module, such as module 1000. In one implementation, winch 1172 includes a manually rotated crank. In another implementation, winch 1170 is operably coupled to motor 128 or includes a separate motor, wherein the module being loaded, such as module 1000, is electrically connected to vehicle 1120 prior to being loaded sources supply power to the motor of winch 1172 to drive winch 1172 to load the module onto platform portion 1133. FIG. 47 illustrates retraction of cable 1171 by winch 1172 to tilt and load module 1000 onto platform portion 1133 of vehicle 1120.

FIGS. 48-51 illustrate an example electric power module support system 1410. Support system 1420 elevates the associated electric power module above the ground and facilitate loading of the electric power module onto platform portion 1133 of vehicle 1120. Although illustrated as being employed with module 1000, support system 1420 is also usable with module 900 or any the electric car models described in the present disclosure.

Figure 48:
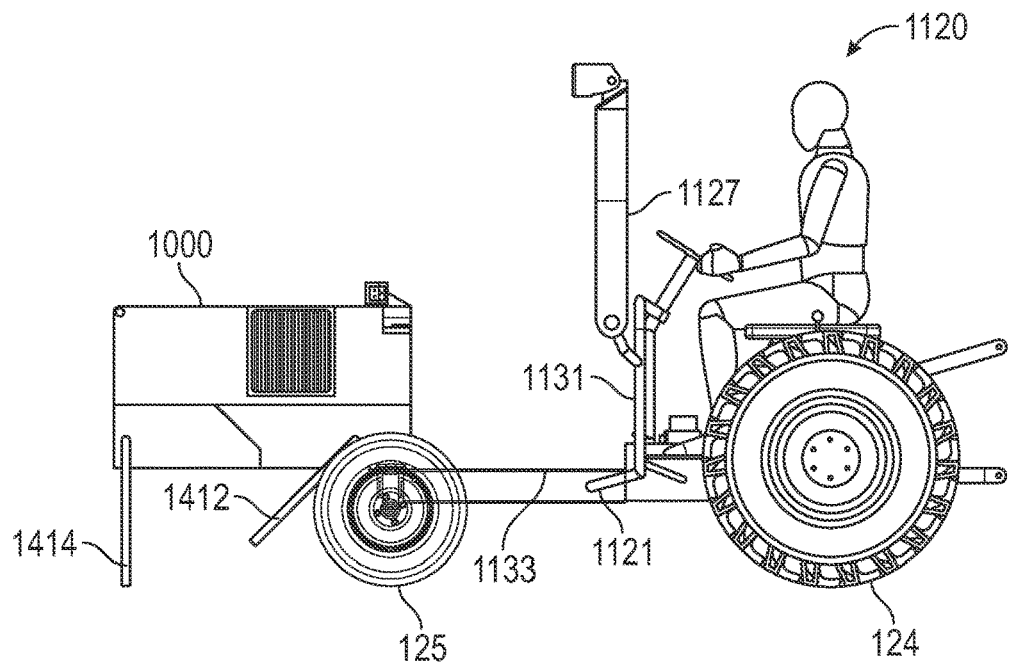
Figure 49:
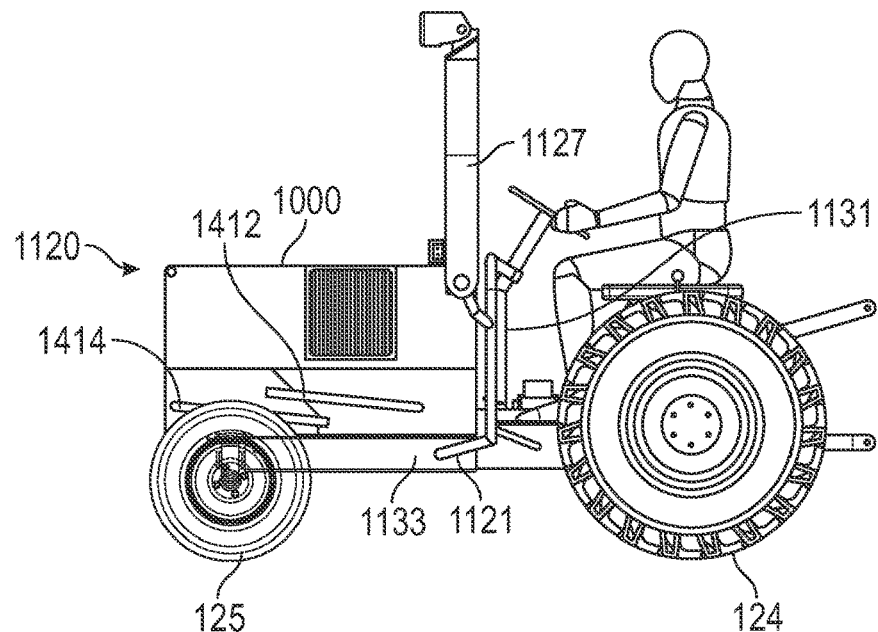
Figure 50:
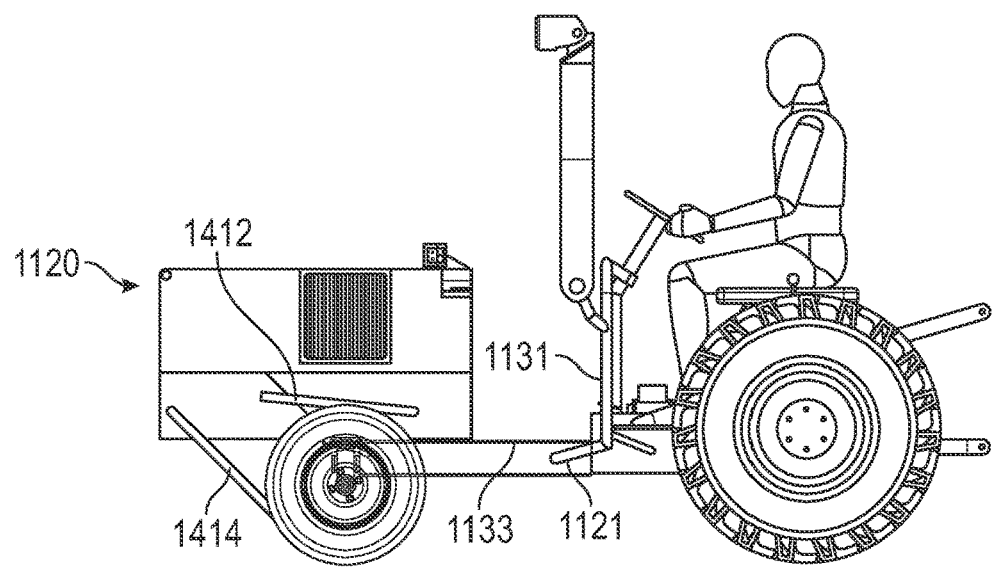
Figure 51:
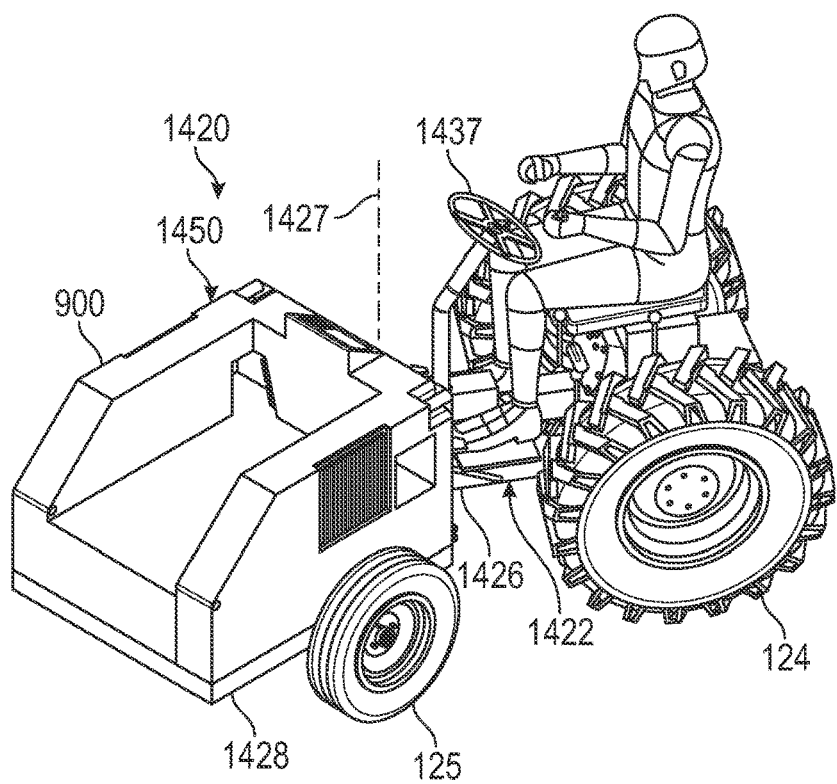
FIG. 51 is a front perspective view of another example mobile power distribution in conversion vehicle having an example articulating front unit.

As shown by FIGS. 48-51, support system 1420 comprises two sets of leg pairs, a rear leg pair 1412 and a front leg pair 1414. Each of leg pairs 1412, 1414 is pivotally supported by module 1000 and extends from module 1000. In one implementation, system 1410 additionally comprises lockable, but releasable leg retainers which releasably lock leg pairs 1412, 1414 in the extended position shown in FIG. 48. To load module 1000, the leg retainers are released or unlocked. As shown by FIG. 48, each of leg pairs 1412, 1414 elevates a bottom of module 1002 a height at or above the top surface of platform portion 1133 of vehicle 1120. As shown by FIGS. 49-51, this facilitates manual pushing of module 1000 onto platform portion 1133 for the winching or manual installation of module 1000 onto platform 1133. In yet other implementations, module 1000 is electrically connected to motor 128 prior to being loaded, allowing vehicle 1122 be forwardly driven beneath module 1000 to load module 1000. During loading, leg pair 1412 pivots. Once module 1000 has been sufficiently loaded upon platform 1133, leg pair 1414 is pivoted to the collapsed state shown in FIG. 50.

Figure 52:
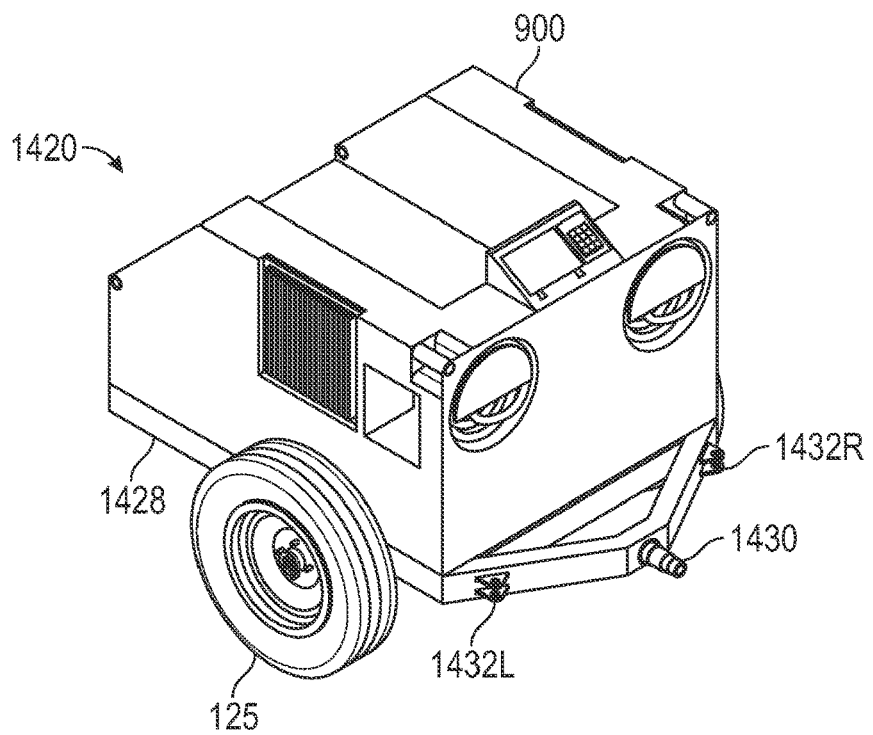
FIG. 52 is a rear perspective view of the front unit of FIG. 51 separated from a remainder of the vehicle.
Figure 53:
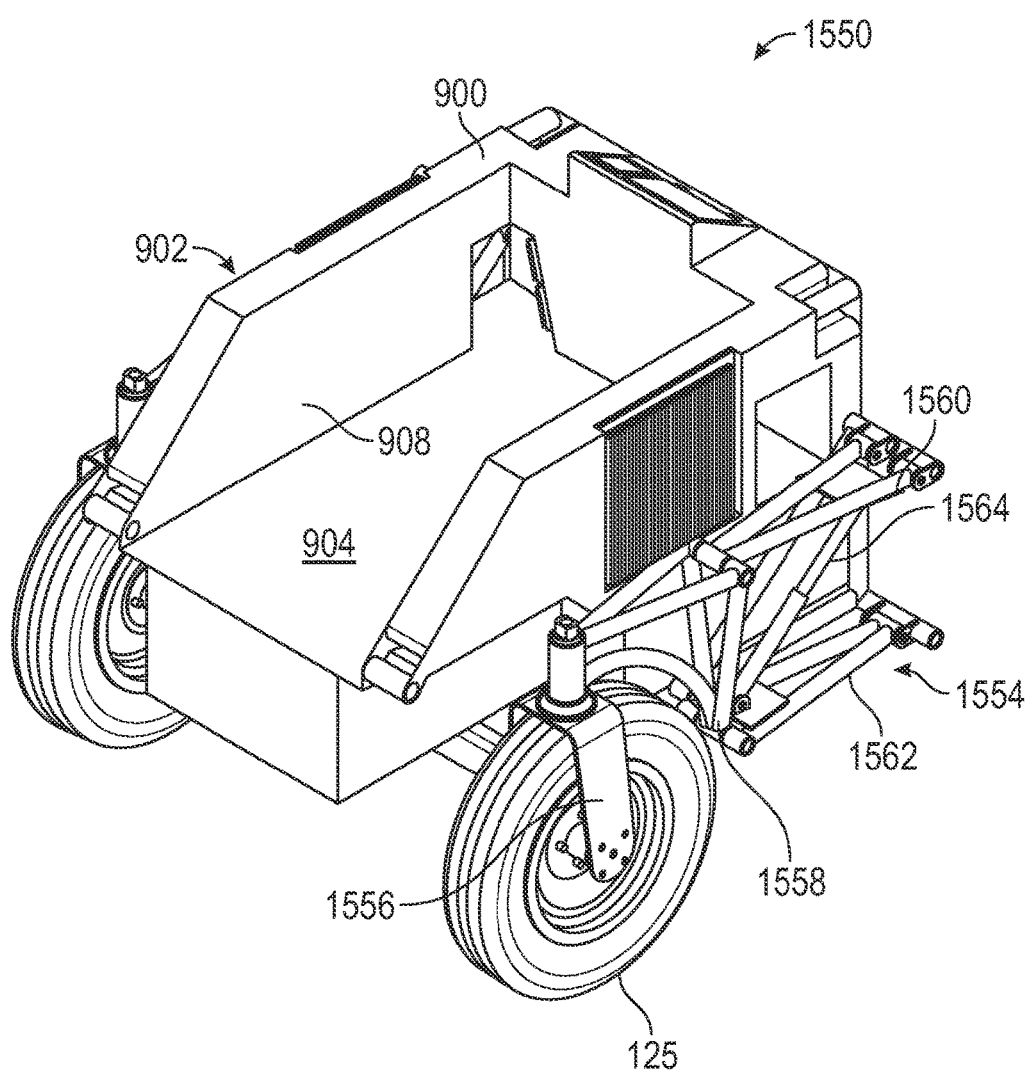
FIG. 53 is a rear perspective view of another example front unit for use with the vehicle of FIG. 51.

FIGS. 52 and 53 illustrate vehicle 1420, another implementation of vehicle 20. Vehicle 1420 is similar to vehicle 1120 except that vehicle 1420 comprises frame 1422 in place of frame 1122. Frame 1422 comprises a rear frame portion 1426 and a front frame portion 1428. Rear frame portion 1426 supports tires 124 and drive 232 (described above in FIG. 14) of vehicle 1420 while front frame portion 1428 supports wheels 125 and the electric power module, such as module 900 shown or module 1000 described above. Rear frame portion 1426 and front frame portion 1428 pivot about a vertical axis 1427 about mid-tractor or mid-vehicle to steer vehicle 1420. Such articulation at a central pivot facilitates steering.

As shown by FIG. 53, front frame portion 1428 comprises a central pivot 1430 and a pair of steering mounts 1432L, 1432R (collectively referred to as steering mounts 1432). Central pivot 1430 is releasably connectable to rear frame portion 1426 and provides articulation about axis 1427. Steering mounts 1432 provide releasable connection to steering links extending from rear frame portion 1426. Such steering links are mechanically or operably connected to steering wheel 1437, such that rotation of steering wheel 1437 extends forwardly one of the left and right steering links and retracts rearwardly the other of the left and right steering links that are connected to mounts 1432 so as to turn front frame portion 1428 about axis 1427 to facilitate steering of vehicle 1420. In one implementation, such steering links are extended/retracted manually. In other implementations, such extension and retraction of the steering links is assisted through use of an actuator, such as a hydraulic or pneumatic cylinder-piston assembly driven in response to signals resulting from the turning of steering wheel 1437.

In one implementation, front frame portion 1428 removably are releasably receives module 900, 1000. In another implementation, front frame portion 1428 is permanently or fixedly attached to the associated power module 900, 1002 to form a front power unit 1450. In such an implementation, front frame portion 1428 is disconnectable from rear frame portion 1426, wherein rear frame portion 1426 may include a kickstand or retractable wheels to support a front end of rear frame portion 1426 when disconnected from front frame portion 1428. In such an implementation, wheels 125 facilitate movement of the associated electric power module 900, 1000 and facilitate connection and disconnection of the electric power module with respect to the remainder of vehicle 1420.

Figure 54:
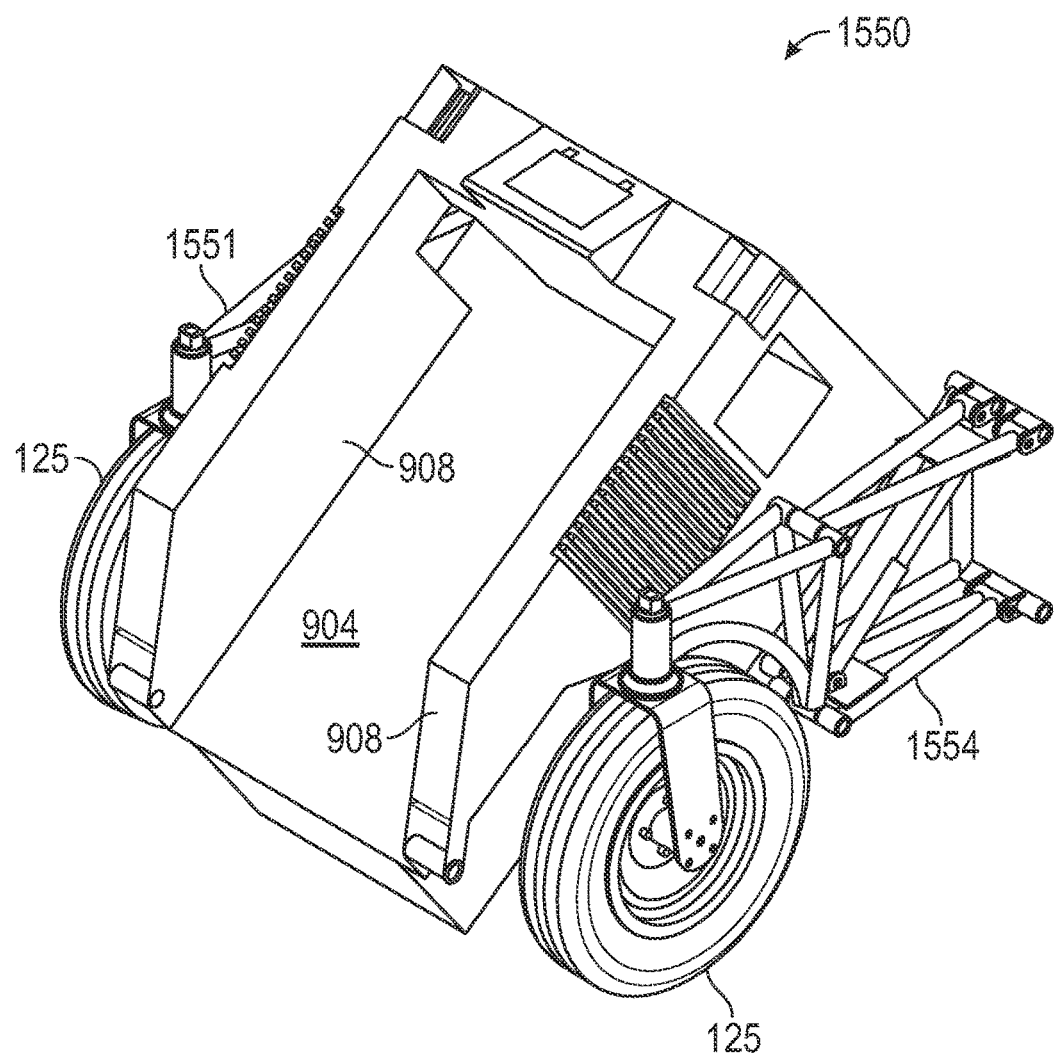
FIG. 54 is a rear perspective view of the front unit of FIG. 53 in a tilted dumping state.
Figure 55:
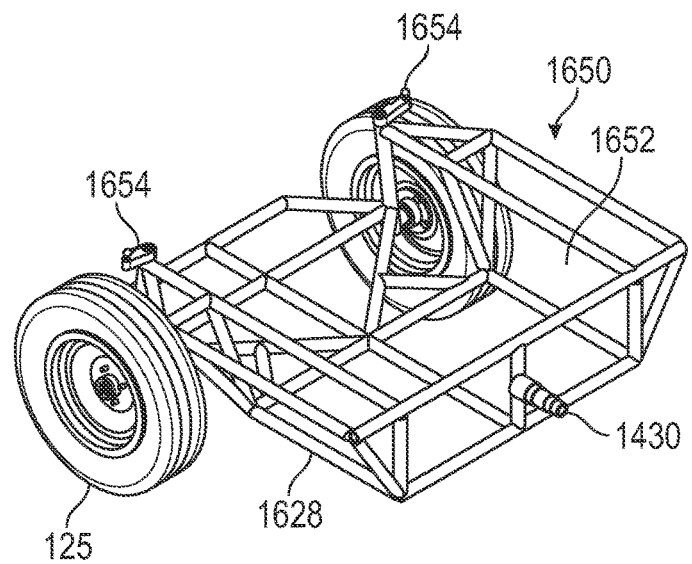
FIG. 55 is a front perspective view of an example front frame portion of another example front unit for use with the vehicle of FIG. 51.

FIGS. 54 and 55 illustrate front power unit 1550, another implementation of front power unit 1450 described with respect to FIGS. 52 and 53. In one implementation, front power unit 1550 is configured to be interchanged with front power unit 1450. Front power unit 1550 comprises independent front wheel suspension assemblies 1554, castor wheel supports 1556, and Ackerman steering linkages 1558. Suspension assemblies 1554 comprise upper and lower supports 1560, 1562 joined by an intermediate cylinder-piston assembly 1564. Cylinder-piston assembly 1564 provides suspension compliance and damping to the vehicle. Bed 902 can be selectively pivoted about an axis from a horizontal orientation to a tilted dumping orientation. In one implementation, vehicle 1120 comprises a hydraulic or pneumatic pump, actuatable in response to control signals from console 930, which extends or retracts a cylinder-piston assembly to move bed 902 between the horizontal and dumping positions.

Castor wheel supports 1556 support wheels 125 with respect to front frame portion 1428 which is integrated as part of electric power module 900. Ackerman steering linkages 1558 comprises an arrangement of linkages having the Ackerman geometry to facilitate turning of unit 550. In other implementations, front unit 1550 may have other suspension systems or other wheel supporting arrangements.

Figure 56:
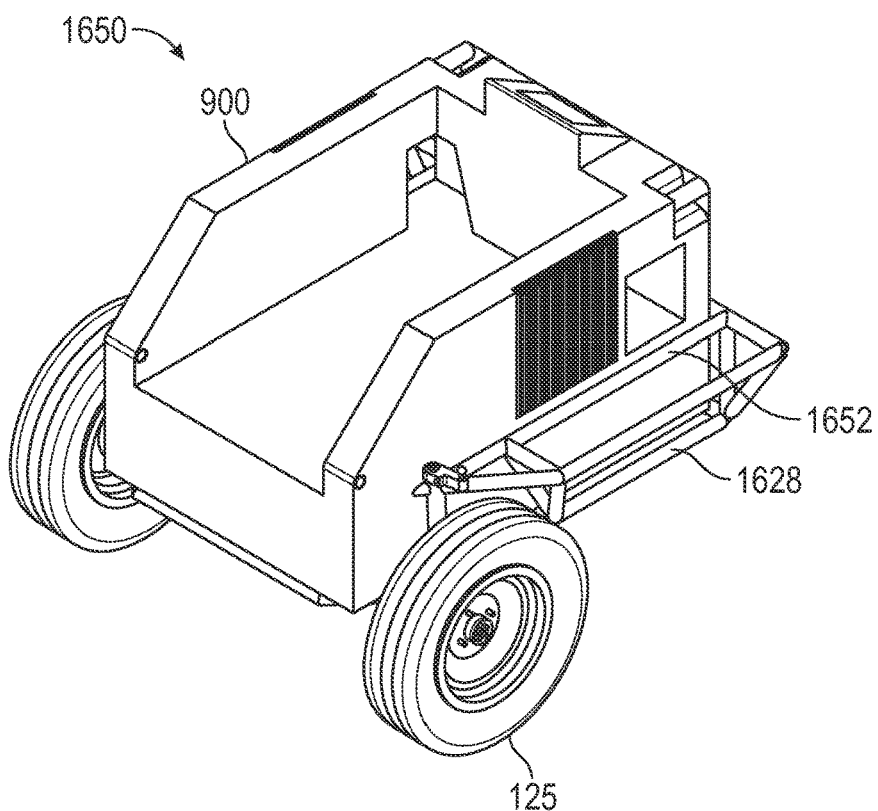
FIG. 56 is a rear perspective view of the front frame portion of FIG. 55 supporting the electric power module of FIG. 22.

FIGS. 56 and 57 illustrate front unit 1650, another implementation of front unit 1450. Front unit 1650 is similar to front unit 1450 except that front unit 1650 comprises front frame portion 1628 which removably receives module 900 (or any of the other models described herein) at a lower vertical height such that bottom of module 900 extends closer to, at, or below rotational axes of wheels 125 to provide a lower center of gravity. As shown by FIG. 56, front frame portion 1628 comprises a latticework or arrangement of posts, bars, tubes or the like that form or define a three sided cavity 1652 into which module 900 may be positioned. In one implementation, front unit 1650 additionally comprises an Ackerman steering set of linkages having steering axes 1654. The geometry of steering kingpin axes 1654 generates self-centering forces to maintain straight line motion in the absence of steering input. Steering actuation via connecting linkages (not shown) and a concentric shaft through central pivot 1430 enables the front unit 1650 to articulate about central pivot 1430 to provide compliance to uneven terrain.

FIGS. 58-60 illustrate front unit 1750, another implementation of front unit 1450 described above. In the example illustrated, front unit 1750 is illustrated as either removably supporting or being permanently fixed to power module 1000. As shown by FIG. 60, front unit 750 acts as a suspension that supports wheels 125 for pivotal movement about a suspension pivot 1753. Front unit 753 further comprises steering axes 1654 described above.

Figure 61:
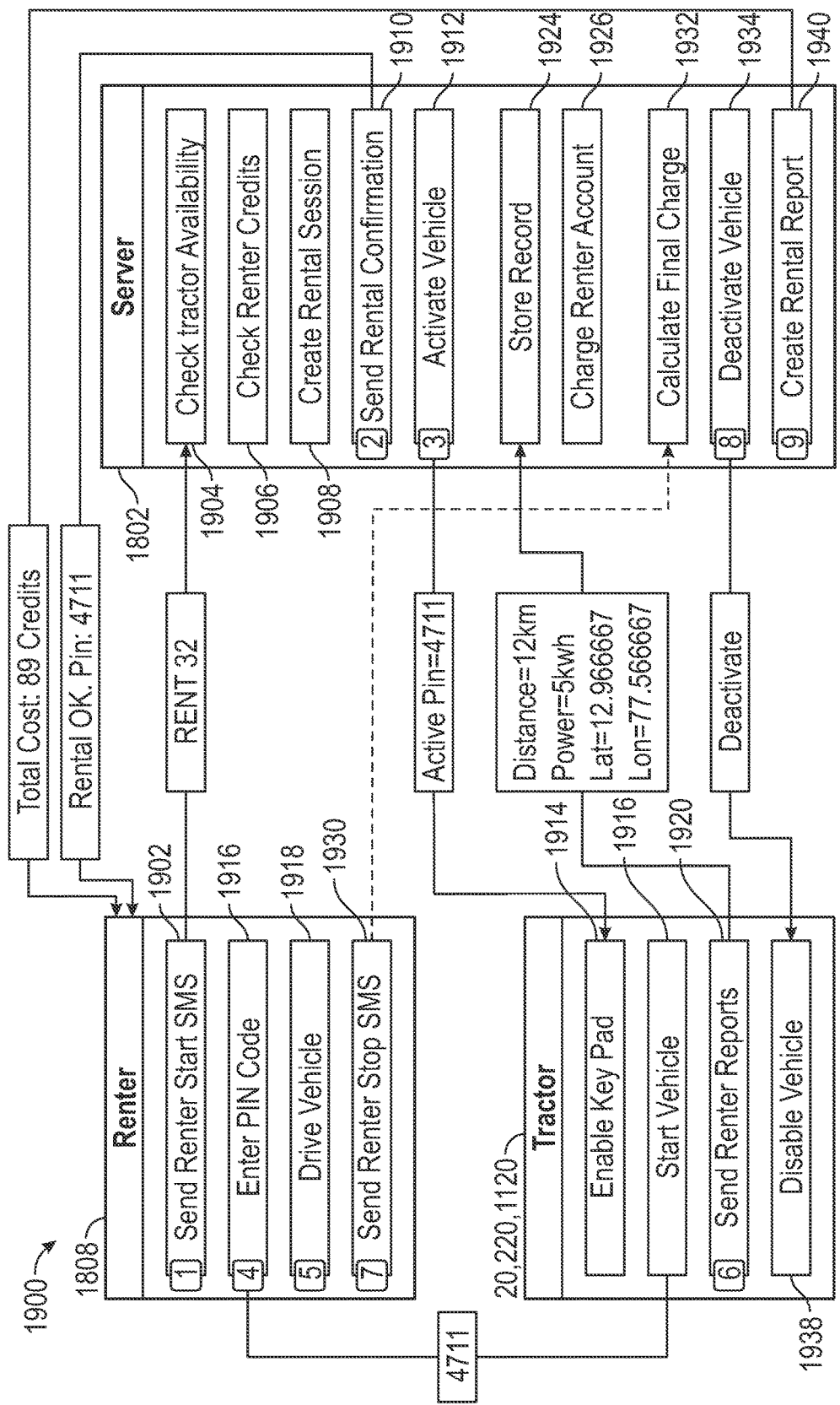
FIG. 61 is a flow diagram of an example reservation process that may be carried out by the system of FIG. 60.

FIG. 61 schematically illustrates mobile power conversion and distribution system 1800. System 1800 facilitates the allocation of the use of the vehicles 20-1120 described herein amongst a plurality of different individuals, families, or adjacent communities. System 1800 further facilitates charitable support of agricultural activities in impoverished regions. In the example illustrated, system 1800 comprises server 1802, facilitators 1804, vehicle 20, 220, 320, 420, 620, 820, 1120, 1420, administrator 1806 and renters/users 1808.

Server 1802 comprises one or more processing units that operate following instructions contained in a non-transitory computer-readable medium. Servers 1802 are in communication with facilitators 1804, vehicles 20, 220, 1120, renters/users 1808 and administrator 1806 across a wide area network, such as the Internet, or local area networks. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in random access memory (RAM) for execution by the processing unit from read only memory (ROM), a mass storage device, or some other persistent storage. In other embodiments, hard wired circuitry may be used in place of or in combination with software instructions to implement the functions described. For example, server 1802 may be embodied as part of one or more application-specific integrated circuits (ASICs). Unless otherwise specifically noted, the controller is not limited to any specific combination of hardware circuitry and software, nor to any particular source for the instructions executed by the processing unit.

In the example illustrated, server 1802 comprises a memory for storing a renter database regarding records regarding individual renters/users 1808 and a vehicle database regarding data and records for individual vehicles 20, 220, 1120. For example, respect to individual users 1808, server 1802 may maintain a database tracking the number of credits currently owned by different individuals. Server 1802 further stores the current rental status for each individual user or farmer. With respect to each individual vehicle 20, 220, 320, 420, 620, 820, 1120, 1420, server 1802 may maintain a current GPS location of each vehicle, a state of charge for each vehicle, a current operating speed of each vehicle, the current operating mode for each vehicle, the current user or renter 1808 using the particular vehicle and any warning/faults indicating needed repair or maintenance. For the use of such vehicles Server 1802 further establishes, monitors, and stores rental sessions for vehicles 20, 220, 1120 while providing reports regarding vehicles 20, 220, 1120 and the usage by different renters.

In one implementation, server 1802 further maintains system parameters such as individual users/farmers phone numbers and names, the pricing info for the use of different vehicles and different options, warning set points, speed limits imposed upon the use of such vehicles and geo-fence limits (geo-referenced boundaries for regions in which a particular vehicle may travel or may be used.). In one implementation, upon receiving signals that a vehicle is traveling outside of such geo-fence limits, server 1802 may transmit signals to the particular vehicle automatically shutting off the vehicle, warning the operator that he or she is traveling outside of predefined use boundaries, or warning the administrator that a vehicle has exited the predefined boundary. Some implementations in which vehicle 20 is only reserved for particular uses, upon receiving signals from vehicle 20 indicating an unauthorized use, system 1802 may output signals which are transmitted to vehicle 20, 220, 320, 420, 620, 820, 1120, 1420 which automatically shut down or terminate such unauthorized uses of vehicle 20, 222 1120 or which either notify the user that he or she has exceeded the authorized use or that an additional charge for the unauthorized use will be imposed.

Facilitators 1804 comprise system administrators which oversee the operation of server 1802. Facilitators 1804 communicate with server 1802 across an Internet. Facilitators 1804 monitor data, debug operation of server 1802, and configure the various systems provided by server 1802.

Vehicles 20, 220, 1120 are described above. In the example illustrated, each of vehicles 20, 220, 1120 comprises a transceiver which communicate with server 1802 in a wireless fashion. In one implementation, each of vehicles 20, 220, 1120 has a unique ID and further comprises a geo-referencing device, such as a global positioning navigation satellite system device which identifies the location of each vehicle 20, 220, 320, 420, 620, 820, 1120, 1420 and communicates such information to server 1802. In addition to transmitting its location to server 1802, each vehicle 20, 220, 320, 420, 620, 820, 1120, 1420 transmits operational status data, such as power level, hours of usage, types of usage and the like to server 1802.

Renters/users 1808 comprise individuals, families or communities that use vehicle 20, 220, 320, 420, 620, 820, 1120, 1420. Users 1808 are represented by a user node 1810 provided by a device in communication with server 1802. In one implementation, each user node 1810 comprises a portable electronic device that communicates with server 1802 across a wide area network or local area network. For example, in one implementation, each user node 1810 comprises a simple cell phone, a smart phone, a personal data assistant, a tablet computer, a laptop computer or the like. Using an associated computer node 1810, each user 1808 may reserve or rent one of more vehicles 20, 220, 1120, may remotely view status of one or more of vehicles 20, 220, 1120, such as current power levels, current location, and the like, and may check account status such as account credits or debits, future reservation times for the user or for others for particular vehicles 20, 220, 1120 and the like.

Administrator 1806 comprises an entity, such as a person, community and the like that manages the rentals or use allocations for vehicles 20, 220, 1120. Administrator 1806 is represented by an administrator node 1812. In one implementation, administrator node 1810 comprises a portable electronic device that communicates with server 1802 across a wide area network or local area network. For example, in one implementation, administrator node 1810 comprises a simple cell phone, a smart phone, a personal data assistant, a tablet computer, a laptop computer or the like. Using administrator node 1812, administrator 1806 may manage the rentals or allocation of time for the use of vehicles 20, 220, 1120. Administrator 1806 may establish pricing for the use of vehicles 20, 220, 1120, may manage renters, and may monitor or check the status of vehicles 20, 220, 1120.

In one implementation, system 1800 provides a reservation system for vehicles 20, 220, 1120. FIG. 62 illustrates an example flow chart for example reservation method 1900 carried out by system 1800. As indicated by block 1902, renter/user 1808 sends a rental starter request for a particular vehicle (identified by its unique ID number 32 in the example) to server 1802. As indicated by block 1904, server 1802 checks the vehicle database to determine the availability for the particular vehicle with reference ID 32. As indicated by block 1906, server 1802 further checks to see if the particular user making the request has available credits. As indicated by block 1908, if the particular requested vehicle is available and if the requester/user 1808 has sufficient available credits, the rental session on a website displayed on user node 1810 is created.

As indicated by block 1910, as part of the rental session, server 1802 sends a rental confirmation with a created authorization key or PIN (4711 in the example) to the user node 1810 of user 1808. As indicated by block 1912, server 1804 additionally transmits, across a network, the activation key or PIN to the particular vehicle 20, 220, 320, 420, 620, 820, 1120, 1420 itself which, as indicated by block 1914, enables the keypad on console 930 (described above). As indicated by block 1916, user 1808 boards vehicle 20, 220, 320, 420, 620, 820, 1120, 1420 and enters the received PIN or authorization key (4711) using an input of console 930. Vehicle 20, 220, 320, 420, 620, 820, 1120, 1420 confirms whether the entered PIN code matches the PIN code or authorization key previously received from server 1802. If there is a match, as indicated by block 1916, vehicle 20, 220, 320, 420, 620, 820, 1120, 1420 starts operations and the user/renter is able to drive the vehicle as indicated by block 1918. In some implementations, only certain functions for vehicle 20, 220, 320, 420, 620, 820, 1120, 1420 are authorized or made available to a user depending upon the reservation and/or the number of credits paid for use of the vehicle.

As indicated by block 1920, during use of vehicle 20, 220, 320, 420, 620, 820, 1120, 1420, the vehicle transmits various status signals or data signals to server 1802. For example, in one implementation, the vehicle being used may transmit data regarding the total distance traveled during its session of use, the current level of power being provided, the amount of power remaining in the battery of the vehicle and/or the total amount of power consumed during the use session. The vehicle being used may additionally transmit its current location, such as his latitude and longitude, as indicated by the GPS device on the vehicle, to the server 1802. In response, as indicated by block 1924, server 1802 stores a record or data of such use. As indicated by block 1926, server 1802 additionally charges the renters account for the number of credits for such use. Charges for use may be based upon time, distance traveled, or total power consumed. In some implementations, such charges may be offset or actual positive credits may result when the vehicle is connected to a power generation source, such as a solar panel, turbine or the like, wherein the battery of the vehicle receives electrical power and is charged by the user.

As indicated by block 1930, upon completion, the renter/user 1808 sends a rental stop signal to server 1802, either using console 930 on the vehicle or using user node 1810. Upon receiving such a stop signal, server 1802, as indicated by block 1932, calculates a final charge for the use of the particular vehicle and assesses the account of the user 1808 the final charge. As indicated by block 1934, server 1802 deactivates authorize use of the vehicle and transmits a deactivate signal which results in the vehicle being disabled as indicated by block 1938. As indicated by block 1940, the reservation session is ended and server 1802 creates and stores a rental report. In one implementation, rental report may include information regarding the user, the distance traveled by vehicle 20, the power consumed by vehicle 20, the remaining power in the battery of the vehicle, the different modes of use for which the vehicle used and the like. The report may additionally include identified charges made to the users account as well as current account information for the user. In one implementation, the generated and stored report is additionally transmitted to administrator 1806 for display and review on administrator node 1812.

In one implementation, system 1800 allows different donors 1820 to contribute to impoverished farmers by purchasing credits for the use of vehicles 20, 220, 1120. For example, in one implementation, system 1800 allows donors 1820 to access a website which displays different impoverished regions, different vehicles, different potential users, and/or different uses for vehicles. The donors also provided with the opportunity to donate money via credit card, PayPal, wire transfer, check or other form to the administrators of system 1800, wherein the donor's account is credited with the amount of payment. The donors are then permitted to contribute funds or credits for the use of vehicles 20, 220, 1120. In one implementation, the donors may purchase a certain number of credits or certain number of hours for use of a particular vehicle in a particular impoverished region. In one implementation, the donors 1820 may prepurchase a number of hours or credits for a particular donor designated potential user. In one implementation, the donors 1820 may prepurchase other metrics for use of vehicles 20, such as the total number of miles or a total number of kilowatts of use.

In one implementation, upon making a contribution for the use of a vehicle or to particular potential users of a vehicle managed by system 1800, the donor receives notifications or authorization to access and review data regarding how his or her contribution was used. For example, in one implementation, a particular donor 1820 may receive notifications, such as upon his or her smart phone or other portable electronic device, that his contribution is presently enabling the use of a particular vehicle by a particular user at a particular time. In one implementation, the user may receive, on his or her smart phone, tablet computer or the like, a map indicating the present geo-referenced location of the vehicle and further indicating movement of the vehicle as it is being used by user 1808, providing the donor with a visible indication of the use of his or her charitable donation. As a result, the user is able to visibly track and see how his or her charitable contributions are assisting those in impoverished regions. The notification may additionally indicate how the vehicle is being used, such as the operational mode for the vehicle and the types of crops being planted or harvested, as well as personal information regarding the user, such as his or her name, family size, home and the like. The notification may additionally indicate when the donor's contribution of credits, hours, power or the like will be exhausted and any additional needs for the particular user for vehicle 20, such as complete planting the field, complete harvest of the field or the like.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
    a drive unit comprising:
        a frame having a platform portion;
        a front axle supported by the frame and supporting front ground engaging members;
        a rear axle supported by the frame and supporting rear ground engaging members; and
        a motor carried by the frame and operably coupled to at least one of the front axle and the rear axle to drive at least one of the front ground engaging members and the rear ground engaging members; and
    a removable power storage and conversion module carried by the drive unit, the module comprising:
        an energy storage system to power mobility of the vehicle;
        a direct current input coupling to be connected to a direct current (DC) electrical power source;
        a DC output coupling;
        an alternating current (AC) input coupling to be connected to an AC electrical power source;
        an AC output coupling; and
        a power conversion system providing bidirectional flow between AC and DC power domains, wherein module forms a bed having a floor and sidewalls rising from the floor to form a cargo hold and wherein the module is removably positioned on the platform portion of the frame at least partially between the front axle and the rear axle.

2. An apparatus comprising:
    an energy storage system and the power conversion system comprising:
    an energy storage system;
    a first bidirectional direct-current (DC) to alternating current (AC) converter having a first AC side and a first DC side;
    a second bidirectional DC to AC converter having a second AC side and a second DC side;
    a DC input coupling to be connected to a DC electrical power source;
    a DC output coupling;
    a first switch actuatable between a first state in which the first switch electrically connects the first DC side to the DC input coupling and the DC output coupling and a second state in which the first switch electrically connects the first DC side to the energy storage system and to the second DC side;
    an alternating current (AC) input coupling;
    an AC output coupling;
    a second switch actuatable between a third state in which the second switch electrically connects the second AC side to the AC input coupling and a fourth state in which the second switch electrically connects the second AC side to the AC output coupling;
    a third switch actuatable between a fifth state in which the third switch electrically connects the first AC side to the AC output coupling and a sixth state in which the third switch electrically connects the first AC side to a motor.

3. The apparatus of claim 2 further comprising the motor.

4. The apparatus of claim 2 further comprising:
    the motor;
    a vehicle linear motion drive; and
    a fourth switch to selectively connect the motor to the vehicle linear motion drive to power the vehicle linear motion drive.

5. The apparatus of claim 2 further comprising:
    a power takeoff; and
    a fifth switch to selectively connect the motor to the power takeoff to power the power takeoff.

6. The apparatus of claim 2 further comprising a third switch to selectively connect the second DC side to the energy storage system.

7. The apparatus of claim 2 further comprising a removable power storage and conversion module to be removably carried by a vehicle, the module comprising the energy storage system and the power conversion system.

8. The apparatus of claim 7, wherein the module forms a bed, the bed having the AC input coupling, the DC input coupling, the AC output coupling and the DC output coupling.

9. The apparatus of claim 8 further comprising a fuel powered generator on the bed and connected to the one of the DC input coupling and the AC input coupling.

10. The apparatus of claim 8 further comprising a refrigeration unit carried on the bed and connected to the AC output coupling.

11. The apparatus of claim 8 further comprising a power takeoff extending from the module.

12. The apparatus of claim 8, wherein the module further comprises a lift handle at each corner of the module.

13. The apparatus of claim 7, wherein the vehicle comprises a platform upon which the module removably rests.

14. The apparatus of claim 2 further comprising a vehicle, wherein the vehicle having a power takeoff powered by the energy storage system.

15. The apparatus of claim 2 further comprising a tractor, the tractor comprising a hitch to be connected to an implement.

16. The apparatus of claim 2 further comprising a light carried by the vehicle and movable between a forward facing position and a rearward facing position.

17. The apparatus of claim 16, wherein the light is movable to a side facing position.

18. The apparatus of claim 2 further comprising:
a vehicle carrying the energy storage system and the power conversion system, wherein mobility of the vehicle is powered by the battery.

19. The apparatus of claim 18 further comprising a fuel powered generator carried by the vehicle and connected to the one of the DC input coupling and the AC input coupling.

20. The apparatus of claim 18 further comprising a refrigeration unit carried by the vehicle and connected to the AC output coupling.

21. The apparatus of claim 18 further comprising a solar panel carried by the vehicle and electrically connected to the energy storage system.

22. The apparatus of claim 1, wherein the drive unit comprises an operator seat proximate the rear ground engaging members and wherein the module is mounted to the drive unit on the platform portion of the frame while extending between and below uppermost peripheries of the front ground engaging members.

* * * * *